US012748730B2

(12) United States Patent
Rothschilds et al.

(10) Patent No.: US 12,748,730 B2
(45) Date of Patent: *Sep. 29, 2026

(54) GLOBAL NAMESPACES FOR DISTRIBUTED FILE SYSTEMS

(71) Applicant: Qumulo, Inc., Seattle, WA (US)

(72) Inventors: Thomas Gregory Rothschilds, Issaquah, WA (US); Aaron James Passey, San Rafael, CA (US); Edward Carpenter, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/048,348

(22) Filed: Feb. 7, 2025

(65) Prior Publication Data

US 2026/0044477 A1 Feb. 12, 2026

Related U.S. Application Data

(63) Continuation of application No. 18/799,431, filed on Aug. 9, 2024, now Pat. No. 12,222,903.

(51) Int. Cl.
*G06F 7/00* (2006.01)
*G06F 16/172* (2019.01)
(Continued)

(52) U.S. Cl.
CPC ........ *G06F 16/1774* (2019.01); *G06F 16/172* (2019.01); *G06F 16/182* (2019.01)

(58) Field of Classification Search
None
See application file for complete search history.

(56) References Cited

U.S. PATENT DOCUMENTS 5,165,031 A 11/1992 Pruul et al.
5,283,875 A 2/1994 Gibson et al.
(Continued)

FOREIGN PATENT DOCUMENTS

CN 101689141 A 3/2010
CN 116647491 A 8/2023
(Continued)

OTHER PUBLICATIONS

International Search Report and Written Opinion for International Patent Application No. PCT/US2025/036658 mailed Oct. 14, 2025, 13 Pages.

(Continued)

*Primary Examiner* — Tuan A Pham
(74) *Attorney, Agent, or Firm* — John W. Branch; Branch Partners PLLC

(57) ABSTRACT

Embodiments are directed to managing data in a file system. In response to a request from a client of a spoke file system to access file system items shared by a hub file system: determining a portion of the spoke file systems that may have an existing lock on the file system items; obtaining log entries from the portion of the spoke file systems such that the log entries are associated with commands that were executed in the portion of the spoke file systems; executing the commands in the hub file system to update the file system items in the hub file system; granting a lock on the file system items in the hub file system that enables the client to access the updated file system items from the spoke file systems.

20 Claims, 25 Drawing Sheets

(51) Int. Cl.

| | |
|---|---|
| ***G06F 16/176*** | (2019.01) |
| ***G06F 16/182*** | (2019.01) |
| ***G06F 17/00*** | (2019.01) |

(56) References Cited

U.S. PATENT DOCUMENTS

| | | | |
|---|---|---|---|
| 5,319,773 | A | 6/1994 | Britton et al. |
| 5,410,684 | A | 4/1995 | Ainsworth et al. |
| 5,410,719 | A | 4/1995 | Shackleford |
| 5,442,561 | A | 8/1995 | Yoshizawa et al. |
| 5,953,719 | A | 9/1999 | Kleewein et al. |
| 6,049,809 | A | 4/2000 | Raman et al. |
| 6,236,996 | B1 | 5/2001 | Bapat et al. |
| 6,385,641 | B1 | 5/2002 | Jiang et al. |
| 6,415,283 | B1 | 7/2002 | Conklin |
| 6,496,944 | B1 | 12/2002 | Hsiao et al. |
| 6,529,998 | B1 | 3/2003 | Yochai et al. |
| 6,560,615 | B1 | 5/2003 | Zayas et al. |
| 6,772,435 | B1 | 8/2004 | Thexton et al. |
| 6,874,130 | B1 | 3/2005 | Baweja et al. |
| 6,892,211 | B2 | 5/2005 | Hitz et al. |
| 6,965,903 | B1 | 11/2005 | Agarwal et al. |
| 6,965,936 | B1 | 11/2005 | Wipfel et al. |
| 7,072,911 | B1 | 7/2006 | Doman et al. |
| 7,165,158 | B1 | 1/2007 | Yagawa |
| 7,213,040 | B1 | 5/2007 | Stokes et al. |
| 7,330,948 | B2 | 2/2008 | Deguchi et al. |
| 7,467,333 | B2 | 12/2008 | Keeton et al. |
| 7,594,138 | B2 | 9/2009 | Abdulvahid |
| 7,636,743 | B2 | 12/2009 | Erofeev |
| 7,693,876 | B2 | 4/2010 | Hackworth et al. |
| 7,757,056 | B1 | 7/2010 | Fair |
| 7,761,456 | B1 | 7/2010 | Cram et al. |
| 7,844,580 | B2 | 11/2010 | Srivastava et al. |
| 7,933,870 | B1 | 4/2011 | Webster |
| 7,937,421 | B2 | 5/2011 | Mikesell et al. |
| 7,956,293 | B2 | 6/2011 | Echigo et al. |
| 7,958,304 | B1 | 6/2011 | Goel et al. |
| 7,962,709 | B2 | 6/2011 | Agrawal |
| 7,966,293 | B1 | 6/2011 | Owara et al. |
| 8,027,827 | B2 | 9/2011 | Bitar et al. |
| 8,046,378 | B1 | 10/2011 | Zhuge et al. |
| 8,108,429 | B2 | 1/2012 | Sim-Tang et al. |
| 8,140,773 | B2 | 3/2012 | Saha et al. |
| 8,296,312 | B1 | 10/2012 | Leung et al. |
| 8,341,540 | B1 | 12/2012 | Haynes et al. |
| 8,353,044 | B1 | 1/2013 | Jones et al. |
| 8,355,407 | B2 | 1/2013 | Wookey et al. |
| 8,364,648 | B1 | 1/2013 | Sim-Tang |
| 8,423,733 | B1 | 4/2013 | Ozdemir |
| 8,423,821 | B1 | 4/2013 | Keith, Jr. |
| 8,448,170 | B2 | 5/2013 | Wipfel et al. |
| 8,463,825 | B1 | 6/2013 | Harty et al. |
| 8,489,656 | B2 | 7/2013 | Erofeev |
| 8,504,733 | B1 | 8/2013 | Iyer et al. |
| 8,515,911 | B1 | 8/2013 | Zhou et al. |
| 8,612,404 | B2 | 12/2013 | Bone et al. |
| 8,612,488 | B1 | 12/2013 | Subramanya et al. |
| 8,645,323 | B2 | 2/2014 | Jackiewicz et al. |
| 8,661,447 | B1 | 2/2014 | Olliff et al. |
| 8,725,691 | B1 | 5/2014 | Natanzon |
| 8,776,050 | B2 | 7/2014 | Plouffe et al. |
| 8,782,655 | B2 | 7/2014 | Blanding et al. |
| 8,805,786 | B1 | 8/2014 | Natanzon |
| 8,806,154 | B1 | 8/2014 | Gupta et al. |
| 8,838,887 | B1 | 9/2014 | Burke et al. |
| 8,838,931 | B1 | 9/2014 | Marshak et al. |
| 8,849,754 | B2 | 9/2014 | Craggs |
| 8,849,764 | B1 | 9/2014 | Long et al. |
| 8,849,809 | B1 | 9/2014 | Seshadri |
| 8,868,797 | B1 | 10/2014 | Kirac et al. |
| 8,924,364 | B1 | 12/2014 | Zhong et al. |
| 8,972,694 | B1 | 3/2015 | Dolan et al. |
| 9,015,214 | B2 | 4/2015 | Nishida et al. |
| 9,026,765 | B1 | 5/2015 | Marshak et al. |
| 9,031,994 | B1 | 5/2015 | Cao et al. |
| 9,032,170 | B2 | 5/2015 | Vaghani et al. |
| 9,047,017 | B1 | 6/2015 | Dolan et al. |
| 9,141,633 | B1 | 9/2015 | Li et al. |
| 9,143,379 | B1 | 9/2015 | Berger et al. |
| 9,158,653 | B2 | 10/2015 | Gold |
| 9,171,145 | B2 | 10/2015 | Dash et al. |
| 9,244,975 | B2 | 1/2016 | Das et al. |
| 9,244,976 | B1 | 1/2016 | Zhang et al. |
| 9,361,187 | B2 | 6/2016 | Jarvis |
| 9,384,252 | B2 | 7/2016 | Akirav et al. |
| 9,396,202 | B1 | 7/2016 | Drobychev et al. |
| 9,459,804 | B1 | 10/2016 | Natanzon et al. |
| 9,501,487 | B1 | 11/2016 | Yuan et al. |
| 9,519,664 | B1 | 12/2016 | Kharatishvili et al. |
| 9,547,560 | B1 | 1/2017 | Lee |
| 9,600,193 | B2 | 3/2017 | Ahrens et al. |
| 9,613,120 | B1 | 4/2017 | Kharatishvili et al. |
| 9,727,432 | B1 | 8/2017 | Cutforth et al. |
| 9,747,171 | B2 | 8/2017 | Beeken et al. |
| 9,753,782 | B2 | 9/2017 | Fang et al. |
| 9,753,932 | B1 | 9/2017 | Brow et al. |
| 9,753,987 | B1 | 9/2017 | Dolan et al. |
| 9,785,377 | B2 | 10/2017 | Shin et al. |
| 9,836,480 | B2 | 12/2017 | Okun et al. |
| 9,846,698 | B1 | 12/2017 | Panidis et al. |
| 10,073,856 | B1 | 9/2018 | Cooper et al. |
| 10,095,708 | B2 | 10/2018 | Passey et al. |
| 10,095,709 | B2 | 10/2018 | Okun et al. |
| 10,095,729 | B2 | 10/2018 | Taron et al. |
| 10,140,185 | B1 | 11/2018 | Lopez et al. |
| 10,162,980 | B1 | 12/2018 | Bernotavicius et al. |
| 10,261,868 | B2 | 4/2019 | Brown et al. |
| 10,275,493 | B1 | 4/2019 | Mostak |
| 10,303,561 | B2 | 5/2019 | Beeken et al. |
| 10,318,401 | B2 | 6/2019 | Rothschilds et al. |
| 10,318,494 | B2 | 6/2019 | Krasnow et al. |
| 10,339,101 | B1 | 7/2019 | Gupta |
| 10,346,355 | B2 | 7/2019 | Godman |
| 10,387,810 | B1 | 8/2019 | Kalush et al. |
| 10,409,784 | B1 | 9/2019 | Krasnow et al. |
| 10,423,609 | B1 | 9/2019 | Strauss |
| 10,437,509 | B1 | 10/2019 | Alexeev et al. |
| 10,447,779 | B2 | 10/2019 | Dieterich et al. |
| 10,459,884 | B1 | 10/2019 | Godman |
| 10,459,892 | B2 | 10/2019 | Godman et al. |
| 10,460,122 | B1 | 10/2019 | Kirby et al. |
| 10,474,635 | B1 | 11/2019 | Unger et al. |
| 10,534,758 | B1 | 1/2020 | Carpenter et al. |
| 10,540,662 | B2 | 1/2020 | Barlett et al. |
| 10,545,986 | B2 | 1/2020 | Tappan et al. |
| 10,552,373 | B2 | 2/2020 | Brow et al. |
| 10,606,812 | B2 | 3/2020 | Cooper et al. |
| 10,614,033 | B1 | 4/2020 | Rothschilds et al. |
| 10,614,241 | B1 | 4/2020 | Kirby et al. |
| 10,621,057 | B2 | 4/2020 | Tripathi et al. |
| 10,621,147 | B1 | 4/2020 | Liang et al. |
| 10,628,391 | B1 | 4/2020 | Bent et al. |
| 10,664,408 | B1 | 5/2020 | Chatterjee et al. |
| 10,678,663 | B1 | 6/2020 | Sharma et al. |
| 10,678,671 | B2 | 6/2020 | Rothschilds et al. |
| 10,725,977 | B1 | 7/2020 | Chmiel et al. |
| 10,795,796 | B1 | 10/2020 | Bai et al. |
| 10,860,372 | B1 | 12/2020 | Bai et al. |
| 10,860,414 | B1 | 12/2020 | Urban et al. |
| 10,860,546 | B2 | 12/2020 | Ye et al. |
| 10,860,547 | B2 | 12/2020 | Passey et al. |
| 10,877,942 | B2 | 12/2020 | Okun et al. |
| 10,936,538 | B1 | 3/2021 | Unger et al. |
| 10,936,551 | B1 | 3/2021 | Unger et al. |
| 10,938,650 | B1 | 3/2021 | Hermoni et al. |
| 10,938,661 | B1 | 3/2021 | Pignataro et al. |
| 11,023,535 | B1 | 6/2021 | Greenwood et al. |
| 11,132,126 | B1 | 9/2021 | Chmiel et al. |
| 11,132,336 | B2 | 9/2021 | Passey et al. |
| 11,150,823 | B2 | 10/2021 | Gao et al. |
| 11,151,001 | B2 | 10/2021 | Su et al. |
| 11,151,092 | B2 | 10/2021 | Chmiel et al. |
| 11,157,458 | B1 | 10/2021 | Carter et al. |

(56) References Cited

U.S. PATENT DOCUMENTS

| | | | |
|---|---|---|---|
| 11,249,907 | B1 | 2/2022 | Brewer |
| 11,256,682 | B2 | 2/2022 | Taron et al. |
| 11,265,262 | B1 | 3/2022 | Makie et al. |
| 11,290,425 | B2 | 3/2022 | Newell et al. |
| 11,294,604 | B1 | 4/2022 | McMullan et al. |
| 11,294,718 | B2 | 4/2022 | Bai et al. |
| 11,347,699 | B2 | 5/2022 | Carpenter et al. |
| 11,354,273 | B1 | 6/2022 | O'Neill et al. |
| 11,360,936 | B2 | 6/2022 | Haber et al. |
| 11,372,735 | B2 | 6/2022 | Su et al. |
| 11,372,819 | B1 | 6/2022 | Carter et al. |
| 11,435,901 | B1 | 9/2022 | Chmiel et al. |
| 11,461,241 | B2 | 10/2022 | Carpenter et al. |
| 11,461,286 | B2 | 10/2022 | Godman et al. |
| 11,567,660 | B2 | 1/2023 | Chmiel et al. |
| 11,599,508 | B1 | 3/2023 | Harward et al. |
| 11,630,832 | B2 | 4/2023 | Choi et al. |
| 11,669,255 | B2 | 6/2023 | Hansen et al. |
| 11,722,150 | B1 | 8/2023 | Fachan et al. |
| 11,729,269 | B1 | 8/2023 | Meernik et al. |
| 11,734,147 | B2 | 8/2023 | Bai et al. |
| 11,775,481 | B2 | 10/2023 | Unger et al. |
| 11,921,677 | B1 | 3/2024 | Kirby et al. |
| 11,934,660 | B1 | 3/2024 | McMullan et al. |
| 11,966,592 | B1 | 4/2024 | Bai |
| 12,019,875 | B1 | 6/2024 | McMullan et al. |
| 12,038,877 | B1 | 7/2024 | Kirby et al. |
| 12,222,903 | B1 | 2/2025 | Rothschilds et al. |
| 12,292,853 | B1 | 5/2025 | Ellis et al. |
| 12,346,290 | B2 | 7/2025 | Haber et al. |
| 12,443,559 | B2 | 10/2025 | Ellis et al. |
| 12,443,568 | B1 | 10/2025 | Bhageshpur et al. |
| 12,481,625 | B1 | 11/2025 | Bhageshpur et al. |
| 12,585,563 | B1 | 3/2026 | Cole et al. |
| 12,619,582 | B1 | 5/2026 | Rothschilds et al. |
| 2001/0039622 | A1 | 11/2001 | Hitz et al. |
| 2002/0059439 | A1 | 5/2002 | Arroyo et al. |
| 2002/0065835 | A1 | 5/2002 | Fujisaki |
| 2002/0083073 | A1 | 6/2002 | Vaidya et al. |
| 2002/0099691 | A1 | 7/2002 | Lore et al. |
| 2002/0178271 | A1 | 11/2002 | Graham et al. |
| 2003/0033308 | A1 | 2/2003 | Patel et al. |
| 2003/0145009 | A1 | 7/2003 | Forman et al. |
| 2003/0177379 | A1 | 9/2003 | Hori et al. |
| 2003/0182313 | A1 | 9/2003 | Federwisch et al. |
| 2004/0030727 | A1 | 2/2004 | Armangau et al. |
| 2004/0093474 | A1 | 5/2004 | Lin et al. |
| 2004/0098425 | A1 | 5/2004 | Wiss et al. |
| 2004/0153479 | A1 | 8/2004 | Mikesell et al. |
| 2004/0255048 | A1 | 12/2004 | Lev Ran et al. |
| 2005/0015674 | A1 | 1/2005 | Haugh |
| 2005/0027748 | A1 | 2/2005 | Kisley |
| 2005/0065986 | A1 | 3/2005 | Bixby et al. |
| 2005/0091663 | A1 | 4/2005 | Bagsby |
| 2005/0114593 | A1 | 5/2005 | Cassell et al. |
| 2005/0114726 | A1 | 5/2005 | Ouchi |
| 2005/0119996 | A1 | 6/2005 | Ohata et al. |
| 2005/0154866 | A1 | 7/2005 | Steely et al. |
| 2005/0182992 | A1 | 8/2005 | Land et al. |
| 2005/0187992 | A1 | 8/2005 | Prahlad et al. |
| 2005/0195660 | A1 | 9/2005 | Kavuri et al. |
| 2005/0223019 | A1 | 10/2005 | Das et al. |
| 2006/0004890 | A1 | 1/2006 | Semple et al. |
| 2006/0053139 | A1 | 3/2006 | Marzinski et al. |
| 2006/0089982 | A1 | 4/2006 | Abbott et al. |
| 2006/0090036 | A1 | 4/2006 | Zohar et al. |
| 2006/0123005 | A1 | 6/2006 | Burnett et al. |
| 2006/0173842 | A1 | 8/2006 | Horvitz et al. |
| 2006/0271604 | A1 | 11/2006 | Shoens |
| 2007/0005297 | A1 | 1/2007 | Beresniewicz et al. |
| 2007/0011302 | A1 | 1/2007 | Groner et al. |
| 2007/0027985 | A1 | 2/2007 | Ramany et al. |
| 2007/0061783 | A1 | 3/2007 | Prakash |
| 2007/0100855 | A1 | 5/2007 | T. Kohl |
| 2007/0106706 | A1 | 5/2007 | Ahrens et al. |
| 2007/0118561 | A1 | 5/2007 | Idicula et al. |
| 2007/0143371 | A1 | 6/2007 | Kottomtharayil et al. |
| 2008/0028006 | A1 | 1/2008 | Liu et al. |
| 2008/0059399 | A1 | 3/2008 | Delorme et al. |
| 2008/0059541 | A1 | 3/2008 | Fachan et al. |
| 2008/0082593 | A1 | 4/2008 | Komarov et al. |
| 2008/0162608 | A1 | 7/2008 | Torii et al. |
| 2008/0172366 | A1 | 7/2008 | Hannel et al. |
| 2008/0228772 | A1 | 9/2008 | Plamondon |
| 2008/0250357 | A1 | 10/2008 | Lee et al. |
| 2008/0256474 | A1 | 10/2008 | Chakra et al. |
| 2008/0270469 | A1 | 10/2008 | Myerson et al. |
| 2008/0270928 | A1 | 10/2008 | Chakra et al. |
| 2008/0282244 | A1 | 11/2008 | Wu et al. |
| 2008/0288306 | A1 | 11/2008 | MacIntyre et al. |
| 2008/0301256 | A1 | 12/2008 | McWilliams et al. |
| 2008/0313217 | A1 | 12/2008 | Dunsmore et al. |
| 2009/0077087 | A1 | 3/2009 | Urano et al. |
| 2009/0138500 | A1 | 5/2009 | Yuan et al. |
| 2009/0199190 | A1 | 8/2009 | Chen et al. |
| 2009/0222509 | A1 | 9/2009 | King et al. |
| 2009/0240539 | A1 | 9/2009 | Slawson et al. |
| 2009/0274047 | A1 | 11/2009 | Kruys et al. |
| 2009/0319566 | A1 | 12/2009 | Wald et al. |
| 2009/0327642 | A1 | 12/2009 | Ogihara et al. |
| 2010/0030825 | A1 | 2/2010 | Matsuzawa et al. |
| 2010/0036895 | A1 | 2/2010 | Boyd et al. |
| 2010/0088317 | A1 | 4/2010 | Bone et al. |
| 2010/0161557 | A1 | 6/2010 | Anderson et al. |
| 2010/0179959 | A1 | 7/2010 | Shoens |
| 2010/0217948 | A1 | 8/2010 | Mason et al. |
| 2010/0241668 | A1 | 9/2010 | Susanto et al. |
| 2010/0281214 | A1 | 11/2010 | Jernigan, IV |
| 2010/0287512 | A1 | 11/2010 | Gan et al. |
| 2011/0004914 | A1 | 1/2011 | Ennis et al. |
| 2011/0039622 | A1 | 2/2011 | Levenson |
| 2011/0066668 | A1 | 3/2011 | Guarraci |
| 2011/0082836 | A1 | 4/2011 | Wang et al. |
| 2011/0125799 | A1 | 5/2011 | Kandasamy et al. |
| 2011/0125973 | A1 | 5/2011 | Lev et al. |
| 2011/0153560 | A1* | 6/2011 | Bryant .................. G06F 16/182 707/610 |
| 2011/0161381 | A1 | 6/2011 | Wang et al. |
| 2011/0161964 | A1 | 6/2011 | Piazza et al. |
| 2011/0196833 | A1 | 8/2011 | Drobychev et al. |
| 2011/0196899 | A1 | 8/2011 | Hughes et al. |
| 2011/0202925 | A1 | 8/2011 | Banerjee et al. |
| 2011/0246724 | A1 | 10/2011 | Marathe et al. |
| 2011/0302357 | A1 | 12/2011 | Sullivan |
| 2012/0036463 | A1 | 2/2012 | Krakovsky et al. |
| 2012/0066179 | A1 | 3/2012 | Saika |
| 2012/0096059 | A1 | 4/2012 | Shimizu et al. |
| 2012/0116478 | A1 | 5/2012 | Buhlmann et al. |
| 2012/0136843 | A1 | 5/2012 | Bone et al. |
| 2012/0151438 | A1 | 6/2012 | Bach et al. |
| 2012/0166478 | A1 | 6/2012 | Das et al. |
| 2012/0179886 | A1 | 7/2012 | Prahlad et al. |
| 2012/0204060 | A1 | 8/2012 | Swift et al. |
| 2012/0216005 | A1 | 8/2012 | Naito et al. |
| 2012/0317079 | A1 | 12/2012 | Shoens et al. |
| 2013/0019072 | A1 | 1/2013 | Strasser et al. |
| 2013/0024609 | A1 | 1/2013 | Gorobets et al. |
| 2013/0031232 | A1 | 1/2013 | Clymer et al. |
| 2013/0073819 | A1 | 3/2013 | Havewala et al. |
| 2013/0086121 | A1 | 4/2013 | Preslan |
| 2013/0091168 | A1 | 4/2013 | Bhave et al. |
| 2013/0103778 | A1 | 4/2013 | Hayashi et al. |
| 2013/0110787 | A1 | 5/2013 | Garimella et al. |
| 2013/0145471 | A1 | 6/2013 | Richard et al. |
| 2013/0191355 | A1 | 7/2013 | Bone et al. |
| 2013/0212579 | A1 | 8/2013 | Ben-Shaul et al. |
| 2013/0227236 | A1 | 8/2013 | Flynn et al. |
| 2013/0254163 | A1 | 9/2013 | Savage et al. |
| 2013/0268650 | A1 | 10/2013 | Faitelson et al. |
| 2013/0275391 | A1 | 10/2013 | Batwara et al. |
| 2013/0304903 | A1 | 11/2013 | Mick et al. |
| 2013/0310726 | A1* | 11/2013 | Miller .................... G16H 20/40 717/173 |
| 2013/0311454 | A1 | 11/2013 | Ezzat |

(56) References Cited

U.S. PATENT DOCUMENTS

| | | | |
|---|---|---|---|
| 2013/0318194 | A1 | 11/2013 | Timbs |
| 2013/0325806 | A1 | 12/2013 | Bachar et al. |
| 2013/0325808 | A1 | 12/2013 | Bachar et al. |
| 2013/0339406 | A1 | 12/2013 | Kanfi |
| 2014/0006354 | A1 | 1/2014 | Parkison et al. |
| 2014/0040199 | A1 | 2/2014 | Golab et al. |
| 2014/0040693 | A1 | 2/2014 | Kim et al. |
| 2014/0059158 | A1 | 2/2014 | Chen et al. |
| 2014/0089278 | A1 | 3/2014 | Lovinger et al. |
| 2014/0089649 | A1 | 3/2014 | Chaganti |
| 2014/0095249 | A1 | 4/2014 | Tarakad et al. |
| 2014/0095505 | A1 | 4/2014 | Blanchflower et al. |
| 2014/0095560 | A1 | 4/2014 | Ikai et al. |
| 2014/0095582 | A1 | 4/2014 | Eshel et al. |
| 2014/0101389 | A1 | 4/2014 | Nellans et al. |
| 2014/0156956 | A1 | 6/2014 | Ezra |
| 2014/0181441 | A1 | 6/2014 | Kottomtharayil et al. |
| 2014/0189257 | A1 | 7/2014 | Aritome |
| 2014/0189267 | A1 | 7/2014 | Qi et al. |
| 2014/0195847 | A1 | 7/2014 | Webman et al. |
| 2014/0237193 | A1 | 8/2014 | Shivashankaraiah |
| 2014/0258609 | A1 | 9/2014 | Cui et al. |
| 2014/0258657 | A1 | 9/2014 | Schott et al. |
| 2014/0280485 | A1 | 9/2014 | A Hummaida et al. |
| 2014/0280889 | A1 | 9/2014 | Nispel et al. |
| 2014/0281307 | A1 | 9/2014 | Peterson et al. |
| 2014/0281411 | A1 | 9/2014 | Abdallah |
| 2014/0344222 | A1 | 11/2014 | Morris et al. |
| 2014/0358356 | A1 | 12/2014 | Jones et al. |
| 2014/0372384 | A1 | 12/2014 | Long et al. |
| 2014/0372607 | A1 | 12/2014 | Gladwin et al. |
| 2014/0373032 | A1 | 12/2014 | Merry et al. |
| 2015/0006226 | A1 | 1/2015 | Smith et al. |
| 2015/0012656 | A1 | 1/2015 | Phillips et al. |
| 2015/0012666 | A1 | 1/2015 | Pannese et al. |
| 2015/0067086 | A1 | 3/2015 | Adriaens et al. |
| 2015/0067142 | A1 | 3/2015 | Renkema |
| 2015/0074683 | A1 | 3/2015 | Singh et al. |
| 2015/0106145 | A1 | 4/2015 | Hamilton et al. |
| 2015/0135331 | A1 | 5/2015 | Das |
| 2015/0143026 | A1 | 5/2015 | Reddy et al. |
| 2015/0149736 | A1 | 5/2015 | Kwon et al. |
| 2015/0186217 | A1 | 7/2015 | Eslami Sarab |
| 2015/0186410 | A1 | 7/2015 | Petculescu et al. |
| 2015/0186483 | A1 | 7/2015 | Tappan et al. |
| 2015/0186527 | A1 | 7/2015 | Rao et al. |
| 2015/0186529 | A1 | 7/2015 | Rope et al. |
| 2015/0193317 | A1 | 7/2015 | Firley |
| 2015/0193347 | A1 | 7/2015 | Kluesing et al. |
| 2015/0215405 | A1 | 7/2015 | Baek et al. |
| 2015/0234716 | A1 | 8/2015 | Brooker et al. |
| 2015/0234879 | A1 | 8/2015 | Baldwin et al. |
| 2015/0242263 | A1 | 8/2015 | Klose |
| 2015/0248253 | A1 | 9/2015 | Kim et al. |
| 2015/0269203 | A1 | 9/2015 | Baldwin et al. |
| 2015/0278282 | A1 | 10/2015 | Sardina et al. |
| 2015/0278329 | A1 | 10/2015 | Hrle et al. |
| 2015/0310034 | A1 | 10/2015 | Godman et al. |
| 2015/0310035 | A1 | 10/2015 | Godman et al. |
| 2015/0310054 | A1 | 10/2015 | Passey et al. |
| 2015/0347126 | A1 | 12/2015 | Tibble et al. |
| 2016/0034356 | A1 | 2/2016 | Aron et al. |
| 2016/0034481 | A1 | 2/2016 | Kumarasamy et al. |
| 2016/0071233 | A1 | 3/2016 | Macko et al. |
| 2016/0110105 | A1 | 4/2016 | Karamcheti et al. |
| 2016/0132364 | A1 | 5/2016 | Huang et al. |
| 2016/0139836 | A1 | 5/2016 | Nallathambi et al. |
| 2016/0139952 | A1 | 5/2016 | Geng et al. |
| 2016/0147654 | A1 | 5/2016 | Zhao et al. |
| 2016/0164916 | A1 | 6/2016 | Satish et al. |
| 2016/0224430 | A1 | 8/2016 | Long et al. |
| 2016/0239185 | A1 | 8/2016 | Balimidi et al. |
| 2016/0246816 | A1 | 8/2016 | Abiri et al. |
| 2016/0269501 | A1 | 9/2016 | Usgaonkar et al. |
| 2016/0292013 | A1 | 10/2016 | Li et al. |
| 2016/0292429 | A1 | 10/2016 | Manville et al. |
| 2016/0306810 | A1 | 10/2016 | Ni et al. |
| 2016/0314046 | A1 | 10/2016 | Kumarasamy |
| 2016/0335278 | A1 | 11/2016 | Tabaaloute et al. |
| 2016/0350363 | A1 | 12/2016 | Raja et al. |
| 2016/0357677 | A1 | 12/2016 | Hooker et al. |
| 2016/0359859 | A1 | 12/2016 | Capone |
| 2016/0371296 | A1 | 12/2016 | Passey et al. |
| 2016/0371297 | A1 | 12/2016 | Okun et al. |
| 2016/0380878 | A1 | 12/2016 | Bugenhagen et al. |
| 2016/0380913 | A1 | 12/2016 | Morgan et al. |
| 2017/0024152 | A1 | 1/2017 | Bhagi et al. |
| 2017/0032006 | A1 | 2/2017 | Anglin et al. |
| 2017/0046143 | A1 | 2/2017 | Kochhar et al. |
| 2017/0052898 | A1 | 2/2017 | Ash et al. |
| 2017/0078164 | A1 | 3/2017 | Hildebrand et al. |
| 2017/0091046 | A1 | 3/2017 | Bangalore et al. |
| 2017/0118287 | A1 | 4/2017 | Beck |
| 2017/0123883 | A1 | 5/2017 | Hall |
| 2017/0123935 | A1 | 5/2017 | Pandit et al. |
| 2017/0163728 | A1 | 6/2017 | Chawla et al. |
| 2017/0201582 | A1 | 7/2017 | Zhang et al. |
| 2017/0206231 | A1 | 7/2017 | Binder et al. |
| 2017/0270180 | A1 | 9/2017 | State |
| 2017/0286455 | A1 | 10/2017 | Li et al. |
| 2017/0316321 | A1 | 11/2017 | Whitney et al. |
| 2017/0336983 | A1 | 11/2017 | Roh et al. |
| 2017/0344598 | A1 | 11/2017 | Constantinescu et al. |
| 2017/0344905 | A1 | 11/2017 | Hack et al. |
| 2017/0366609 | A1 | 12/2017 | Dieterich et al. |
| 2018/0040029 | A1 | 2/2018 | Zeng et al. |
| 2018/0059946 | A1 | 3/2018 | Kunii et al. |
| 2018/0089031 | A1 | 3/2018 | Mitkar et al. |
| 2018/0101546 | A1 | 4/2018 | Krasnow et al. |
| 2018/0129443 | A1 | 5/2018 | Karve et al. |
| 2018/0165300 | A1 | 6/2018 | Okun et al. |
| 2018/0165321 | A1 | 6/2018 | Taron et al. |
| 2018/0176082 | A1 | 6/2018 | Katz et al. |
| 2018/0176120 | A1 | 6/2018 | Katz et al. |
| 2018/0181583 | A1 | 6/2018 | Godman |
| 2018/0203798 | A1 | 7/2018 | Hughes et al. |
| 2018/0232386 | A1 | 8/2018 | Brow et al. |
| 2018/0276078 | A1 | 9/2018 | Blea et al. |
| 2018/0288057 | A1 | 10/2018 | Varadamma et al. |
| 2018/0307579 | A1 | 10/2018 | Rothchilds et al. |
| 2018/0314423 | A1 | 11/2018 | Gong et al. |
| 2018/0357291 | A1 | 12/2018 | Choi et al. |
| 2018/0365115 | A1 | 12/2018 | Fang et al. |
| 2019/0087770 | A1 | 3/2019 | Walsh et al. |
| 2019/0088153 | A1* | 3/2019 | Bader-Natal ........... H04N 7/147 |
| 2019/0095112 | A1 | 3/2019 | Lingarajappa |
| 2019/0102700 | A1 | 4/2019 | Babu et al. |
| 2019/0163589 | A1 | 5/2019 | Mcbride et al. |
| 2019/0163591 | A1 | 5/2019 | Ouyang et al. |
| 2019/0196879 | A1 | 6/2019 | Dutta et al. |
| 2019/0212921 | A1 | 7/2019 | Liang et al. |
| 2019/0220189 | A1 | 7/2019 | Yang et al. |
| 2019/0243818 | A1 | 8/2019 | Taron et al. |
| 2019/0251065 | A1 | 8/2019 | Passey et al. |
| 2019/0251066 | A1 | 8/2019 | Okun et al. |
| 2019/0286521 | A1 | 9/2019 | Okpotse et al. |
| 2019/0286528 | A1 | 9/2019 | Wu et al. |
| 2019/0286543 | A1 | 9/2019 | Rothschilds et al. |
| 2019/0294591 | A1 | 9/2019 | Krasnow et al. |
| 2019/0311049 | A1 | 10/2019 | Bhargava et al. |
| 2019/0332576 | A1 | 10/2019 | Godman |
| 2019/0332579 | A1 | 10/2019 | Cooper et al. |
| 2019/0377802 | A1 | 12/2019 | Haber et al. |
| 2019/0384640 | A1 | 12/2019 | Swamy et al. |
| 2019/0392051 | A1 | 12/2019 | Damyanov et al. |
| 2020/0004977 | A1 | 1/2020 | Araujo et al. |
| 2020/0026438 | A1 | 1/2020 | Peleg et al. |
| 2020/0034077 | A1 | 1/2020 | Haravu et al. |
| 2020/0050391 | A1 | 2/2020 | Meyerowitz et al. |
| 2020/0125493 | A1 | 4/2020 | Bent et al. |
| 2020/0142878 | A1 | 5/2020 | Varadarajan et al. |
| 2020/0174692 | A1 | 6/2020 | Dave et al. |
| 2020/0201824 | A1 | 6/2020 | Nishimoto et al. |
| 2020/0210385 | A1 | 7/2020 | Carpenter et al. |

(56) References Cited

U.S. PATENT DOCUMENTS

| | | | |
|---|---|---|---|
| 2020/0242075 | A1 | 7/2020 | Davis et al. |
| 2020/0242082 | A1 | 7/2020 | Chmiel et al. |
| 2020/0286270 | A1 | 9/2020 | Lymperopoulos et al. |
| 2020/0341689 | A1 | 10/2020 | Smith |
| 2020/0387315 | A1 | 12/2020 | Sterns et al. |
| 2020/0396287 | A1 | 12/2020 | Kasi et al. |
| 2020/0409583 | A1 | 12/2020 | Kusters et al. |
| 2020/0409932 | A1 | 12/2020 | Weizman |
| 2021/0004355 | A1 | 1/2021 | Iwase |
| 2021/0042263 | A1 | 2/2021 | Zdornov et al. |
| 2021/0042282 | A1 | 2/2021 | Cseri et al. |
| 2021/0049208 | A1 | 2/2021 | Dowd et al. |
| 2021/0056074 | A1 | 2/2021 | Zhu |
| 2021/0110150 | A1 | 4/2021 | Kakrana et al. |
| 2021/0117868 | A1 | 4/2021 | Sriharsha |
| 2021/0132824 | A1 | 5/2021 | Furuta et al. |
| 2021/0173588 | A1 | 6/2021 | Kannan et al. |
| 2021/0191650 | A1 | 6/2021 | Vansteenkiste et al. |
| 2021/0232427 | A1 | 7/2021 | Bai et al. |
| 2021/0232464 | A1 | 7/2021 | Su et al. |
| 2021/0232481 | A1 | 7/2021 | Bai et al. |
| 2021/0240393 | A1 | 8/2021 | Jo et al. |
| 2021/0240678 | A1 | 8/2021 | Patel et al. |
| 2021/0279187 | A1 | 9/2021 | Puder et al. |
| 2021/0311841 | A1 | 10/2021 | McNutt |
| 2021/0374105 | A1 | 12/2021 | Kodama et al. |
| 2022/0019361 | A1 | 1/2022 | Kurata et al. |
| 2022/0035716 | A1 | 2/2022 | Su et al. |
| 2022/0035831 | A1 | 2/2022 | Beers |
| 2022/0058055 | A1 | 2/2022 | Amemiya et al. |
| 2022/0066882 | A1 | 3/2022 | Wang et al. |
| 2022/0091739 | A1 | 3/2022 | Kumar et al. |
| 2022/0100705 | A1 | 3/2022 | Unger et al. |
| 2022/0107729 | A1 | 4/2022 | Hua |
| 2022/0124152 | A1 | 4/2022 | Gallego et al. |
| 2022/0138150 | A1 | 5/2022 | Chmiel et al. |
| 2022/0283956 | A1 | 9/2022 | Carpenter et al. |
| 2022/0300155 | A1 | 9/2022 | Chmiel et al. |
| 2022/0300159 | A1 | 9/2022 | Chmiel et al. |
| 2023/0004312 | A1 | 1/2023 | Hansen et al. |
| 2023/0057068 | A1 | 2/2023 | Bhandarkar et al. |
| 2023/0057600 | A1 | 2/2023 | Malley et al. |
| 2023/0069434 | A1 | 3/2023 | Cheng et al. |
| 2023/0106208 | A1 | 4/2023 | Nossenson et al. |
| 2023/0342053 | A1 | 10/2023 | Varghese et al. |
| 2024/0020268 | A1 | 1/2024 | Haber et al. |
| 2024/0028596 | A1 | 1/2024 | Lakshman et al. |
| 2024/0184766 | A1 | 6/2024 | Ng et al. |
| 2025/0147924 | A1 | 5/2025 | Ellis et al. |
| 2025/0245193 | A1 | 7/2025 | Ellis et al. |

FOREIGN PATENT DOCUMENTS

| | | | |
|---|---|---|---|
| DE | 69915462 | T2 | 3/2005 |
| EP | 1217551 | A2 | 6/2002 |
| EP | 1498829 | A1 | 1/2005 |
| EP | 3311312 | A1 | 12/2016 |
| EP | 3333732 | A1 | 6/2018 |
| EP | 3361397 | A1 | 8/2018 |
| EP | 3361397 | B1 | 11/2020 |
| EP | 3333732 | B1 | 3/2023 |
| WO | 99/44145 | A1 | 9/1999 |
| WO | 00/72201 | A1 | 11/2000 |
| WO | 2009/007250 | A2 | 1/2009 |
| WO | 2012/029259 | A1 | 3/2012 |
| WO | 2016/205752 | A1 | 12/2016 |
| WO | 2021/151107 | A1 | 7/2021 |
| WO | 2021/189055 | A2 | 9/2021 |
| WO | 2025/101416 | A1 | 5/2025 |
| WO | 2025/101465 | A1 | 5/2025 |
| WO | 2026/035377 | A1 | 2/2026 |

OTHER PUBLICATIONS

Office Communication for U.S. Appl. No. 17/062,500 mailed Jun. 13, 2023, 8 Pages.

Office Communication for U.S. Appl. No. 18/070,705 mailed Jun. 20, 2023, 16 Pages.

Office Communication for U.S. Appl. No. 18/070,705 mailed Feb. 23, 2023, 14 Pages.

Office Communication for U.S. Appl. No. 17/062,500 mailed Feb. 27, 2023, 23 Pages.

Office Communication for U.S. Appl. No. 17/954,640 mailed Mar. 15, 2023, 9 Pages.

Office Communication for U.S. Appl. No. 17/864,190 mailed Apr. 28, 2023, 5 Pages.

Office Communication for U.S. Appl. No. 17/973,944 mailed May 10, 2023, 9 Pages.

Office Communication for U.S. Appl. No. 17/115,529 mailed May 22, 2023, 25 Pages.

Office Communication for U.S. Appl. No. 17/864,190 mailed Jan. 24, 2023, 12 Pages.

Office Communication for U.S. Appl. No. 17/588,120 mailed Feb. 1, 2023, 15 Pages.

Office Communication for U.S. Appl. No. 17/864,190 mailed Sep. 19, 2022, 10 Pages.

Office Communication for U.S. Appl. No. 17/062,500 mailed Oct. 5, 2022, 4 Pages.

Office Communication for U.S. Appl. No. 17/203,452 mailed Oct. 19, 2022, 9 Pages.

Office Communication for U.S. Appl. No. 17/588,120 mailed Oct. 21, 2022, 5 Pages.

Office Communication for U.S. Appl. No. 17/203,452 mailed Nov. 9, 2022, 2 Pages.

Office Communication for U.S. Appl. No. 17/588,895 mailed Nov. 9, 2022, 11 Pages.

Office Communication for U.S. Appl. No. 17/954,640 mailed Nov. 30, 2022, 10 Pages.

Office Communication for U.S. Appl. No. 17/115,529 mailed Dec. 9, 2022, 21 Pages.

Office Communication for U.S. Appl. No. 17/484,167 mailed May 17, 2022, 3 Pages.

Office Communication for U.S. Appl. No. 17/484,167 mailed Jun. 10, 2022, 5 Pages.

Office Communication for U.S. Appl. No. 17/203,452 mailed Jun. 22, 2022, 22 Pages.

Office Communication for U.S. Appl. No. 14/595,598 mailed Jul. 13, 2022, 9 Pages.

Office Communication for U.S. Appl. No. 17/062,500 mailed Jul. 26, 2022, 20 Pages.

Office Communication for U.S. Appl. No. 17/588,120 mailed Jul. 27, 2022, 34 Pages.

Office Communication for U.S. Appl. No. 17/190,653 mailed Aug. 2, 2022, 8 Pages.

Office Communication for U.S. Appl. No. 17/115,529 mailed Aug. 8, 2022, 21 Pages.

Office Communication for U.S. Appl. No. 17/588,895 mailed Aug. 12, 2022, 12 Pages.

Office Communication for U.S. Appl. No. 17/203,452 mailed Sep. 8, 2022, 4 Pages.

Office Communication for U.S. Appl. No. 17/504,289 mailed Mar. 28, 2022, 9 Pages.

Office Communication for U.S. Appl. No. 17/588,120 mailed Apr. 11, 2022, 36 Pages.

Office Communication for U.S. Appl. No. 17/588,895 mailed Apr. 27, 2022, 6 Pages.

Office Communication for U.S. Appl. No. 17/190,653 mailed Apr. 28, 2022, 13 Pages.

Office Communication for U.S. Appl. No. 17/510,043 mailed Apr. 29, 2022, 10 Pages.

Office Communication for U.S. Appl. No. 17/115,529 mailed Apr. 29, 2022, 4 Pages.

Office Communication for U.S. Appl. No. 17/190,653 mailed Dec. 21, 2021, 12 Pages.

Office Communication for U.S. Appl. No. 14/595,598 mailed Dec. 29, 2021, 19 Pages.

(56) References Cited

OTHER PUBLICATIONS

Office Communication for U.S. Appl. No. 17/062,500 mailed Jan. 7, 2022, 4 Pages.
Office Communication for U.S. Appl. No. 16/741,567 mailed Jan. 11, 2022, 6 Pages.
Office Communication for U.S. Appl. No. 17/203,452 mailed Jan. 14, 2022, 4 Pages.
Office Communication for U.S. Appl. No. 17/510,043 mailed Jan. 21, 2022, 13 Pages.
Office Communication for U.S. Appl. No. 16/741,567 mailed Feb. 7, 2022, 8 Pages.
Office Communication for U.S. Appl. No. 17/530,420 mailed Feb. 10, 2022, 24 Pages.
Office Communication for U.S. Appl. No. 16/004,182 mailed Feb. 18, 2022, 11 Pages.
Office Communication for U.S. Appl. No. 17/115,529 mailed Feb. 18, 2022, 20 Pages.
Office Communication for U.S. Appl. No. 17/203,452 mailed Feb. 24, 2022, 14 Pages.
Office Communication for U.S. Appl. No. 17/484,167 mailed Mar. 11, 2022, 11 Pages.
Office Communication for U.S. Appl. No. 17/062,500 mailed Mar. 22, 2022, 19 Pages.
Office Communication for U.S. Appl. No. 16/152,277 mailed Oct. 18, 2021, 5 Pages.
International Search Report and Written Opinion for International Patent Application No. PCT/US2021/023525 mailed Oct. 12, 2021, 6 Pages.
Office Communication for U.S. Appl. No. 17/115,529 mailed Oct. 22, 2021, 20 Pages.
Office Communication for U.S. Appl. No. 18/945,379 mailed Jun. 4, 2025, 8 Pages.
Office Communication for U.S. Appl. No. 18/945,379 mailed Jun. 11, 2025, 5 Pages.
Office Communication for U.S. Appl. No. 18/945,343 mailed Jun. 25, 2025, 20 Pages.
Office Communication for U.S. Appl. No. 19/183,475 mailed Jun. 6, 2025, 18 Pages.
Office Communication for U.S. Appl. No. 17/062,500 mailed Oct. 27, 2021, 17 Pages.
Office Communication for U.S. Appl. No. 14/595,598 mailed Oct. 28, 2021, 6 Pages.
Office Communication for U.S. Appl. No. 16/741,567 mailed Oct. 28, 2021, 11 Pages.
Office Communication for U.S. Appl. No. 17/203,452 mailed Nov. 2, 2021, 13 Pages.
Office Communication for U.S. Appl. No. 17/190,653 mailed Nov. 10, 2021, 6 Pages.
Office Communication for U.S. Appl. No. 17/484,167 mailed Nov. 18, 2021, 15 Pages.
Office Communication for U.S. Appl. No. 17/504,289 mailed Dec. 7, 2021, 15 Pages.
Office Communication for U.S. Appl. No. 17/114,384 mailed Dec. 14, 2021, 7 Pages.
Office Communication for U.S. Appl. No. 16/226,587 mailed Aug. 5, 2019, 46 Pages.
Office Communication for U.S. Appl. No. 16/228,716 mailed Jun. 24, 2019, 10 Pages.
Office Communication for U.S. Appl. No. 16/231,354 mailed Jul. 10, 2019, 8 Pages.
Office Communication for U.S. Appl. No. 16/262,756 mailed Aug. 5, 2019, 35 Pages.
Office Communication for U.S. Appl. No. 15/967,499 mailed Jun. 27, 2018, 16 Pages.
Office Communication for U.S. Appl. No. 16/226,587 mailed Feb. 25, 2019, 43 Pages.
Office Communication for U.S. Appl. No. 16/228,716 mailed Feb. 28, 2019, 15 Pages.
Office Communication for U.S. Appl. No. 16/231,354 mailed Mar. 25, 2019, 10 Pages.
Office Communication for U.S. Appl. No. 16/262,756 mailed Apr. 2, 2019, 29 Pages.
Office Communication for U.S. Appl. No. 16/262,790 maned Aug. 23, 2019, 16 Pages.
Office Communication for U.S. Appl. No. 16/262,790 mailed Apr. 18, 2019, 14 Pages.
Office Communication for U.S. Appl. No. 16/262,756 mailed Oct. 25, 2019, 4 Pages.
Office Communication for U.S. Appl. No. 16/659,488 mailed Dec. 30, 2019, 6 Pages.
Office Communication for U.S. Appl. No. 14/595,598 mailed Dec. 31, 2019, 16 Pages.
Office Communication for U.S. Appl. No. 16/004,208 mailed Aug. 27, 2018, 11 Pages.
Office Communication for U.S. Appl. No. 16/234,395 mailed Aug. 8, 2019, 10 Pages.
Office Communication for U.S. Appl. No. 16/234,334 mailed Apr. 5, 2019, 15 Pages.
Office Communication for U.S. Appl. No. 16/234,395 mailed Mar. 28, 2019, 10 Pages.
Kappes, Giorgos et al., "Dike: Virtualization-awarn Access Control for Multitenant Filesystems", Feb. 18, 2013, pp. 1-6.
Hitz, Dave et al., "Merging NT and UNIX filesystem Permissions", Proceedings of the 2nd USENIX Windows NT Symposium, Seattle, Washington, Aug. 3-4, 1998, pp. 1-10.
Office Communication for U.S. Appl. No. 15/473,051 mailed Jun. 30, 2017, 23 Pages.
Extended European Search Report for European Patent Application No. 18155779.4 mailed Apr. 17, 2018, 15 Pages.
Office Communication for U.S. Appl. No. 16/004,182 mailed Aug. 23, 2018, 43 Pages.
Office Communication for U.S. Appl. No. 16/004,182 mailed Mar. 5, 2019, 46 Pages.
Office Communication for U.S. Appl. No. 16/004,182 mailed Jul. 3, 2019, 45 Pages.
Office Communication for U.S. Appl. No. 15/694,604 mailed Jun. 3, 2019, 8 Pages.
Office Communication for U.S. Appl. No. 16/004,182 mailed May 22, 2019, 4 Pages.
Office Communication for U.S. Appl. No. 14/595,043 mailed May 4, 2017, 30 Pages.
Office Communication for U.S. Appl. No. 14/595,043 mailed Feb. 23, 2018, 16 Pages.
Office Communication for U.S. Appl. No. 14/595,043 mailed May 25, 2018, 7 Pages.
Office Communication for U.S. Appl. No. 14/595,043 mailed Oct. 5, 2018, 17 Pages.
Office Communication for U.S. Appl. No. 14/595,043 mailed Jun. 7, 2019, 19 Pages.
Office Communication for U.S. Appl. No. 14/595,043 mailed Aug. 27, 2019, 17 Pages.
Office Communication for U.S. Appl. No. 14/658,015 mailed Apr. 27, 2017, 7 Pages.
Office Communication for U.S. Appl. No. 14/658,015 mailed Jan. 4, 2018, 28 Pages.
Office Communication for U.S. Appl. No. 14/658,015 mailed Jul. 13, 2018, 8 Pages.
Office Communication for U.S. Appl. No. 14/859,061 mailed Sep. 22, 2017, 16 Pages.
Office Communication for U.S. Appl. No. 15/831,236 mailed Mar. 30, 2018, 8 Pages.
Office Communication for U.S. Appl. No. 15/831,236 mailed Aug. 15, 2018, 14 Pages.
Office Communication for U.S. Appl. No. 14/859,114 mailed Jul. 24, 2017, 41 Pages.
Office Communication for U.S. Appl. No. 14/859,114 mailed Feb. 21, 2018, 25 Pages.
Office Communication for U.S. Appl. No. 14/859,114 mailed May 11, 2018, 5 Pages.
International Search Report and Written Opinion for International Patent Application No. PCT/US2021/023531 mailed Jul. 6, 2021, 6 Pages.

(56) References Cited

OTHER PUBLICATIONS

Office Communication for U.S. Appl. No. 17/062,500 mailed Jul. 12, 2021, 18 Pages.
Office Communication for U.S. Appl. No. 16/775,041 mailed Jul. 21, 2021, 11 Pages.
Office Communication for U.S. Appl. No. 17/114,384 mailed Aug. 3, 2021, 4 Pages.
Office Communication for U.S. Appl. No. 14/595,598 mailed Aug. 6, 2021, 20 Pages.
Office Communication for U.S. Appl. No. 17/115,529 mailed Aug. 12, 2021, 4 Pages.
Office Communication for U.S. Appl. No. 17/190,653 mailed Aug. 27, 2021, 11 Pages.
Office Communication for U.S. Appl. No. 17/114,384 mailed Sep. 2, 2021, 5 Pages.
Office Communication for U.S. Appl. No. 16/152,277 mailed Sep. 3, 2021, 4 Pages.
Office Communication for U.S. Appl. No. 16/004,182 mailed Sep. 10, 2021, 4 Pages.
Office Communication for U.S. Appl. No. 16/004,182 mailed Sep. 29, 2021, 11 Pages.
Office Communication for U.S. Appl. No. 17/491,017 mailed Dec. 23, 2021, 41 Pages.
Office Communication for U.S. Appl. No. 17/491,017 mailed May 12, 2022, 50 Pages.
Office Communication for U.S. Appl. No. 17/491,017 mailed Sep. 15, 2022, 55 Pages.
Office Communication for U.S. Appl. No. 17/491,017 mailed Feb. 10, 2023, 55 Pages.
Office Communication for U.S. Appl. No. 17/491,017 mailed Aug. 8, 2023, 13 Pages.
Office Communication for U.S. Appl. No. 14/595,598 mailed May 16, 2019, 18 Pages.
Office Communication for U.S. Appl. No. 16/152,277 mailed Oct. 26, 2021, 2 Pages.
Office Communication for U.S. Appl. No. 16/004,182 mailed Mar. 17, 2022, 3 Pages.
Office Communication for U.S. Appl. No. 16/226,587 mailed Janaury 27, 2020, 13 Pages.
Office Communication for U.S. Appl. No. 16/741,567 mailed Feb. 24, 2022, 2 Pages.
Office Communication for U.S. Appl. No. 16/234,334 mailed Oct. 11, 2019, 16 Pages.
Office Communication for U.S. Appl. No. 16/262,790 mailed Nov. 8, 2019, 5 Pages.
Office Communication for U.S. Appl. No. 17/504,289 mailed Apr. 20, 2022, 2 Pages.
Office Communication for U.S. Appl. No. 16/659,488 mailed May 6, 2020, 8 Pages.
International Preliminary Report on Patentability Chapter I for International Patent Application No. PCT/US2021/023531 mailed Aug. 4, 2022, 5 Pages.
International Preliminary Report on Patentability Chapter I for International Patent Application No. PCT/US2021/023525 mailed Aug. 4, 2022, 5 Pages.
International Preliminary Report on Patentability Chapter I for International Patent Application No. PCT/US2016/038242 mailed Dec. 28, 2017, 8 Pages.
Office Action for European Patent Application No. 17206518.7 mailed Mar. 15, 2022, 5 Pages.
Intention to Grant for European Patent Application No. 17206518.7 mailed Sep. 30, 2022, 6 Pages.
Office Communication for U.S. Appl. No. 17/508,869 mailed Mar. 8, 2022, 2 Pages.
Office Communication for U.S. Appl. No. 17/508,869 mailed Jan. 5, 2022, 3 Pages.
Office Communication for U.S. Appl. No. 17/508,869 mailed Dec. 22, 2021, 9 Pages.
Office Communication for U.S. Appl. No. 17/530,420 mailed May 4, 2022, 3 Pages.
Office Communication for U.S. Appl. No. 17/530,420 mailed May 12, 2022, 3 Pages.
Office Communication for European Patent Application No. 16812585.4 mailed Apr. 1, 2021, 9 pages.
Intention to Grant for European Patent Application No. 18155779.4 mailed Jun. 12, 2020, 10 Pages.
Office Communication for U.S. Appl. No. 17/115,529 mailed Sep. 12, 2023, 25 Pages.
Office Communication for U.S. Appl. No. 17/491,017 mailed May 4, 2023, 6 Pages.
Office Communication for U.S. Appl. No. 17/491,017 mailed Aug. 17, 2022, 5 Pages.
Office Communication for U.S. Appl. No. 17/864,190 mailed Aug. 25, 2023, 12 Pages.
Office Communication for U.S. Appl. No. 18/070,705 mailed Sep. 7, 2023, 5 Pages.
Office Communication for European Patent Application No. 18155779.4 mailed Apr. 17, 2018, 4 Pages.
Office Communication for U.S. Appl. No. 17/864,190 mailed Nov. 17, 2023, 12 Pages.
Office Communication for U.S. Appl. No. 17/115,529 mailed Dec. 13, 2023, 4 Pages.
Office Communication for U.S. Appl. No. 17/115,529 mailed Jan. 12, 2024, 26 Pages.
Office Communication for U.S. Appl. No. 18/503,791 mailed Jan. 4, 2024, 27 Pages.
Office Communication for U.S. Appl. No. 17/864,190 mailed Feb. 8, 2024, 5 Pages.
Office Communication for U.S. Appl. No. 18/503,918 mailed Jan. 24, 2024, 12 Pages.
Office Communication for U.S. Appl. No. 18/503,918 mailed Jan. 31, 2024, 8 Pages.
Office Communication for U.S. Appl. No. 18/070,705 mailed Feb. 22, 2024, 7 Pages.
Office Communication for U.S. Appl. No. 18/070,705 mailed Mar. 5, 2024, 2 Pages.
Office Communication for U.S. Appl. No. 17/115,529 mailed Mar. 26, 2024, 27 Pages.
Office Communication for U.S. Appl. No. 18/583,746 mailed May 14, 2024, 21 Pages.
Office Communication for U.S. Appl. No. 18/590,088 mailed Apr. 24, 2024, 18 Pages.
Office Communication for U.S. Appl. No. 18/590,088 mailed May 2, 2024, 13 Pages.
Office Communication for U.S. Appl. No. 17/864,190 mailed Jun. 4, 2024, 12 Pages.
Marcus Jurgens, "Aggregated Data in Tree-Based Index Structures" in Index Structures for Data Warehouses, LNCS 1859, Springer, Year: 2002, pp. 43-62.
Office Communication for U.S. Appl. No. 18/503,082 mailed Feb. 29, 2024, 26 Pages.
Office Communication for U.S. Appl. No. 18/503,082 mailed May 15, 2024, 27 Pages.
Office Communication for U.S. Appl. No. 18/503,082 mailed Jun. 25, 2024, 4 Pages.
Office Communication for U.S. Appl. No. 18/503,082 mailed Sep. 6, 2024, 27 Pages.
Office Communication for U.S. Appl. No. 18/799,431 mailed Oct. 23, 2024, 30 Pages.
Office Communication for U.S. Appl. No. 18/799,431 mailed Nov. 6, 2024, 27 Pages.
Office Communication for U.S. Appl. No. 17/864,190 mailed Dec. 6, 2024, 8 Pages.
Office Communication for U.S. Appl. No. 18/503,082 mailed Jan. 28, 2025, 8 Pages.
Office Communication for U.S. Appl. No. 18/945,379 mailed Feb. 21, 2025, 18 Pages.
Office Communication for U.S. Appl. No. 18/945,343 mailed Feb. 24, 2025, 25 Pages.
International Search Report and Written Opinion for International Patent Application No. PCT/US2024/053881 mailed Jan. 21, 2025, 14 Pages.

(56) References Cited

OTHER PUBLICATIONS

International Search Report and Written Opinion for International Patent Application No. PCT/US2024/054442 mailed Feb. 10, 2025, 8 Pages.
Ryousei Takano, File System Ext2/Ext3, Software Design, No. 161, Mar. 18, 2004, 16 pages with English translation.
Naohiro Aota, "F2FS optimized for flash memory" , Nikkei Linux, vol. 17 No. 3, Mar. 3, 2015, 7 pages with English translation.
Office Communication for U.S. Appl. No. 18/945,343 mailed Aug. 8, 2025, 3 Pages.
Office Communication for U.S. Appl. No. 18/945,343 mailed Oct. 20, 2025, 27 Pages.
Office Communication for U.S. Appl. No. 16/883,922 mailed Aug. 7, 2020, 13 Pages.
Office Communication for U.S. Appl. No. 16/775,041 mailed Aug. 18, 2020, 9 Pages.
Office Communication for U.S. Appl. No. 16/883,879 mailed Sep. 1, 2020, 11 Pages.
Extended European Search Report for European Patent Application No. 16812585.4 mailed Nov. 7, 2018, 9 Pages.
Comer, Douglas, "The Ubiquitous B-Tree," Computing Surveys, vol. 11, No. 2, Jun. 1979. Computer Science Department, Purdue University, West Lafayette, Indiana 47907, pp. 121-137.
Office Communication for European Patent Application No. 16812585.4 mailed Jan. 2, 2020, 6 Pages.
International Search Report and Written Opinion for International Patent Application No. PCT/US2016/038242 mailed Oct. 11, 2016, 9 Pages.
Office Communication for U.S. Appl. No. 14/595,598 mailed Jul. 31, 2019, 5 Pages.
Office Communication for U.S. Appl. No. 14/595,598 mailed Sep. 20, 2018, 18 Pages.
Office Communication for U.S. Appl. No. 14/595,598 mailed Dec. 15, 2017, 18 Pages.
Office Communication for U.S. Appl. No. 14/595,598 mailed Feb. 24, 2017, 8 Pages.
Office Communication for U.S. Appl. No. 14/595,598 mailed Apr. 19, 2018, 5 Pages.
Bloom, Burton H., "Space/Time Trade-offs in Hash Coding with Allowable Errors," Communications of the ACM, vol. 13, No. 7, Jul. 1970. Computer Usage Company, Newton Upper Falls, Massachusetts, pp. 422-426.
Office Communication for U.S. Appl. No. 16/262,756 mailed Aug. 24, 2020, 7 Pages.
Office Communication for European Patent Application No. 18155779.4 mailed Oct. 8, 2019, 4 Pages.
Office Communication for U.S. Appl. No. 16/152,259 mailed Aug. 28, 2020, 5 Pages.
Office Communication for U.S. Appl. No. 16/752,509 mailed Aug. 11, 2020, 7 Pages.
Office Communication for U.S. Appl. No. 14/595,598 mailed Sep. 25, 2020, 7 Pages.
Office Communication for U.S. Appl. No. 16/152,277 mailed Oct. 16, 2020, 10 Pages.
Office Communication for U.S. Appl. No. 16/152,615 mailed Oct. 20, 2020, 7 Pages.
Office Communication for U.S. Appl. No. 16/775,041 mailed Nov. 3, 2020, 5 Pages.
Office Communication for U.S. Appl. No. 17/062,500 mailed Nov. 12, 2020, 12 Pages.
Office Communication for U.S. Appl. No. 16/004,182 mailed Nov. 30, 2020, 55 Pages.
Office Communication for U.S. Appl. No. 14/859,114 mailed Dec. 1, 2020, 24 Pages.
Office Communication for U.S. Appl. No. 16/883,922 mailed Dec. 2, 2020, 9 Pages.
Office Communication for U.S. Appl. No. 16/883,879 mailed Dec. 8, 2020, 5 Pages.
Office Communication for U.S. Appl. No. 16/152,277 mailed Dec. 28, 2020, 5 Pages.
Office Communication for U.S. Appl. No. 16/004,182 mailed Jan. 28, 2021, 4 Pages.
Office Communication for U.S. Appl. No. 14/595,598 mailed Feb. 4, 2021, 19 Pages.
Office Communication for U.S. Appl. No. 17/115,529 mailed Feb. 8, 2021, 15 Pages.
Office Communication for U.S. Appl. No. 16/262,756 mailed Feb. 10, 2021, 19 Pages.
Office Communication for U.S. Appl. No. 17/114,384 mailed Feb. 17, 2021, 12 Pages.
Office Action for European Patent Application No. 17206518.7 mailed Feb. 23, 2021, 6 Pages.
Office Communication for U.S. Appl. No. 14/859,114 mailed Mar. 8, 2021, 4 Pages.
Office Communication for U.S. Appl. No. 16/004,182 mailed Mar. 8, 2021, 60 Pages.
Office Communication for U.S. Appl. No. 17/062,500 mailed Mar. 9, 2021, 17 Pages.
Office Communication for U.S. Appl. No. 16/152,277 mailed Mar. 18, 2021, 10 Pages.
Office Communication for U.S. Appl. No. 17/160,698 mailed Mar. 18, 2021, 11 Pages.
Office Communication for U.S. Appl. No. 17/062,500 mailed May 18, 2021, 4 Pages.
Office Communication for U.S. Appl. No. 17/203,371 mailed May 20, 2021, 10 Pages.
Office Communication for U.S. Appl. No. 17/115,529 mailed May 25, 2021, 18 Pages.
Office Communication for U.S. Appl. No. 14/859,114 mailed May 26, 2021, 11 Pages.
Office Communication for U.S. Appl. No. 16/262,756 mailed May 27, 2021, 7 Pages.
Office Communication for U.S. Appl. No. 17/114,384 mailed May 27, 2021, 13 Pages.
Office Communication for U.S. Appl. No. 17/190,653 mailed May 27, 2021, 11 Pages.
Office Communication for U.S. Appl. No. 16/741,567 mailed Jun. 8, 2021, 5 Pages.
Office Communication for U.S. Appl. No. 17/203,452 mailed Jun. 23, 2021, 11 Pages.
Office Communication for U.S. Appl. No. 16/152,277 mailed Jun. 25, 2021, 10 Pages.
Office Communication for U.S. Appl. No. 16/004,182 mailed Jul. 1, 2021, 58 Pages.
Office Communication for U.S. Appl. No. 17/160,698 mailed Jul. 2, 2021, 12 Pages.
Office Communication for U.S. Appl. No. 14/859,114 mailed Jun. 27, 2018, 33 pages.
Office Communication for U.S. Appl. No. 14/859,114 mailed Nov. 19, 2018, 35 Pages.
Office Communication for U.S. Appl. No. 14/859,114 mailed Jan. 31, 2019, 4 Pages.
Office Communication for U.S. Appl. No. 14/859,114 mailed Mar. 7, 2019, 32 Pages.
Office Communication for U.S. Appl. No. 14/859,114 mailed Jun. 26, 2019, 21 Pages.
Office Communication for U.S. Appl. No. 14/859,114 mailed Sep. 13, 2019, 6 Pages.
Office Communication for U.S. Appl. No. 14/859,114 mailed Nov. 26, 2019, 21 Pages.
Office Communication for U.S. Appl. No. 15/288,853 mailed Sep. 19, 2018, 13 pages.
Chimera, Richard, "Value Bars: An Information Visualization and Navigation Tool for Multi-attribute Listings", CHI '92, Monterey, CA, May 3-7, 1992, pp. 293-294.
Office Communication for U.S. Appl. No. 15/288,853 mailed Mar. 25, 2019, 25 Pages.
Cudre-Mauroux, Philippe et aL, "TrajStore An Adaptive Storage System for Very Lar ie Trajecto1y Sets", ICDE 2010, Long Beach, CA, Mar. 1-6, 2010, pp. 109-120.
Office Communication for U.S. Appl. No. 16/436,825 mailed Jul. 11, 2019, 9 Pages.

(56) References Cited

OTHER PUBLICATIONS

Office Communication for U.S. Appl. No. 15/474,047 mailed Sep. 18, 2017, 14 Pages.
Office Communication for U.S. Appl. No. 15/474,047 mailed Mar. 9, 2018, 8 Pages.
Office Communication for U.S. Appl. No. 15/474,047 mailed Jun. 11, 2018, 6 Pages.
Office Communication for U.S. Appl. No. 15/474,047 mailed Aug. 15, 2018, 11 Pages.
Office Communication for U.S. Appl. No. 15/957,809 mailed Jun. 28, 2018, 27 Pages.
Office Communication for U.S. Appl. No. 15/957,809 mailed Jan. 24, 2019, 11 Pages.
Office Communication for U.S. Appl. No. 16/434,157 mailed Jul. 25, 2019, 8 Pages.
Office Communication for U.S. Appl. No. 15/854,447 mailed May 6, 2019, 9 pages.
Office Communication for U.S. Appl. No. 16/505,562 mailed Aug. 30, 2019, 11 Pages.
Extended European Search Report for European Patent Application No. 17206518.7 mailed Apr. 5, 2018, 8 Pages.
Karatza et al., "Epoch Load Sharing in a Network of Workstations," Simulation Symposium, 2001. Proceedings. 34th Annual Apr. 22-26, 2001, Piscataway, NJ, USA, IEEE, XP010541274, ISBN: 978-0-7695-1092-7, pp. 36-42.
Office Communication for U.S. Appl. No. 16/004,182 mailed Jan. 7, 2020, 46 Pages.
Office Communication for U.S. Appl. No. 16/125,573 mailed Nov. 21, 2019, 13 Pages.
Office Communication for U.S. Appl. No. 16/226,587 mailed Oct. 24, 2019, 4 Pages.
Office Communication for U.S. Appl. No. 16/262,790 mailed Dec. 12, 2019, 10 Pages.
Office Communication for U.S. Appl. No. 16/234,334 mailed Jan. 16, 2020, 8 Pages.
Office Communication for U.S. Appl. No. 15/694,604 mailed Nov. 20, 2019, 8 Pages.
Office Communication for U.S. Appl. No. 16/262,756 mailed Jan. 28, 2020, 21 Pages.
Office Communication for U.S. Appl. No. 16/434,157 mailed Jan. 29, 2020, 9 Pages.
Office Communication for U.S. Appl. No. 16/262,790 mailed Feb. 6, 2020, 8 Pages.
Office Communication for U.S. Appl. No. 14/859,114 mailed Mar. 13, 2020, 21 Pages.
Office Communication for U.S. Appl. No. 16/752,451 mailed Mar. 12, 2020, 14 Pages.
Office Communication for U.S. Appl. No. 16/775,041 mailed Mar. 11, 2020, 8 pages.
Office Communication for U.S. Appl. No. 16/779,362 mailed Mar. 26, 2020, 10 Pages.
Wikipedia clustered file system page from elate Jul. 9, 2019, retrieved using the WayBackMachine, From https//web.archive.org/web/20190709083400/tlttps://en.wikipedia.org/wiki/Clustered_file_system (Year: 2019), pp. 1-6.
Wikipedia raft page from date Jul. 16, 2019, retrieved using the WayBackMachine, from tlttps://web.archive. org/web/20190716115001/https://en.wikipedia.org/wiki/Raft (computer_science) (Year: 2019), pp. 1-4.
Office Communication for U.S. Appl. No. 16/004,182 mailed Mar. 23, 2020, 4 Pages.
Office Communication for U.S. Appl. No. 16/752,509 mailed Apr. 2, 2020, 8 Pages.
Office Communication for U.S. Appl. No. 16/152,277 mailed Apr. 3, 2020, 10 Pages.
Office Communication for U.S. Appl. No. 16/004,182 mailed Apr. 28, 2020, 51 Pages.
Office Communication for U.S. Appl. No. 16/152,259 mailed Apr. 29, 2020, 19 Pages.
Office Communication for U.S. Appl. No. 14/859,114 mailed Jun. 5, 2020, 5 Pages.
Office Communication for U.S. Appl. No. 16/262,756 mailed Jun. 8, 2020, 22 Pages.
Office Communication for U.S. Appl. No. 14/595,598 mailed Jul. 9, 2020, 19 Pages.
Office Communication for U.S. Appl. No. 16/752,451 mailed Jul. 23, 2020, 8 Pages.
Office Communication for U.S. Appl. No. 14/859,114 mailed Jul. 23, 2020, 21 Pages.
Office Communication for U.S. Appl. No. 16/152,615 mailed Aug. 6, 2020, 7 Pages.
Office Communication for U.S. Appl. No. 16/779,362 mailed Aug. 7, 2020, 11 Pages.
Office Communication for U.S. Appl. No. 19/454,267 mailed Apr. 29, 2026, 11 Pages.
Office Communication for U.S. Appl. No. 19/547,310 mailed Apr. 21, 2026, 18 Pages.
Office Communication for U.S. Appl. No. 19/405,047 mailed Feb. 9, 2026, 9 Pages.
Office Communication for U.S. Appl. No. 19/406,733 mailed Mar. 9, 2026, 25 Pages.

* cited by examiner

GLOBAL NAMESPACES FOR DISTRIBUTED FILE SYSTEMS

CROSS-REFERENCE TO RELATED APPLICATIONS

This Utility Patent Application is a Continuation of U.S. patent application Ser. No. 18/799,431 filed on Aug. 9, 2024, now U.S. Pat. No. 12,222,903 issued on Feb. 11, 2025, the benefit of the filing date of which is hereby claimed under 35 U.S.C. § 120, and the contents of which is further incorporated in entirety by reference.

TECHNICAL FIELD

The present invention relates generally to file systems, and more particularly, but not exclusively, to global namespaces for distributed file systems.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. Further, reliable or highly-available file systems may be expected to perform various actions to operate, recover from errors, perform backups, rebalancing data, or the like, that may consume significant system bandwidth.

Further, more recently organizations are increasingly relying on distributed resources, including distributed/work-from-home employees, geographically distant work centers, geographically distant data centers, and so on. Often these distant/separate resources need to share data. Using a central file system may enable some shared access across far distances, however, in many data intensive workflows relying on distantly located file systems may have various disadvantages, including poor responsiveness, redundant data copying, dependence on unreliable long distance communication, connectivity, or the like. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
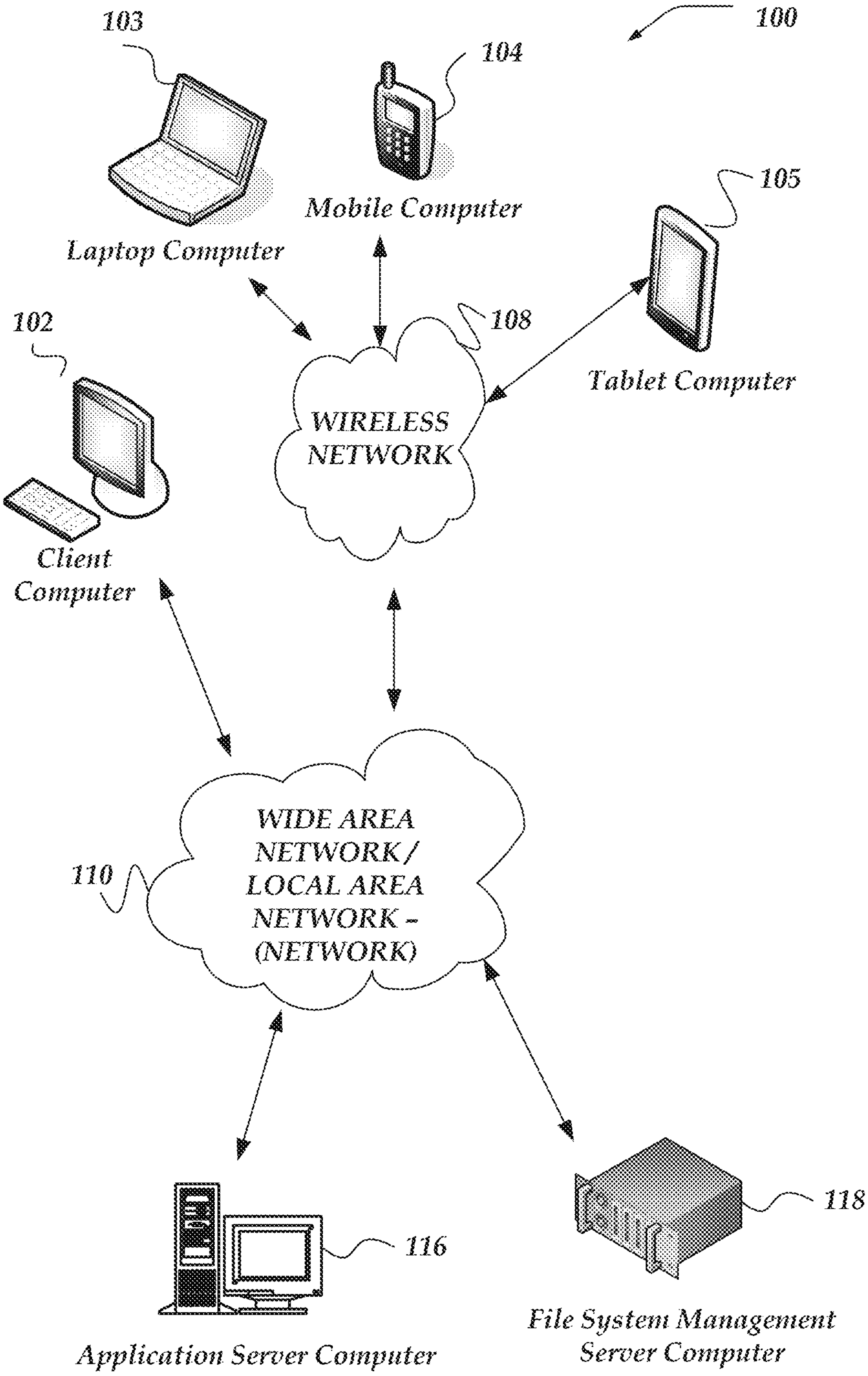
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft. NET™ languages such as C #, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage devices and be stored on and executed by one or more general purpose computers, thus creating a special purpose computer configured to provide the engine.

As used herein the terms "data block," "file system block," refer to the portions of data used to store data in a file system. For example, small sized items such as, directories or small files may be comprised of a single block. Whereas larger files, such as large document files may be comprised of many blocks. Blocks usually are arranged to have a fixed size to simplify the management of a file system. This may include fixing blocks to a particular size based on requirements associated with underlying storage hardware, such as, solid state drives (SSDs) or hard disk drives (HDDs), cloud-based block storage, or the like. However, files or other items stored in file systems may be of various sizes, comprised of the number of blocks necessary to represent or contain the data or metadata for the item.

As used herein the term "hub" refers to a file system that may be sharing one or more portions of the file system with another separate file system.

As used herein the term "spoke" refers to a portion of a file system that provides local access to a portion of a remote file system.

As used herein the term "hub file system" refers to a file system that is configured to share one or more portions of the file system as spokes in a remote file system. Hub file system may refer to entire file system and not just the portions that are shared in a spoke. Note, a file system may be considered a hub file system even though in some cases it may include a spoke from another file system.

As used herein the term "spoke file system" refers to a file system that includes at least one spoke from at least one hub file system. Generally, the spoke file system may be considered to be an entire remote file system rather just the spoke portion that is shared from the hub file system. Spoke file systems may be in a spoke-hub relationship with a remote hub file system. Note, a file system may be considered a spoke file system even though in some cases it may share a spoke with another file system.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data in a file system over a network. In one or more of the various embodiments, one or more portions of a hub file system that includes one or more nodes may be shared with one or more spoke file systems that include one or more other nodes such that the hub file system shares a plurality of file system items with the one or more spoke file systems.

In one or more of the various embodiments, a request from a client of the one or more spoke file systems may be employed to access one or more file system items of the plurality of shared file system items to perform further actions including: determining a portion of the one or more spoke file systems that may have an existing lock on the one or more file system items; obtaining one or more log entries from the portion of the one or more spoke file systems such that the one or more log entries are associated with one or more commands that were executed in the portion of the one or more spoke file systems and such that each log entry is associated with a logical timestamp that corresponds to a sequence that the one or more commands were executed in the portion of the one or more spoke file systems; executing the one or more commands in the sequence again in the hub file system for each logical timestamp of the one or more log entries to update the one or more file system items in the hub file system; granting a lock on the one or more file system items in the hub file system that enables the client to access the one or more updated file system items from the one or more spoke file systems; or the like.

In one or more of the various embodiments, another request from a client of the hub file system may be employed to access one or more other file system items that may be in the hub file system to may include: determining another portion of the one or more spoke file systems that have another existing lock on the one or more other file system items; updating the one or more other file system items in the hub file system based on an execution of one or more other commands associated with one or more other log entries obtained from the other portion of the spoke file systems such that a new lock on the one or more other file system items may be granted to the client of the hub file system; generating one or more invalidation log entries on the hub file system based on an execution of the one or more other commands; communicating the one or more invalidation log entries to the other portion of the one or more spoke file systems such that the other portion of the one or more spoke file systems employs the one or more invalidation log entries to invalidate each local copy of the one or more other file system items; or the like.

In one or more of the various embodiments, another request from a client of a spoke file system may be employed to access one or more other file system items that are in the hub file system to may include: obtaining another lock on the one or more other file system items for the client of the spoke file system based on the other request; generating one or more log entries based on an execution of one or more other commands associated with the other request such that the one or more log entries are stored in the spoke file system to complete the other request; communicating the one or more other log entries from the spoke file system to the hub file system based on one or more of a message from the hub file system or a policy of the hub file system; or the like.

In one or more of the various embodiments, a logical timestamp for each node in the hub file system and each node in the one or more spoke file systems may be initialized. In one or more of the various embodiments, a communication from a first node to a second node may be employed to perform further actions, including: determining a first logical timestamp based on the communication from the first node; determining a second logical timestamp based on the second node; updating the second logical timestamp of the second node based on a comparison of the first logical timestamp and the second logical timestamp such that the updated second logical timestamp is the greater of the first logical timestamp or the second logical timestamp incremented by one; or the like.

In one or more of the various embodiments, executing the one or more commands on the hub file system may include: associating the logical timestamp of a log entry corresponding to a most recent executed command with the one or more file system items; disregarding one or more subsequent commands that are associated with another log entry that has a logical timestamp that is equal to or less than the logical timestamp associated with the one or more file system items; or the like.

In one or more of the various embodiments, granting the lock on the one or more file system items may include: employing a distributed lock manager to monitor a plurality of locks that are active in the hub file system and the one or more spoke file systems; including the granted lock in the distributed lock manager; or the like.

In one or more of the various embodiments, obtaining the one or more log entries from the portion of the one or more spoke file systems may include: determining a plurality of log entries that are stored in the portion of the one or more spoke file systems; determining the one or more log entries from the plurality of log entries based on one or more file system item identifiers included in the one or more log entries such that one or more other log entries of the plurality of log entries that omit the one or more file system identifiers are excluded from the one or more log entries; or the like.

In one or more of the various embodiments, a plurality of invalidation log entries may be generated in the hub file system based on an execution of a plurality of commands on the hub file system. In one or more of the various embodiments, the plurality of invalidation log entries may be communicated to the one or more spoke file systems such that each spoke file system may be associated with a cursor that iterates independently through the plurality of invalidation log entries, and such that each cursor enables its associated spoke file system to consume invalidation log entries at a different rate.

Ilustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, file system management server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), extensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, or other computers.

Client computers 102-105 may further be configured to include a client application that enables an end-user to log into an end-user account that may be managed by another computer, such as application server computer 116, file system management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by application server computer 116, file system management server computer 118, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanisms and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of file system management server computer 118 is described in more detail below in conjunction with FIG. 3. Although FIG. 1 illustrates file system management server computer 118, or the like, each as a single computer, the innovations or embodiments are not so limited. For example, one or more functions of file system management server computer 118, or the like, may be distributed across one or more distinct network computers. Moreover, in one or more embodiments, file system management server computer 118 may be implemented using a plurality of network computers. Further, in one or more of the various embodiments, file system management server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
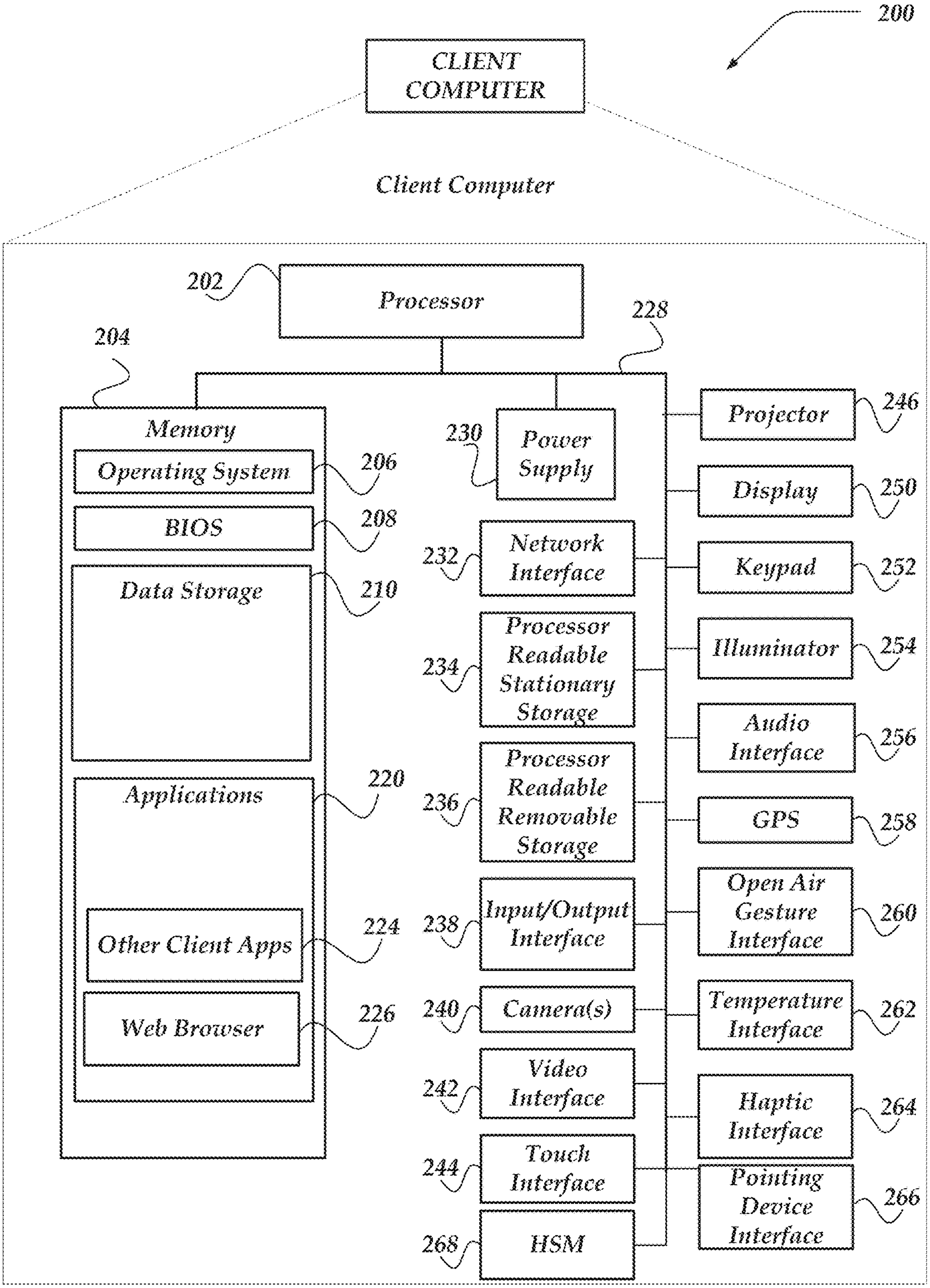
FIG. 2 illustrates a schematic embodiment of a client computer.

FIG. 2 shows one embodiment of client computer 200 that may include many more or less components than those shown. Client computer 200 may represent, for example, one or more embodiments of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measure or maintain an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, EDGE, WCDMA, LTE, UMTS, OFDM, CDMA2000, EV-DO, HSDPA, 5G, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications with one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
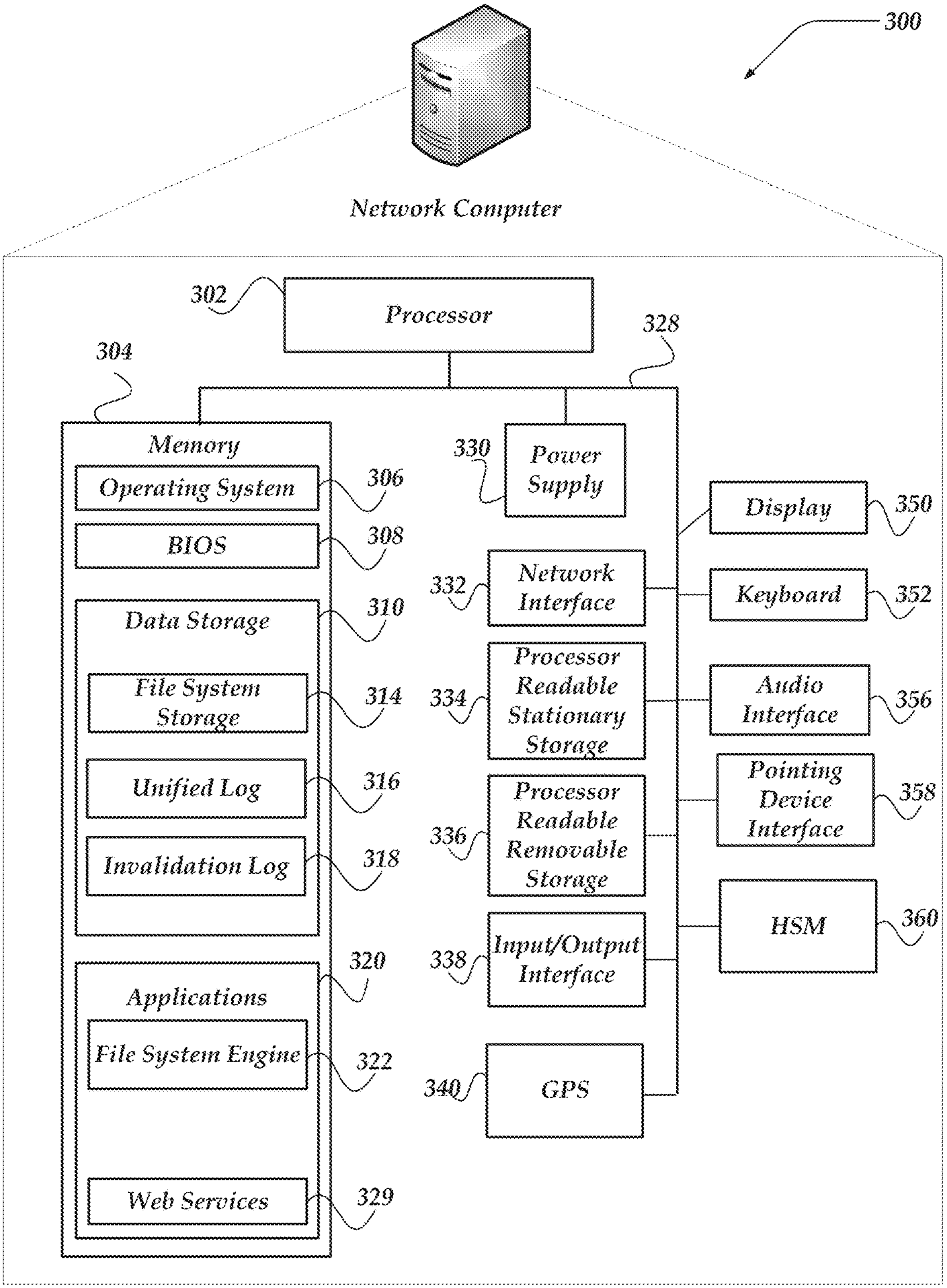
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a file system management server computer such as file system management server computer 118, or the like, of FIG. 1.

Network computers, such as network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), 5G, or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, web services 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, unified logs 316, invalidation logs 318, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, web services 329, or the like, may be provisioned and de-commissioned automatically.

Also, in one or more of the various embodiments, file system engine 322, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
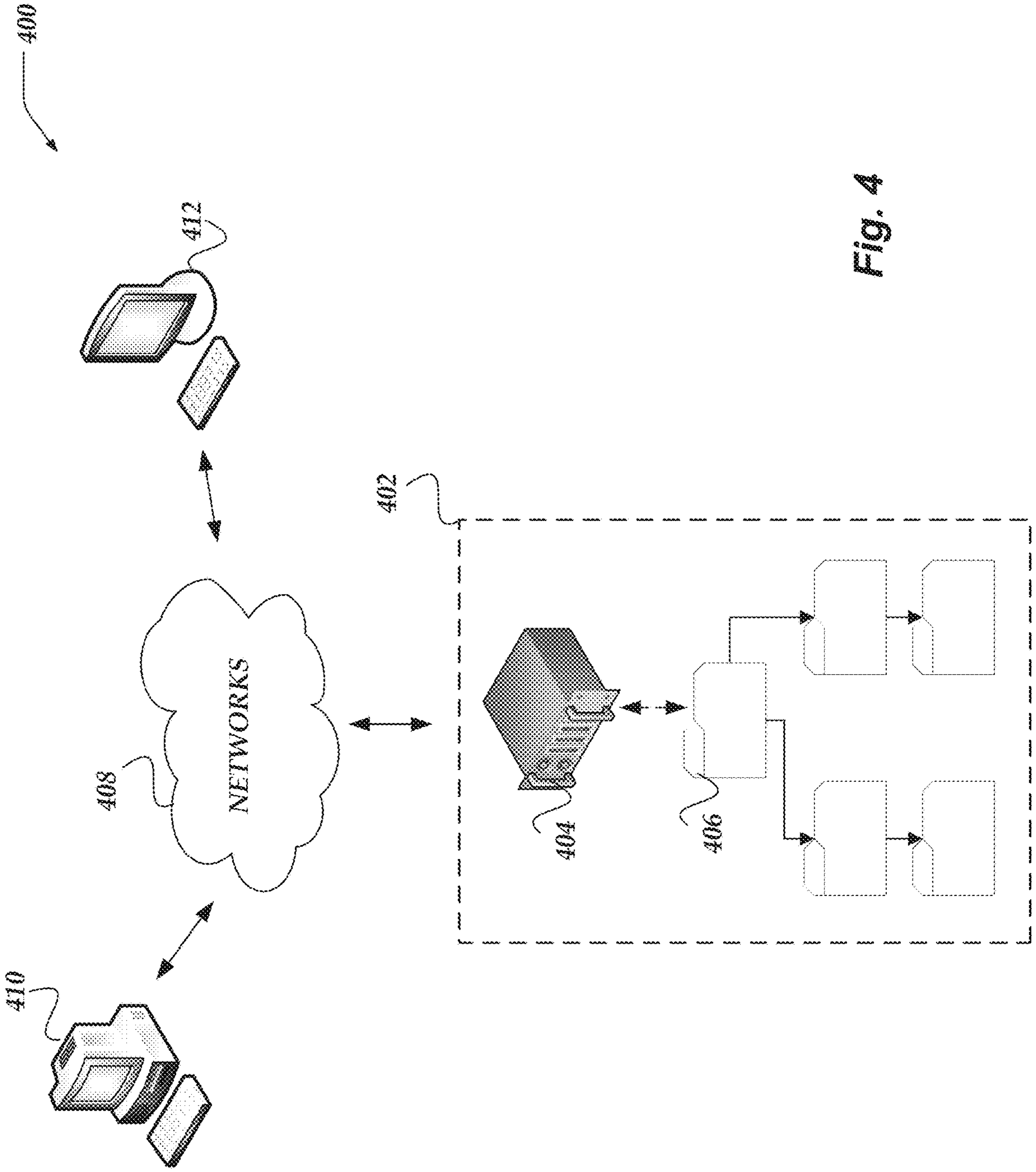
FIG. 4 illustrates a logical architecture of a system for global namespaces for distributed file systems in accordance with one or more of the various embodiments.

FIG. 4 illustrates a logical architecture of system 400 for global namespaces for distributed file systems in accordance with one or more of the various embodiments. In one or more of the various embodiments, one or more file systems, such as, file system 402 may be arranged to be communicatively coupled to one or more networks, such as, networks 408. Accordingly, in one or more of the various embodiments, one or more clients, such as, client computer 410 or client computer 412 may be arranged to access file system 402 over networks 408. In some embodiments, clients of file system 402 may include users, services, programs, computers, devices, or the like, that may be enabled to perform one or more data related operations, such as, creating, reading, updating, or deleting data (e.g., files, directories, documents, file system meta-data, or the like) that may be stored in file system 402.

In some embodiments, file system 402 may comprise one or more file system management computers, such as file system management computer 404. Also, in one or more of the various embodiments, file systems, such as file system 402 may include one or more file system items, such as item 406. In one or more of the various embodiments, item 406 may be considered to represent the various file system items, such as, documents, files, or the like, that may be stored in file system 402. In some embodiments, file system items may include files, documents, directories, folders, backups, snapshots, replication snapshots, replication information, or the like. In some embodiments, some file system items may be comprised of smaller file system items. Accordingly, in some embodiments, blocks or data blocks may be considered to be the smallest file system items that comprise other more complex file system items, such as, files, documents, or the like.

In some embodiments, file system management computers may be automatically selected from among the one or more cluster nodes in a distributed file system rather than being reserved to a particular computer or cluster node. Accordingly, in some embodiments, if a file system management computer may be needed, cluster nodes may be arranged to elect a file system management computer from among their peer nodes.

In one or more of the various embodiments, the implementation details that enable file system 402 to provide file system services may be hidden from clients, such that they may use file system 402 the same way they use other conventional local or remote file systems. Accordingly, in one or more of the various embodiments, clients may be unaware that they are using a distributed file system that supports sharing namespaces across file system clusters because file system engines may be arranged to mimic the interface or behavior of one or more conventional file systems.

Also, while file system 402 is illustrated as using one file system management computer with one set of file system items, these innovations are not so limited. Innovations herein contemplate file systems that may include one or more file system management computers or one or more file system item data stores. In some embodiments, file system items may be located remotely from one or more file system management computers. Also, in some embodiments, file systems may be spread across cloud computing environments, storage clusters, or the like.

Figure 5:
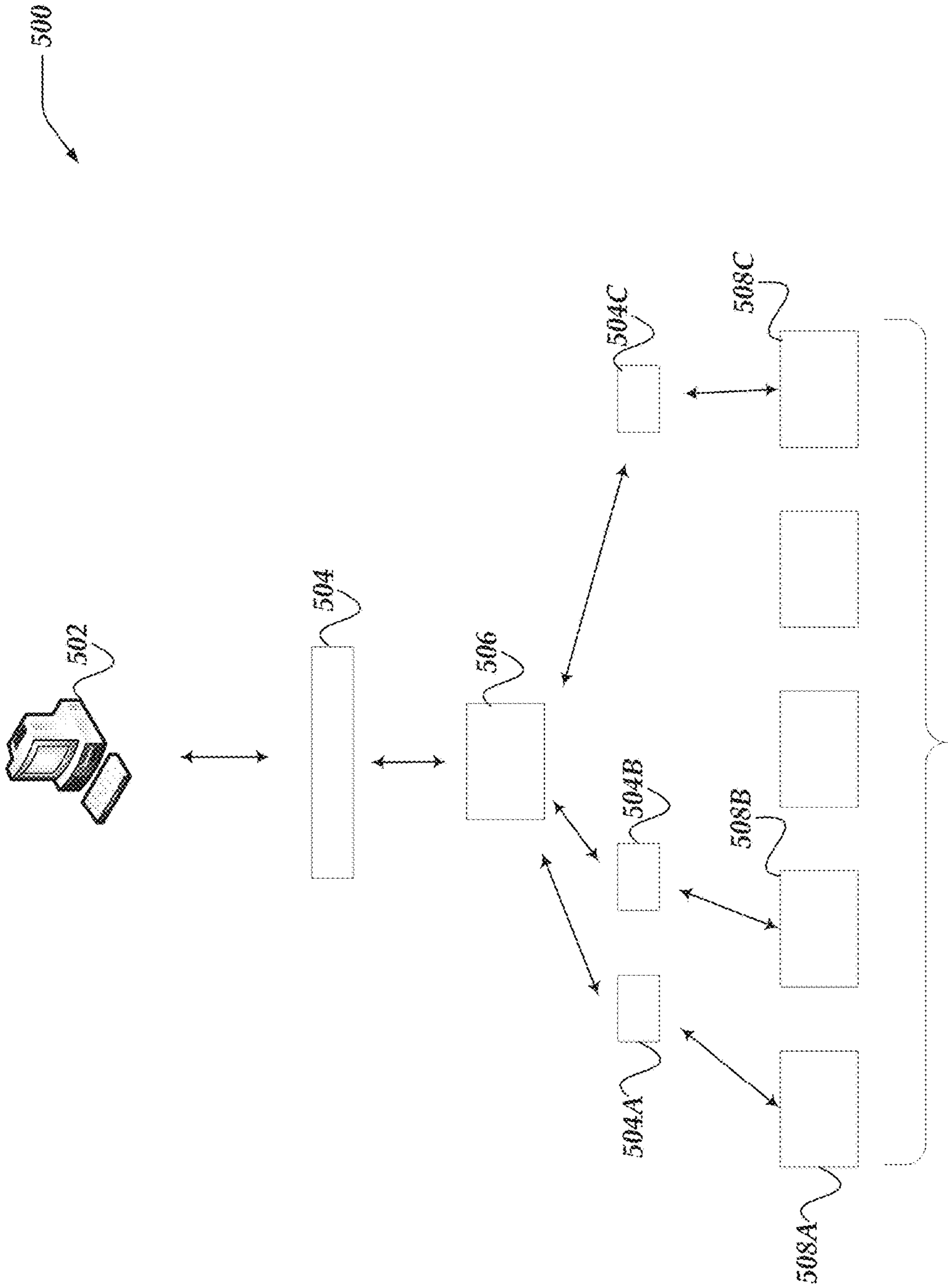
FIG. 5 illustrates a logical schematic of a file system for global namespaces for distributed file systems in accordance with one or more of the various embodiments.

FIG. 5 illustrates a logical schematic of file system 500 for global namespaces for distributed file systems in accordance with one or more of the various embodiments. FIG. 5 is provided to help illustrate how file system-wide command transactions may be broken down into parts (e.g., requests) that may be distributed to different nodes or protection stores in distributed file systems. Note, in this example, a protection store may be considered a portion of addressable file system storage that may be available in a file system. In some embodiments, each protection store may represent a portion of the address space of a given file system. In some embodiments, protection stores may be allocated or distributed according to one or more data protection schemes, striping schemes, RAID configurations, or the like, that may provide a desired level of data protection, performance, high-availability, or the like, that may vary depending on the given file system.

In some embodiments, file system clients may be enabled to issue various file system commands (e.g., read file, remove file, save file, or the like) to a file system engine that may initiate one or more command transactions. Accordingly, in some embodiments, file system engines may be arranged to determine which portion of the command transaction may be satisfied by various nodes or protection stores in the greater file system. In some embodiments, portions of the command transaction may be provided to designated nodes or protection stores as directed by file system engines as read requests or write requests. In some embodiments, if each request associated with a command transaction may be completed, the command transaction may be considered committed. Similarly, in some embodiments, if one or more requests (portions of the command transaction) fail to commit locally in their designated node or protection store, the other requests associated with the same command transaction that may have locally succeeded may be rolled back.

In this example, for some embodiments, file system client 502 may submit a file system command to file system engine 506 that initiates a command transaction, such as, as transaction 504. In practice, command transaction 504 may be a read transaction or a write transaction.

Accordingly, in some embodiments, read transactions may be directed to reading file system items (e.g., files, documents, directory listings, or the like) from the file system. Likewise, in some embodiments, write transactions may be providing data to be stored as file system items in the file system, modifying existing file system items, or deleting existing file system items.

In some embodiments, file system engines, such as file system engine 506 may receive transaction 504. Accordingly, in some embodiments, file system engine 506 may be arranged to divide the transaction across one or more protection stores, cluster nodes, or the like. Note, different file systems may employ different or distinct strategies for data protection, parallelism, high-availability, or the like, that may influence how the work or data for command transactions may be distributed in a file system. Thus, for brevity, details of these various strategies are omitted here.

In this example, for some embodiments, request 504A, request 504B, and request 504C may represent portions of command transaction 504 that may be distributed to different nodes or protection stores in a file system.

Accordingly, in some embodiments, nodes/protection stores 508 may be provided requests that may be part of the larger command transaction. In this example, for some embodiments, node/protection store 508A, node/protection store 508B, and node/protection store 508C may be selected for servicing the requests that make up command transaction 504.

In some cases, for some embodiments, nodes/protection stores may receive read requests that may be requesting one or more data blocks as defined by file system addresses, address ranges, or the like. Accordingly, in some embodiments, the nodes/protection stores may be arranged to locate and load the data blocks for the read requests they may be directed to service. These data blocks may be returned to contribute to completing the entire read transaction. In some embodiments, if each read request is completed successfully, the read transaction may be considered successful, and the data blocks provided for the read requests may be returned to the calling client.

Similarly, some requests may be write requests for a write command transaction. Accordingly, in some embodiments, each write request may include one or more data blocks to store at the determined node/protection store. Also, in some embodiments, delete operations may be considered write requests. However, delete requests may include information about which data blocks are to be deleted rather than including the data blocks themselves. If each write request succeeds the write transaction may be considered successful. Accordingly, the file system may provide an acknowledgment to the file system client that the write transaction was completed successfully. In some embodiments, if one or more of the write requests fail, the write transaction may be considered failed. Accordingly, in some embodiments, any associated successful write requests associated with the failed transaction may be determined and rolled back.

Further, in some embodiments, each single node may include or be associated with multiple disks, cloud-based block storage devices, object stores, or the like. Thus, in some cases, multiple protection stores may be allocated on the same node such that the separate protection stores may be distributed across different storage systems (e.g., disks, cloud-based block storage, objects, or the like) associated with the single node.

Note, in some embodiments, file systems may be arranged to include a single node/protection store such that each transaction may essentially be considered a request.

For brevity and clarity, innovations disclosed herein are generally described in the context of a single node/protection store that is handling read requests or write requests that may be part of larger read transaction or write transaction. Accordingly, in some embodiments, mechanisms, such as those associated with allocating protection stores across a file system, data protection (e.g., erasure coding), encryption, rebalancing of data stored in a file system, routing requests, dividing transactions into requests, or the like, are omitted. One of ordinary skill in the art will appreciate that disclosures herein are at least sufficient for integrating the disclosed and recited innovations into a wide variety of file systems or file system architectures.

Figure 6:
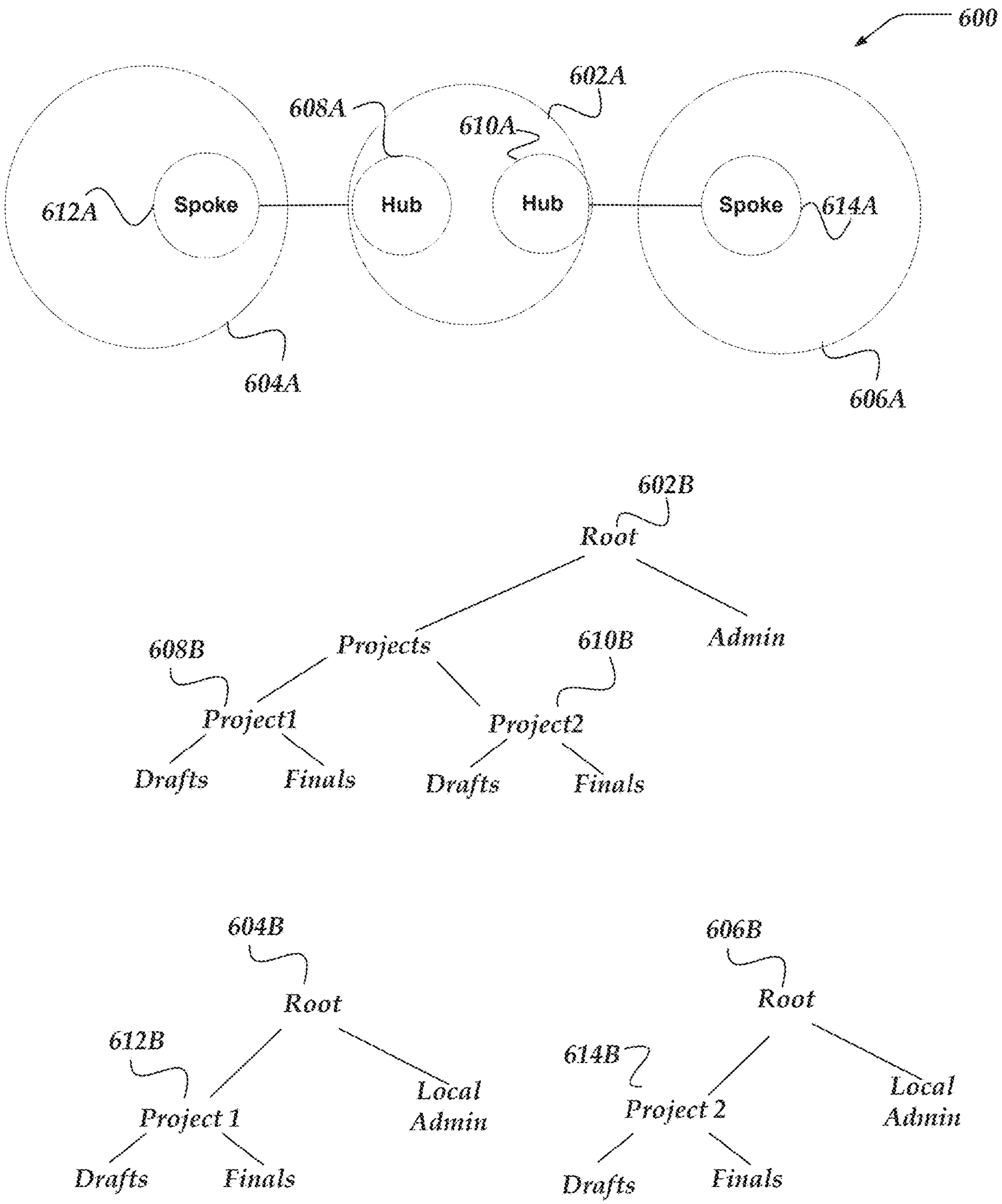
FIG. 6 illustrates a logical schematic of a distributed file system for global namespaces for distributed file systems in accordance with one or more of the various embodiments.

FIG. 6 illustrates a logical schematic of distributed file system 600 for global namespaces for distributed file systems in accordance with one or more of the various embodiments. File systems are described in more detail in FIG. 4. In some embodiments, two or more separate file systems, such as, file system 602A, file system 604A, file system 606A, or the like, may be configured with hub and spoke relationships. In some embodiments, hub file systems may be configured to allow spoke file systems to access particular portions of the hub file system. In some embodiments, spoke file systems may be remote or otherwise separate from the hub file system. Note, the term spoke file system denotes a file system that includes a spoke relationship with a hub file system. Accordingly, in some embodiments, spoke file systems may be considered to include (or enable access to) spoke items shared from a hub as well as one or more local file system items. In some embodiments, the particular file system items shared from a hub file system may be referred to as spoke items in a spoke file system. Note, in some embodiments, each separate file system may have its own independent file system engine.

In one or more of the various embodiments, spoke file systems may share one or more portions of the namespace and data with their corresponding hub(s). In one or more of the various embodiments, hub file systems may be configured to share file system items with one or more spoke file systems. Accordingly, in this example, spoke 612A and spoke 614A may each represent file system items shared from hub file system 602A.

In one or more of the various embodiments, spokes may enable file system items from the hub to be accessed by clients as if the shared file system items were stored locally in the spoke file system. In one or more of the various embodiments, each spoke file system may be configured to access the same or different portions of the same hub file system. In this example, for some embodiments, directory 602B may represent the root of hub file system 602A, directory 604B may represent the root directory of file system 604A, and directory 606B may represent the root directory of file system 606A. Likewise, in this example, directory 608B may represent directory 608A and directory 610B may represent directory 610A in a simplified tree illustration.

In some embodiments, file system engines may be arranged to provide one or more user interfaces that enable file system administrators to establish hub-spoke relationships. In some embodiments, file system administrators that intend to establish a spoke in their local file system may submit a request to the administrator of the file system intended to be the hub for the impending spoke. Accordingly, in some embodiments, upon acknowledgment and approval by the hub file system administrators, file system engines may be arranged to establish the requested hub-spoke relationship. In some embodiments, administrators requesting to create a spoke may declare a local mount point in the spoke file system where file system items shared from hub file system will be located in the spoke file system.

In some embodiments, if a spoke may be established, users may observe and use the file system items included in the spoke as if they were located in their file system. In this example, directory 612B may appear to users of file system 604B as if it is part of the local file system even though it is a spoke from hub file system 602A. Likewise, in this example, directory 614B may appear to users of file system 606B as if it may be local to file system 606A.

In one or more of the various embodiments, file system engines may be arranged to enable the same portion of a hub file system to be shared with two or more spokes. Also, in some embodiments, file system engines may be arranged to enable spokes or portions of spoke file systems to act as hubs that shares portion of a spoke file systems to other file system as a spoke. Thus, in some embodiments, a given file system may be configured to be spoke file system and a hub file system at the same time. In some cases, for some embodiments a spoke file system may be configured to share some or all items in a spoke (e.g., items shared to it from another hub) with other file systems. In this case, for some embodiments, the spoke file system may become a hub file system for another spoke file system even though it may be sharing file system items from a local spoke with another spoke file system.

For example, a hub may provide file system items for a first spoke and that first spoke may be configured to act as hub for a second spoke. In general, the number of ‘chained’ spokes may be unbounded. However, in some embodiments, file system policies may be configured to limit the length of hub-spoke-spoke chains. Likewise, in some embodiments, file system policies may be configured to limit or restrict self-referencing spokes, loop configurations, or the like.

Further, in some embodiments, file system engines may be arranged to provide user interfaces that enable administrators to establish file system policies that exclude portions of file systems from sharing file system items for spokes.

In one or more of the various embodiments, if users access file system items via a spoke, file system engines may be arranged to determine which portions of the file system items that user may be accessing and obtain a lock from a distributed lock manager to enable access to the file system items. In some embodiments, locks may be fine grained such that the 'size' of the lock may be restricted to an amount of data that may be copied from the corresponding hub file system in a given time.

Figure 7:
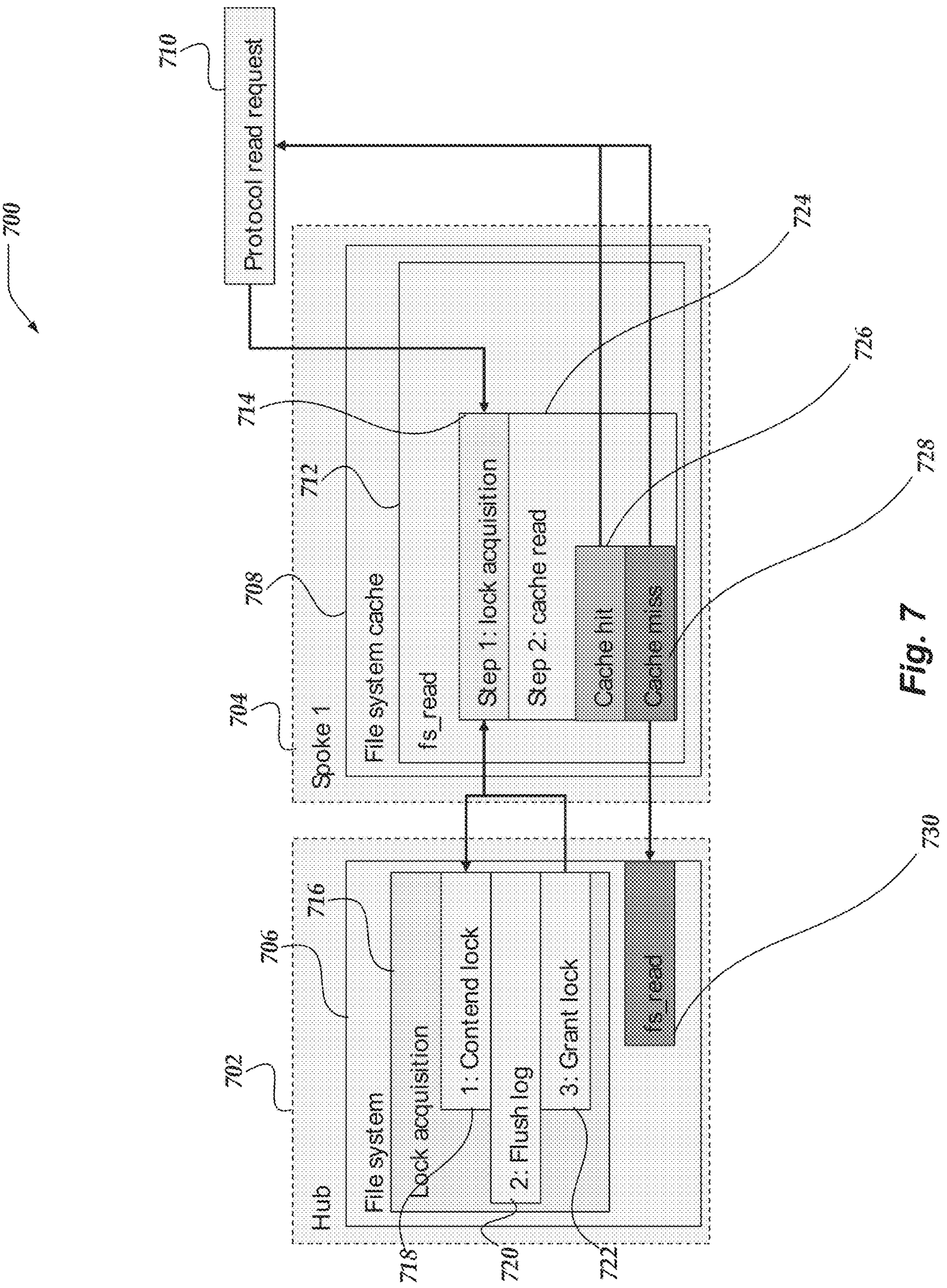
FIG. 7 represents a logical schematic of a file system for the basics of a read command directed to spoke file systems for global namespaces for distributed file systems in accordance with one or more of the various embodiments.

FIG. 7 represents a logical schematic of file system 700 for the basics of a read command directed to spoke file systems for global namespaces for distributed file systems in accordance with one or more of the various embodiments. This example provides an overview of how read commands may be supported by the innovations disclosed herein. For brevity and clarity this description of file system 700 omits some details that will be described in more detail below in subsequent figures and disclosures.

In this example, hub 702 may represent a hub file system that may be configured for sharing a portion of its files in spoke 704. File system 706 represents the file system that owns the shared file system items while file system cache 708 represents a file system cache for storing some or all shared file system items in the spoke file system.

In this example, for some embodiments, a read request, such as protocol read request 710 may be provided by a client (not shown) of spoke 704. For example, a user may execute a read file command in their local file system such that the file they may be attempting to read is part of a hub-spoke relationship.

Accordingly, in this example, the file system engine for the spoke file system 704 may initiate file system read operation 712. In some embodiments, before a read may be processed, a file read lock needs to be acquired. In some embodiments, file system engines may be arranged to employ a distributed lock manager to begin read lock acquisition 714. However, because in this example the target file may be part of a hub-spoke relationship, the lock may be requested from the hub file system. In some embodiments, lock acquisition 716 may be initiated in the hub file system. An initial step of lock acquisition 716 may include lock contention 718. In this example, file system engines for hub 702 may be arranged to perform one or more actions to issue the read lock for the read request. For example, if other clients have exclusive locks that may block a read request, the distributed lock manager may revoke those locks to enable the requested read lock. Accordingly, in some embodiments, file system engines in hub 702 may initiate a file system log flush. In some embodiments, the file system log may represent a log of file system re-playable operations that have occurred in the hub file system or spoke file systems. In some embodiments, remote spokes may include portions of the file system log that represent changes to shared file system items that may have occurred on the spoke file system that have yet to be performed or executed by the hub file system. Accordingly, in some embodiments, log flush 720 may represent a file system engine in the hub file system sending a request to each spoke file system to flush their logs back to the hub file system. Accordingly, in some embodiments, the hub file system may execute the operations represented in the log entries to bring the local hub copies of affected files up to date. In some cases, log flushing may result in file system items cached in spoke file system being invalidated.

In some embodiments, if the relevant file system logs have been flushed back to the hub file system, the hub file system may grant a read lock 722. Note, in some embodiments, file system engines may be arranged to selectively flush portions of the file system log that may be relevant to data being read rather than always flushing the entire log. However, in some embodiments, the entire log may be flushed. Also, note, in some embodiments, file system engines may be arranged to automatically flush one or more portions of file system logs as background operations. Thus, in some cases, for some embodiments, the file system log may have been previously flushed at the time of lock contention depending on the circumstances or usage patterns in the spokes. For example, in some embodiments, if spoke file system clients have been idle for an extended period of time, it may be expected that its file system logs have been previously flushed to its hub file system. In some embodiments, flushing log entries may include flushing invalidation log entries to spoke file systems that may have previously cached file system items or data that may be impacted by the actions associated with the log entries that may be flushed to the hub system. Accordingly, in some embodiments, the invalidation entries may enable spoke file system engines to invalidate cache data associated with the invalidation log entries.

Also, in some embodiments, log entries may include meta-data update log entries that represent changes that may have occurred to file system meta-data associated with file system items shared with spoke file systems. In some embodiments, this meta-data may include fields representing last-access time, file size, file count (for directories), access privileges/permissions updates, or the like.

In some embodiments, if the read lock may be granted to spoke 704, cache read 724 may be executed. In some embodiments, operations associated with cache read 704 may check if the most current version of the requested data may be present in the spoke cache. Accordingly, in some embodiments, cache hit 726 represents if the requested data may be available in the spoke cache enabling the requested data to be provided to the client. Alternatively, in some embodiments, cache miss 728 represents if the spoke cache does not have a current copy of the requested data. Accordingly, in some embodiments, the spoke file system may issue read 730 to the hub file system to obtain a cache copy of the requested data. If the requested data may be copied to the spoke cache, the spoke file system engine may provide it to the client the sent the read request.

Figure 8:
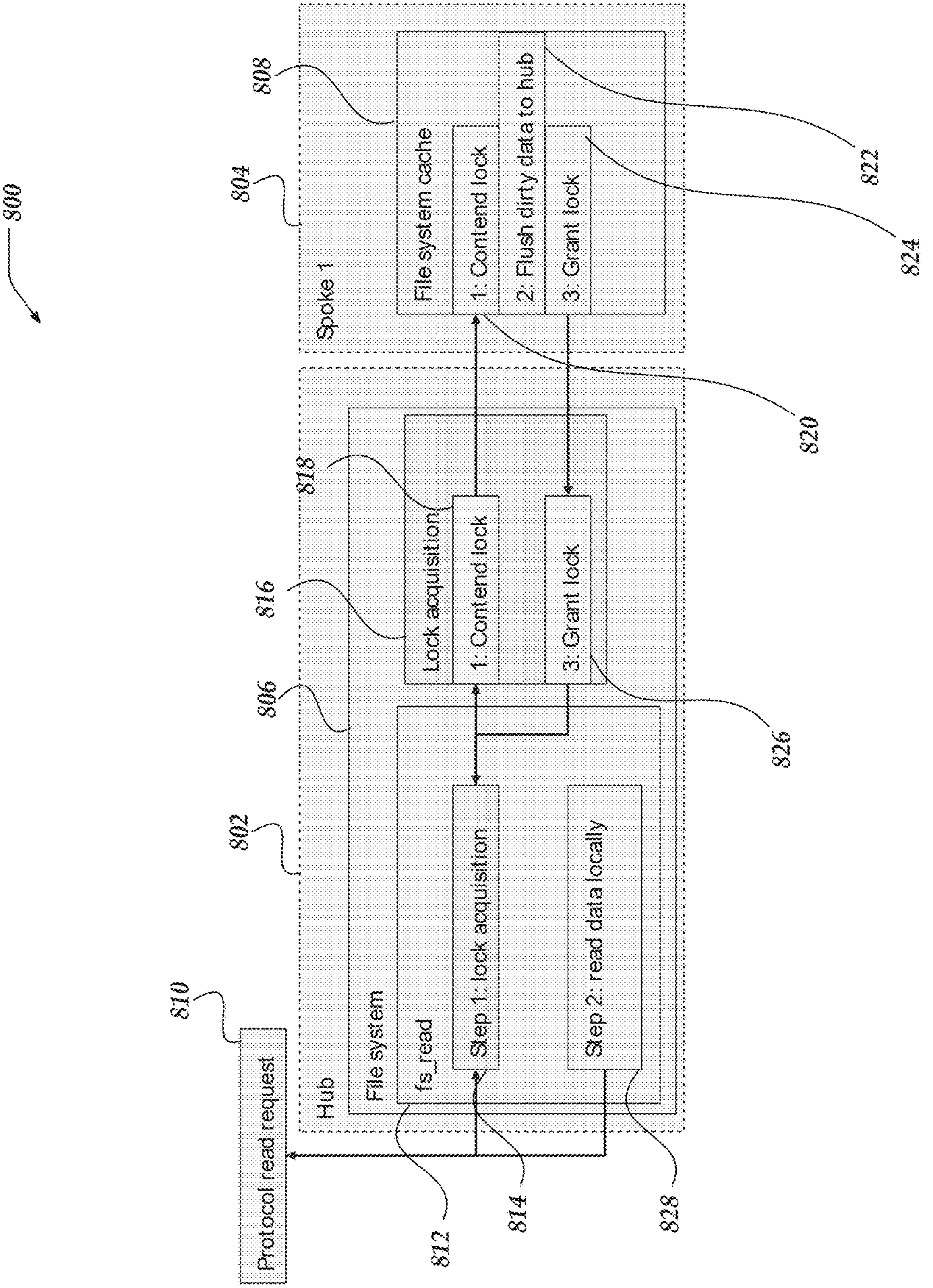
FIG. 8 represents a logical schematic of a file system for the basics of a read command directed to hub file systems for global namespaces for distributed file systems in accordance with one or more of the various embodiments.

FIG. 8 represents a logical schematic of file system 700 for the basics of a read command directed to hub file systems for global namespaces for distributed file systems in accordance with one or more of the various embodiments. This example provides an overview of how read commands directed to a hub file system may be supported by the innovations disclosed herein. For brevity and clarity this description of file system 800 omits some details that will be described in more detail below in subsequent figures and disclosures.

In this example, hub 802 may represent a hub file system that may be configured for sharing a portion of its files in spoke 804. File system 806 represents the file system that owns the shared file system items while file system cache 808 represents a file system cache for storing some or all shared file system items in the spoke file system.

In this example, for some embodiments, a read request, such as protocol read request 810 may be provided by a client (not shown) of hub 802. For example, a user may execute a read file command in their local file system such that the file they may be attempting to read is part of a hub-spoke relationship.

Accordingly, in some embodiments, the hub file system engine may initiate file system read operation 812 to obtain the data of interest. However, in this example, before the data may be sent to the client, the hub file system engine may execute various operations for lock acquisition 814 to ensure an appropriate read lock is obtained.

In some embodiments, hub file system 802 may employ a distributed lock manager to coordinate locks with other file systems with which it may have spoke relationships. Accordingly, in some embodiments, lock acquisition 816 may be initiated by the distributed lock manager on behalf of hub 802. In some embodiments, lock contention 818 may determine there may be outstanding locks that may need to be revoked or file system logs that may need to be flushed. In some embodiments, if spoke 804 may have locks associated with the requested read data, the distributed lock manager may forward the lock contention to spoke 804. Here, represented by lock contention 820, the spoke file system may determine if it has file system log entries relevant to read request 810. In some embodiments, if spoke file system 804 has file system log entries relevant to read request 810, it may flush (824) dirty data that may be local to the spoke file system. For example, if a client of the spoke file system has executed writes on data that read request 810 depends on, the relevant changes may be flushed to the hub file system. Note, in some embodiments, this may include flushing one or more file system log entries to the hub file system. In some embodiments, if the spoke has confirmed it has flushed any relevant data changes to hub file system 802, it may grant the read lock (824) back to the hub file system. Likewise, in some embodiments, if the spoke with an interfering lock has released its lock the hub file system engine may grant the lock (826) for read request 810. In some embodiments, if the read lock may be acquired for read request 810 at the hub file system, the hub file system may assume that it has the current version of the data in its local file system. Thus, in some embodiments, a local file system read operation (828) may be executed to satisfy read request 810.

Figure 9:
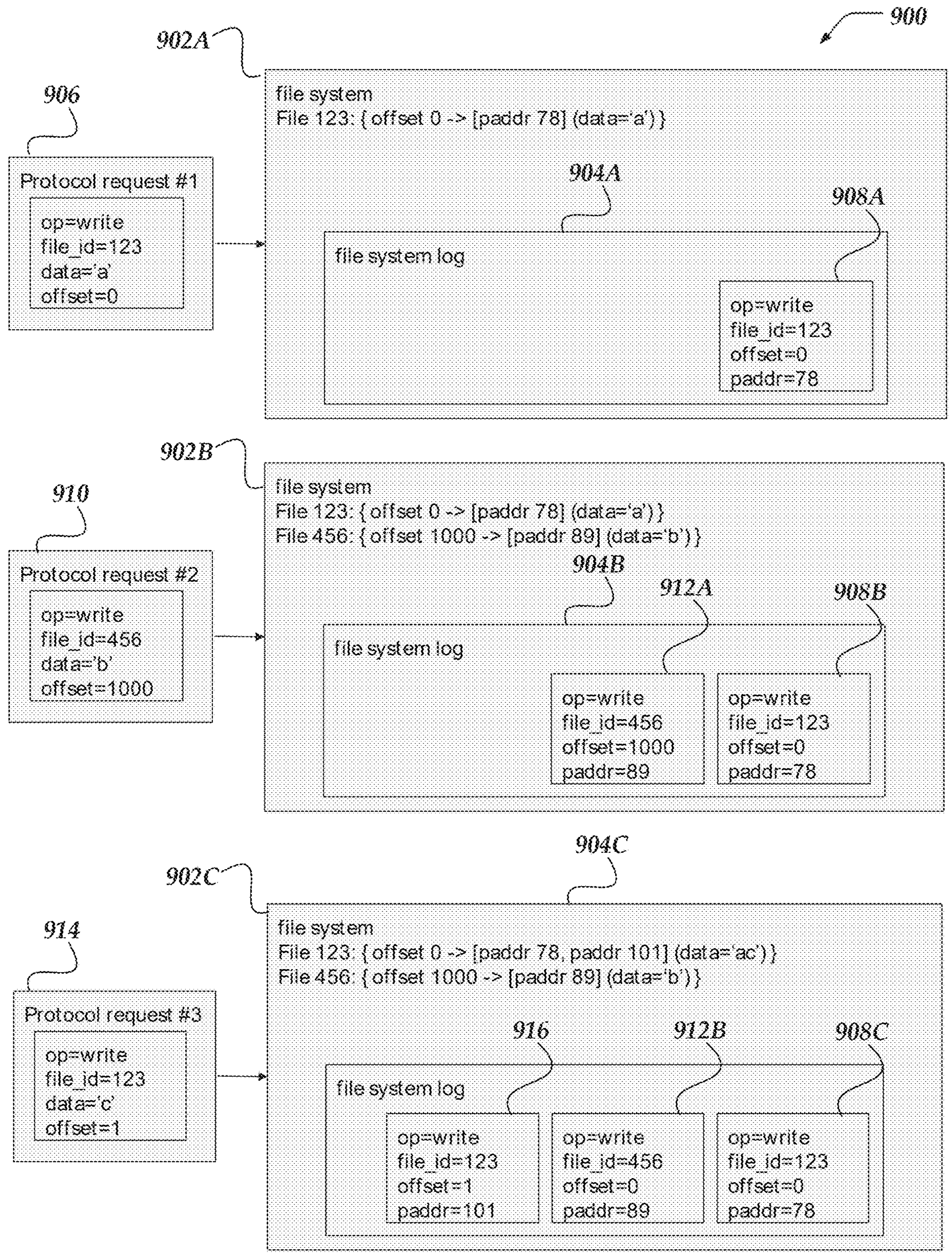
FIG. 9 illustrates a logical schematic of a unified file system log for global namespaces for distributed file systems in accordance with one or more of the various embodiments.

FIG. 9 illustrates a logical schematic of unified file system log 900 for global namespaces for distributed file systems in accordance with one or more of the various embodiments. As described above, in some embodiments, file systems that enable hub and spoke relationships with different file systems may employ a unified logical file system log improving performance or consistency across different file system nodes or file system clusters. In some embodiments, in the absence of a hub or spoke relationships, file system logs may be employed to improve performance or consistency with the cluster of the file system. In some embodiments, if hub and spoke relationships may be configured between two or more file systems, the logical log system may extend to tracking or managing the file system operations for file system items shared to spokes shared to different file systems.

This example provides an overview of how file system logs may be employed as part of the innovations disclosed herein. For brevity and clarity this description of file system log 900 may omit some details that will be described in more detail below in subsequent figures and disclosures.

In this example, file system 902A, file system 902B, and file system 902C represent the same file system in different states. Accordingly, in some embodiments, if a protocol request, such as, protocol request 906 may be processed, rather than delay an acknowledgment to the client at the completion of the operation, file system engines may be arranged to generate and store a file system log entry and then return an acknowledgment that the operation has completed.

In this example, log entry 908A represents a log entry that may correspond to protocol request 906. In some embodiments, log entries may be data structures that capture enough information about its corresponding protocol request to enable the protocol request to replay to recreate the protocol request if necessary. In this example, protocol request 906 is a write request directed to a file with file_id 123. In this example, protocol request 906 is writing data ('a') to the file with file_id 123 at offset 0 in that file. Accordingly, in some embodiments, file system 902A the File 123 may be updated as per the protocol request. Accordingly, in this example, log entry 908A includes enough information to describe how File 123 in file system 902A has been modified.

Similarly, in this example, for some embodiments, protocol request 910 represents a subsequent write request. This time a client is writing to file_id 456 the data 'b' at offset 1000. Accordingly, in some embodiments, file system 902B is now storing File 456 with corresponding log entry 912A. Note, in this example, log entry 908B represents the previous log entry that remains in the log as well.

Also, in this example, for some embodiments, protocol request 914 represents a subsequent write request. This time a client is writing to an existing file, file_id 123 the data 'c' at offset 1. Accordingly, in some embodiments, file system 902C is now storing an updated version of File 123 with corresponding log entry 916. Note, in this example, log entry 908C and log entry 912B represent previous log entries that remain in the log as well.

Accordingly, in some embodiments, write requests from clients may be acknowledged as being completed as soon as the corresponding log entries have been written to the file system log. Thus, in some embodiments, file systems may flush logs in the background rather than making clients wait until the file system has completely processed the request. In some embodiments, file system with hub or spoke relationships, the file system logs associated with operations on spoke file system may be used to replay those changes to the hub file system if the logs are flushed. Also, similarly, file system logs associated with operations on the hub file system may be used to update or invalidate the file system items cached by one or more spoke file systems.

Note, in some embodiments, data written to logs may be protected using various built-in data protection schemes that may be implemented in the file system. Accordingly, in some embodiments, if a file system operation (and its associated data) has been committed to a log, the data may be considered to be recoverable within the scope of file system data recovery schemes. Accordingly, in some embodiments, log entries that have been flushed may be recoverable under normal file system data recovery operations.

Also, as described above, before requests may be executed, including the generation of log entries, clients may be assumed to have acquired the appropriate locks. For example, if file system 902A is a spoke file system, one or more relevant log entries in file system log 904A would have been flushed to its hub file system (if necessary) as part of lock acquisition.

In some embodiments, unless forced by a lock acquisition, file system engines may be arranged to lazily flush spoke file system log files to their corresponding hub file systems.

Accordingly, in some embodiments, file system engines may be arranged to take advantage of operational lulls or periods of reduced utilization to perform log flushes.

Figure 10:
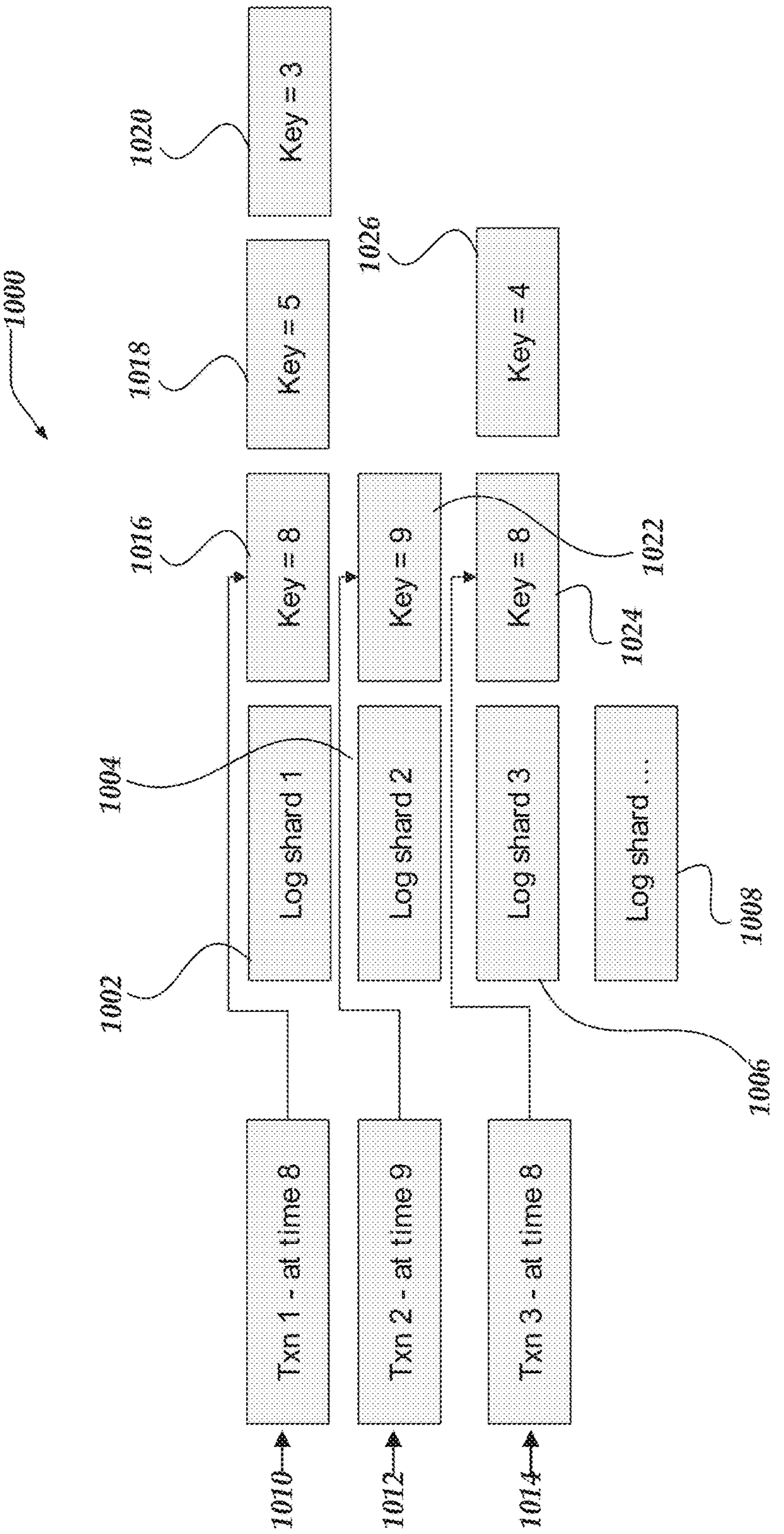
FIG. 10 illustrates a logical schematic for a file system log for global namespaces for distributed file systems in accordance with one or more of the various embodiments.

FIG. 10 illustrates a logical schematic for file system log 1000 for global namespaces for distributed file systems in accordance with one or more of the various embodiments. As mentioned above, in some embodiments, data or operation information stored in file system log may be considered persisted in the file system. Also, in some embodiments, multiple nodes in a cluster may be submitting entries to the file system log. Accordingly, in some embodiments, to avoid the file system log becoming a bottleneck, file system logs may be arranged into two or more shards. Accordingly, in some embodiments, log entries submitted by file system engines may be routed to different file system log shards in a cluster.

In some embodiments, file system engines may be configured to enable two or more file system log shards. Accordingly, in some embodiments, file system engines may be arranged to enable multiple log entries to be stored in different shards at the same time. Otherwise, in some embodiments, lock contention associated with writing to the file system log may be disadvantageous to file system performance. In some embodiments, file system engines may be arranged to determine the particular number of shards based on configuration information. Accordingly, in some embodiments, file system engines may be arranged to enable organizations to tune their file systems in accordance with local requirements or local circumstances.

In this example, for some embodiments, log shard 1002, log shard 1004, log shard 1006, or log shard 1008 logically represent separate log shards. Accordingly, in some embodiments, if file system engines may submit log entries, each entry may be routed to a log shard. In some embodiments, file system engines may be configured to employ various strategies for routing log entries to particular file system log shards. For example, in some embodiments, log entries may be randomly assigned to a shard. For example, in some embodiments, log entries may include sequence numbers, timestamps, logical time indicators, serial numbers, or the like, that may be hashed (or the like) to assign incoming entries to particular log shards. In some embodiments, file system engines may be arranged to determine the particular mechanism for distributing log entries based on rules, instructions, or the like, determined from configuration information to account for local circumstances or local requirements.

In this example, for some embodiments, log transaction 1010, log transaction 1012, and log transaction 1014 represent incoming log entries that may be associated with file system operations. Note, in some embodiments, file system operations may not be considered complete or persisted until the corresponding log entries are stored in the file system log.

In this example, for some embodiments, log transaction 1010 and log transaction 1014 may be considered to occur at the same time. In some embodiments, this may represent concurrent operations that occur on different nodes or file system engine in the same cluster. Also, in this example, log transaction 1012 may represent a file system operation that occurs after log transaction 1010 and log transaction 1014.

In this example, in some embodiments, log entry 1016 may represent a log entry that corresponds to log transaction 1010. Accordingly, in this example, log transaction 1010 may be the latest entry for log shard 1002 so it may be written to the end of the log shard. Thus, in this example, log entry 1016, log entry 1018, and log entry 1020 may represent log entries for file system operations that occurred before log entry 1016. Similarly, in this example, for some embodiments, log transaction 1012 may be stored as log entry 1022. Likewise, in some embodiments, log transaction 1014 may be stored as log entry 1024 with log entry 1026 representing a log entry 1026 that was stored earlier.

In some embodiments, file system engines may be arranged to maintain a record of logical time across all nodes in a file system cluster and all file systems that may be associated with hub-spoke relationships. In some embodiments, file system engines may be arranged to determine logical time based on Lamport Time to enable nodes in the same or different file systems to have a reference for ordering or sorting log entries across different nodes or file systems.

Note, in this example, writing a log entry to "the end" of a log shard may be considered a logical description. In practice, file system engines may be arranged to various data structures, including lists, tree, arrays, stacks, queues, or the like, for storing log entries in a file system.

Figure 11:
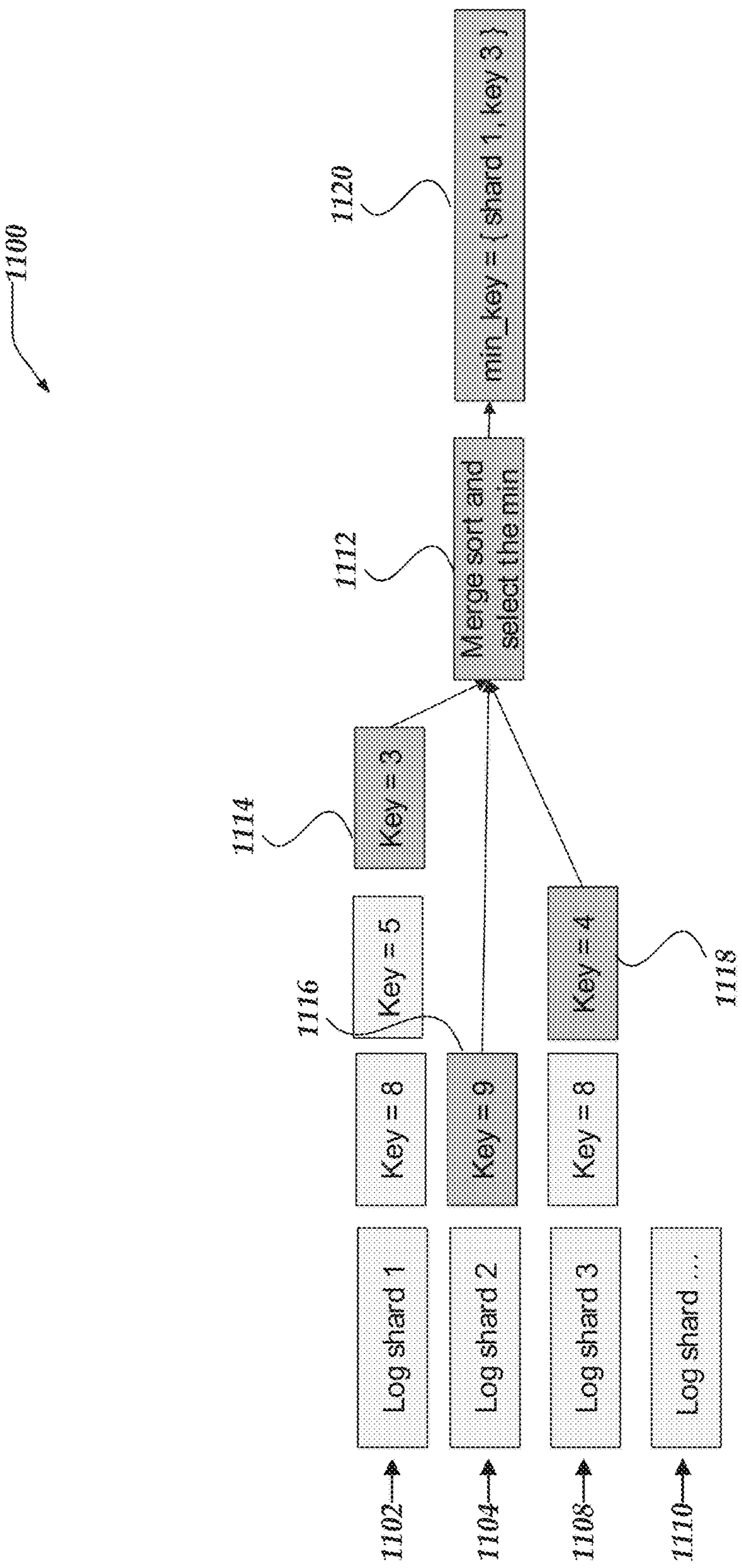
FIG. 11 illustrates a logical schematic for a file system log for global namespaces for distributed file systems in accordance with one or more of the various embodiments.

FIG. 11 illustrates a logical schematic for file system log 1100 for global namespaces for distributed file systems in accordance with one or more of the various embodiments. As mentioned above, in some embodiments, file system engines may be arranged to flush file system log entries from spoke file system to hub file system to maintain file system consistency. In some embodiments, file system log entries may be flushed in the order of their execution in the remote file system. Also, in some embodiments, file system engines may be configured to selectively flush log entries based on dependencies that may be associated with particular file system operations or file data.

In this example, for some embodiments, log shard 1102, log shard 1104, log shard 1106, and log shard 1108 may represent log shards for a file system log in a spoke file system. Accordingly, in some embodiments, if file system engines determine that log entries should be flushed to the hub file system, the entries in the different log shards may be merged and sorted (operation 1112 and operation 1120) based on the logical time associated with each log entry. Accordingly, in some embodiments, log entry 1114, log entry 1116, and log entry 1118 from different log shards may be flushed back to the hub file system the logical order in which the transactions that produced the log entries occurred.

Figure 12:
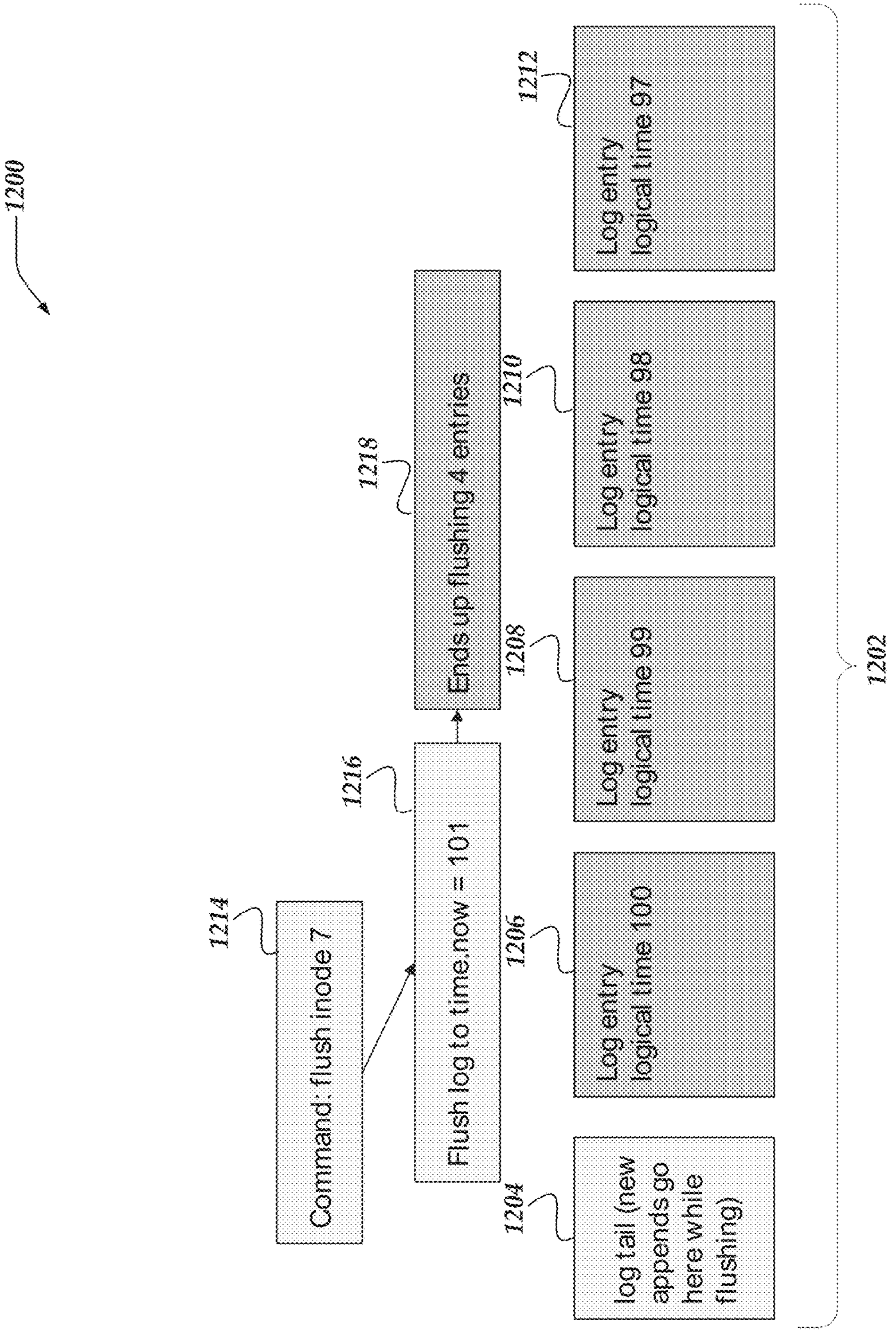
FIG. 12 illustrates a logical schematic of a file system log for global namespaces for distributed file systems in accordance with one or more of the various embodiments.

FIG. 12 illustrates a logical schematic of file system log 1200 for global namespaces for distributed file systems in accordance with one or more of the various embodiments. In some embodiments, file system engines may be arranged to support flush operations directed to particular files (inodes). For example, if in some embodiments, if a file system client may be acquiring a lock for a particular file, the distributed lock manager may trigger a flush of the file system log to ensure that the hub file system may be consistent with changes that may have occurred in spoke file systems.

In this example, for some embodiments, log file 1202 may logically represent a log file for a spoke file system. In this example, for some embodiments, log tail 1204 represents the end of log file. In some embodiments, log tails may be considered a data structure that enables log entries to be appended file system logs during a flush operation. Also, in this example, log entry 1206, log entry 1208, log entry 1210, and log entry 1212 represent log entries in file system log 1202.

In some embodiments, file system engines in spoke file systems may be configured to initiate flush operations on demand. In this example, a file system engine has been sent flush command 1212 that directed it to flush log entries (if any) up to logical time value 101 (operation 1216 and operation 1218). In some embodiments, file system engines may be arranged to flush all the log entries that have a logical timestamp that is the same or earlier than logical time 101. Accordingly, in this example, for some embodiments, log entry 1206, log entry 1208, log entry 1210, and log entry 1212 may be flushed to the hub file system. Accordingly, in some embodiments, file system engines may be arranged to flush all log entries that occurred on or before a stated logical timestamp. In some cases, this may include log entries that may be unassociated with the files or inodes that may have triggered the flush operation. For example, in some embodiments, if log entry 1210 may be unrelated to inode 7 (see, operation 1214), it may be flushed to the hub file system.

However, in some embodiments, file system engines may be arranged to determine which log entries the particular flush command may depend on. For example, if the flush may be generic (e.g., not associated with an inode or file), all of the log entries may be flushed. In contrast, in some embodiments, if the flush command may be associated with one or more particular inodes, file system engines may selectively flush the log entries that may be associated with the one or more particular inodes, if any.

Figure 13:
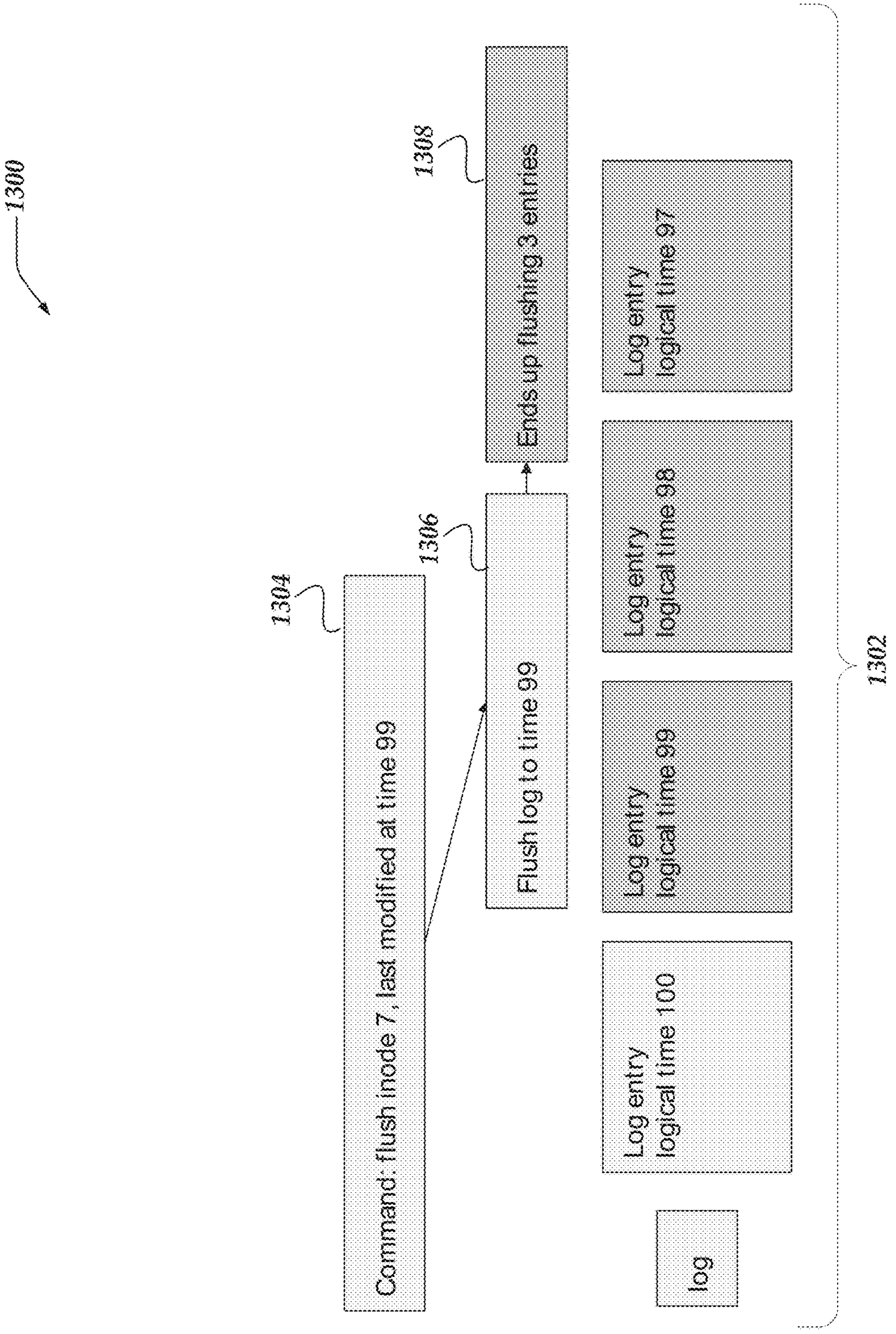
FIG. 13 illustrates a logical schematic of a file system log for global namespaces for distributed file systems in accordance with one or more of the various embodiments.

FIG. 13 illustrates a logical schematic of file system log 1300 for global namespaces for distributed file systems in accordance with one or more of the various embodiments. As mentioned above, in some embodiments, flush commands, such as, flush command 1304 may be associated with a logical time timestamp. Accordingly, as shown in this example, a command to flush an inode up to logical time timestamp 99 (operation 1306) may result in a portion of the log entries (e.g., those that have a logical time timestamp that is 99 or less) in log file 1302 being flushed to the hub file system (operation 1308).

Figure 14:
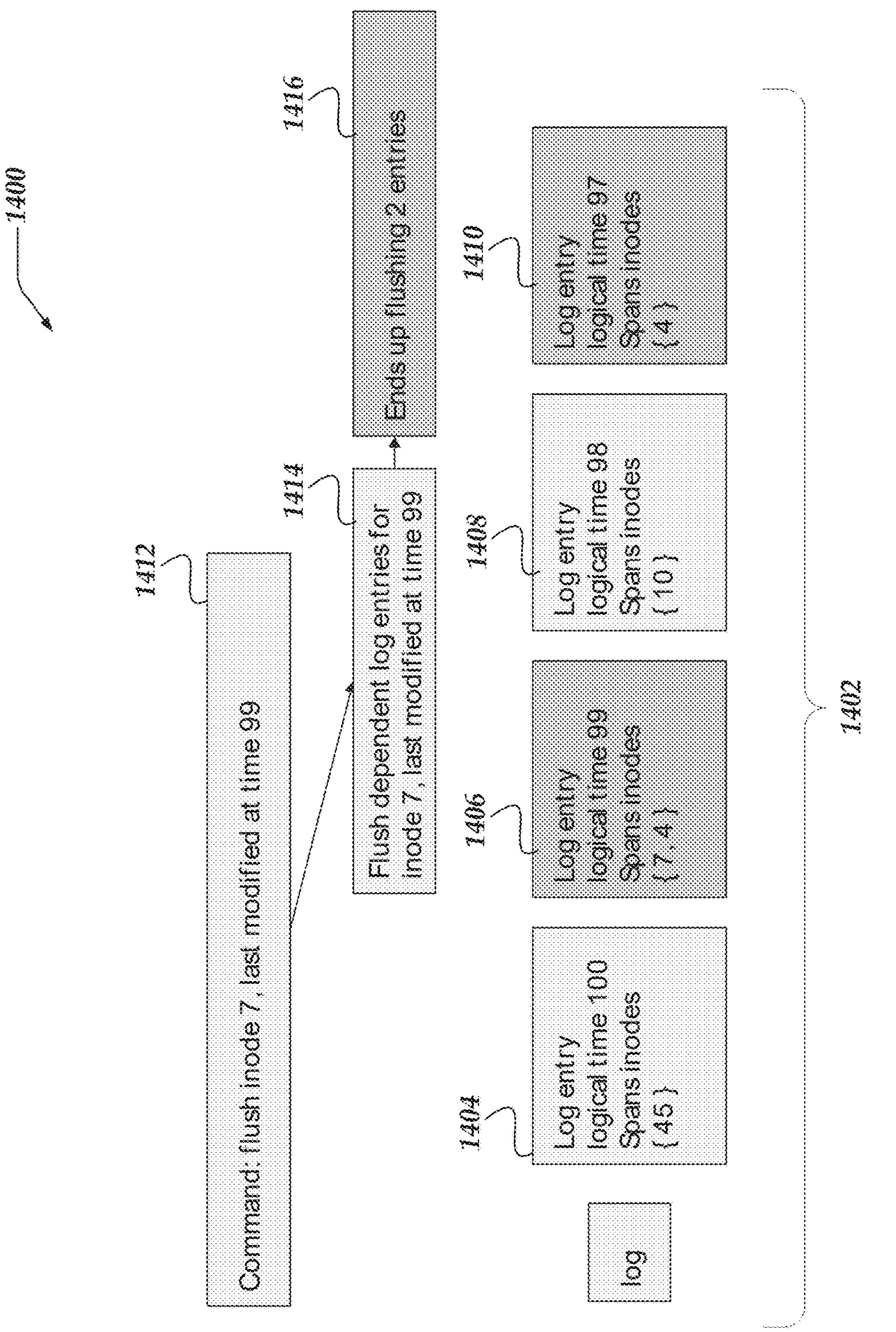
FIG. 14 illustrates a logical schematic of a file system log for global namespaces for distributed file systems in accordance with one or more of the various embodiments.

FIG. 14 illustrates a logical schematic of file system log 1400 for global namespaces for distributed file systems in accordance with one or more of the various embodiments. As described above, in some embodiments, file system engines may be arranged to determine which log entries to flush back to hub file systems based on the logical time timestamp associated with the log entries and the logical time timestamp associated with the flush command.

However, in some embodiments, file system engines may be arranged to selectively determine log entries for flushing based on their dependencies with the particular flush command.

For example, in some embodiments, a flush command associated with general background log maintenance may simply flush all log entries that may be present or all log entries up to a particular logical time timestamp. In some embodiments, these types of flush operations may occur as part of file system internal operations used to periodically flush file system log from spoke file system to hub file systems. In contrast, in some embodiments, if a flush command may be directed to particular file system items, it may be advantageous for file system engines to selectively flush log entries related to the one or more particular file system items rather than non-selectively flushing log entries.

Accordingly, in this example, log file 1402 may include log entry 1404, log entry 1406, log entry 1408, log entry 1410, or the like. In some embodiments, file system engines may be arranged to annotate log entries with information such as logical time timestamp as well as which file system items (inodes) the log entry may be associated with. For example, for some embodiments, log entry 1404 may include meta-data that indicate its logical time timestamp ('100') and which inodes (file system items) it may be associated with, inode '45' in this example. In some cases, for some embodiments one log entry may be associated with more than one inode. For example, log entry 1406 represents a log entry for logical time '99' that is associated with inode '7' and inode '4'. Similarly, in this example, log entry 1408 may be associated with inode '10' and log entry 1410 may be associated with inode '4'.

Thus, in this example, if command 1412 triggers a flush of log entries associated with inode '7' up to logical time '99' (operation 1414), file system engines may be arranged to traverse the file system log to identify log entries associated with inode '7'. In this example, for some embodiments, restricting a log flush to the inode in the command may result in two log entries being flushed (result 1416) rather than four. Accordingly, in some embodiments, the flush operation for inode '7' may be completed faster than if all four log entries were flush.

Figure 15:
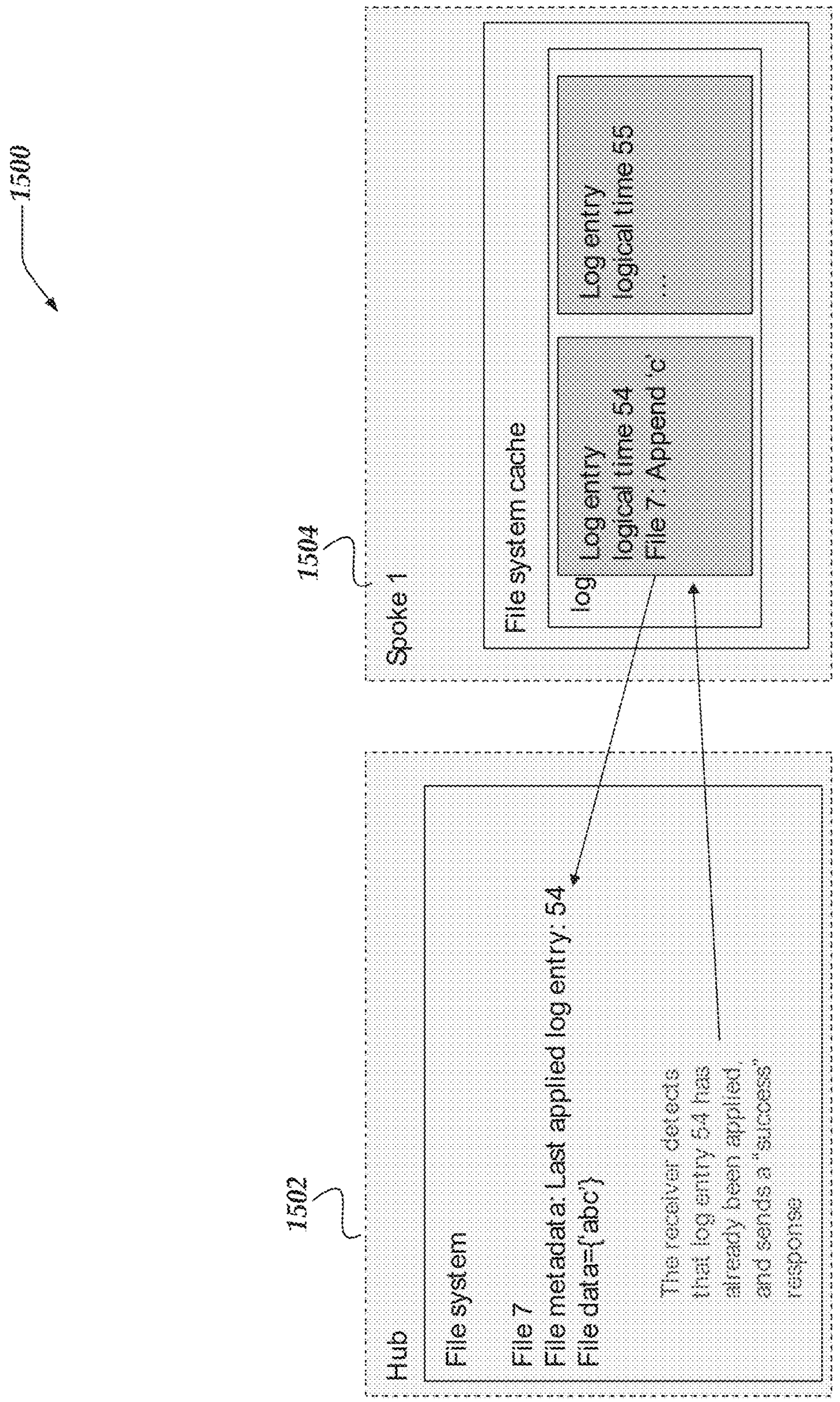
FIG. 15 illustrates logical schematic of a hub-spoke relationship for global namespaces for distributed file systems in accordance with one or more of the various embodiments.

FIG. 15 illustrates logical schematic of hub-spoke relationship 1500 for global namespaces for distributed file systems in accordance with one or more of the various embodiments. In some embodiments, file system engines at hub file system may be arranged to store an attribute with file system items (inodes) that record the logical timestamp of the most recent log entry that has been flushed to the hub file system. Accordingly, in some embodiments, if spoke file system may be interrupted while executing a file system log flush operation, the hub file system may confirm that a flushed log entry should be honored based on a comparison of the logical time timestamp of the last applied log entry with the logical time timestamp included in log entries being flushed.

Accordingly, in some embodiments, hub file system engines may guard against duplicate log entries that may arise for various reasons. Thus. in some embodiments, flushed log entries that have logical time timestamps that may be less or equal to the logical time timestamp recorded with the inode on the hub file system may be discarded or otherwise ignored. For example, in some embodiments, if a spoke file system rebooted or reset before completing a file system log flush, the spoke file system may restart the flush while the hub file system may be enabled to disregard log entries that were previously seen and processed.

In this example, for some embodiments, hub file system 1502 may determine that one or more log entries from spoke file system 1504 may be duplicate entries. In this example, if spoke file system 1504 sends a log entry associated with logical time stamp 54, the hub file system may determine that the flushed log entry may be a duplicate.

Figure 16:
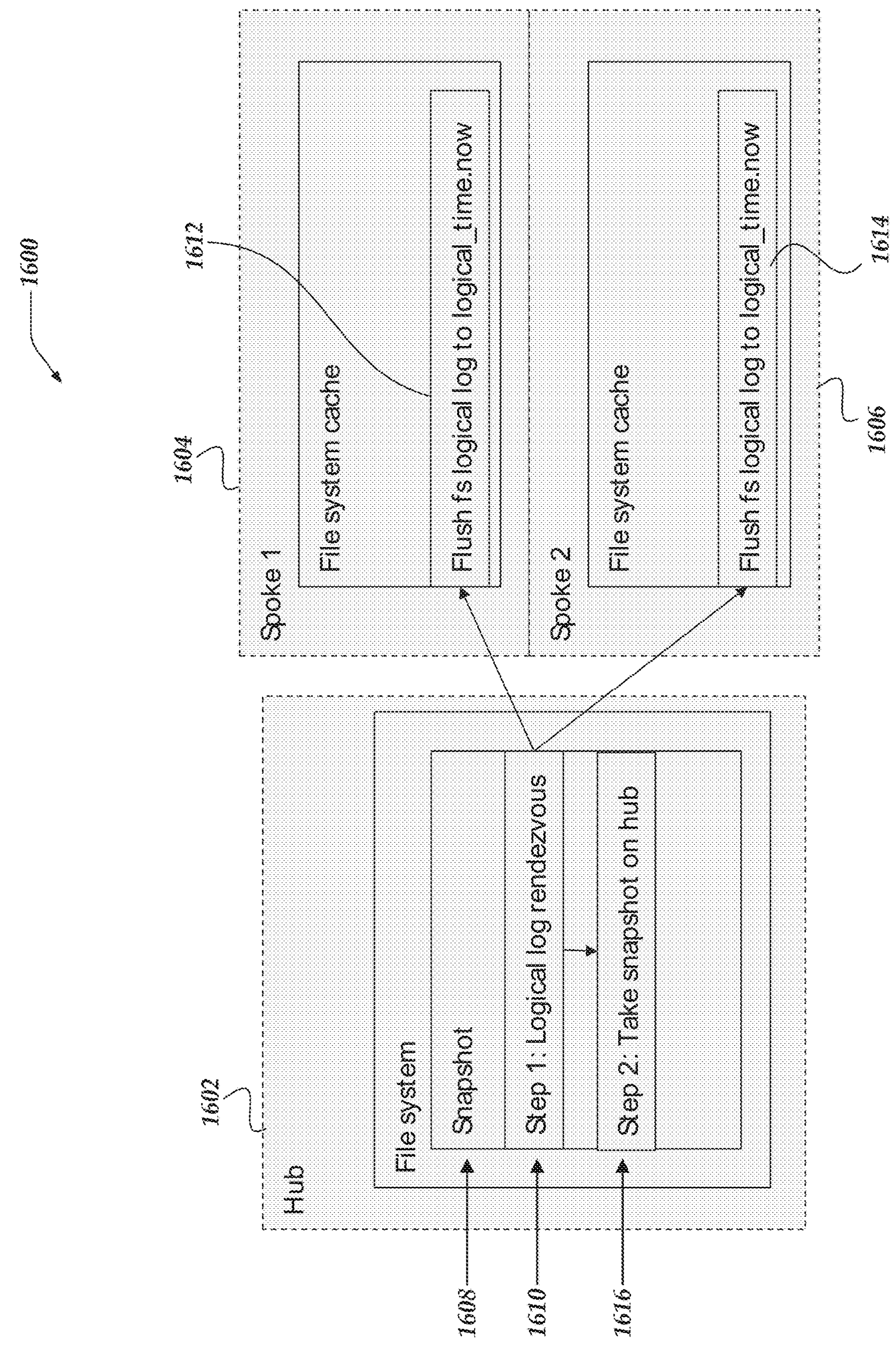
FIG. 16 illustrates a logical schematic of a hub-spoke file system for global namespaces for distributed file systems in accordance with one or more of the various embodiments.

FIG. 16 illustrates a logical schematic of hub-spoke file system 1600 for global namespaces for distributed file systems in accordance with one or more of the various embodiments. In some cases, it may be conventional for file systems to support one or more operations that may preserve the current state of one or more portions of the file systems for various reasons, such as backups, snapshots, archiving, or the like. In this example, a snapshot may be considered to be an operation that enables point in time preservation of the contents of one or more portions of the file system. For brevity and clarity, snapshots used in this context may be assumed to refer to other types of automated or manually initiated file system backup operations.

In this example, for some embodiments, hub file system 1602 may be configured to share files to spoke file system 1604 and spoke file system 1606. Accordingly, in some embodiments, if a snapshot may be initiated at the hub file system (operation 1608), hub file system engines may be arranged to initiate a file system log rendezvous (operation 1610) that may ensure that file system log entries that may be associated with spoke 1604 or spoke 1606 may be flushed to hub file system 1602 before the snapshot may be taken. Accordingly, in some embodiments, hub file system engines may be arranged to initiate a file system log flush on spoke file system 1604 (operation 1612) and spoke file system 1606 (operation 1614). Thus, in some embodiments, if the spoke file system flush log entries they may be storing to the hub file system, the hub file system engines may execute operation 1616 to generate a snapshot of the desired portion of the hub file system.

Figure 17B:
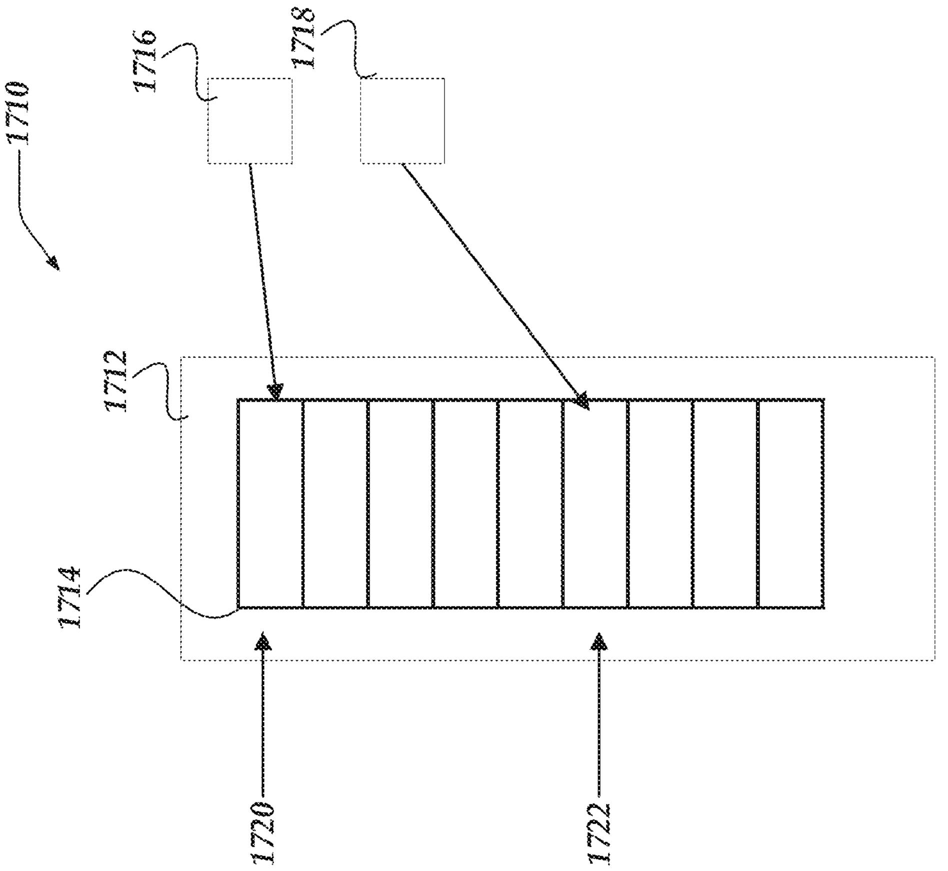
FIG. 17B illustrates a logical schematic of a hub file system engine for global namespaces for distributed file systems in accordance with one or more of the various embodiments.
Figure 17A:
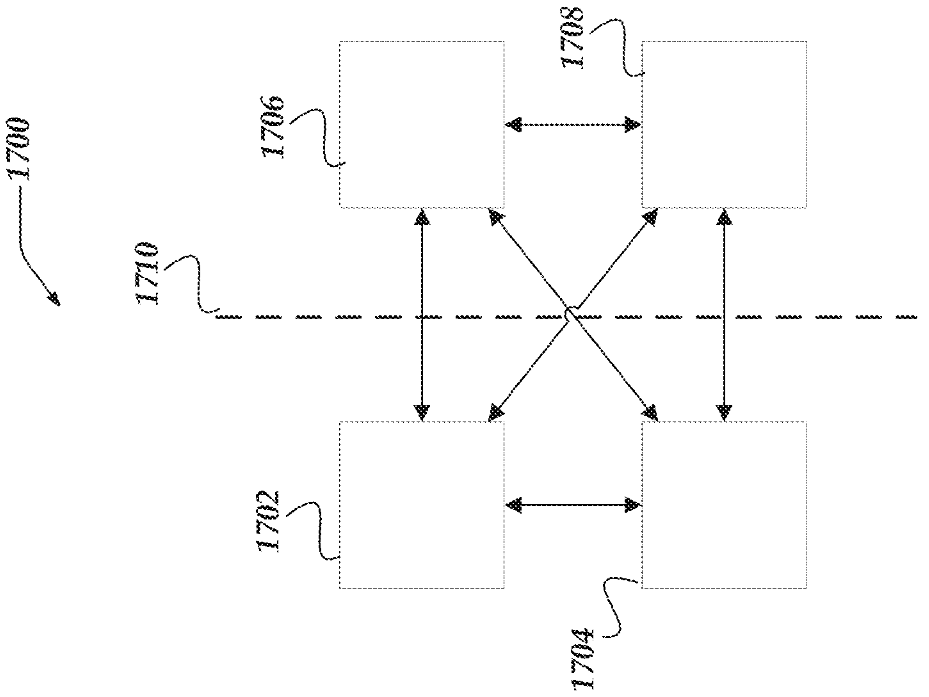
FIG. 17A illustrates a logical schematic of file systems for global namespaces for distributed file systems in accordance with one or more of the various embodiments.

FIG. 17A illustrates a logical schematic of file systems 1700A for global namespaces for distributed file systems in accordance with one or more of the various embodiments. As mentioned above, hub file system may be arranged to replay log entries in the order that their corresponding actions may have occurred in spoke file systems. Accordingly, in some embodiments, file system engines need a reliable time keeping mechanism to enable different nodes in the same cluster or nodes in other remote file systems to track and replay log entries correctly. In some embodiments, relying on conventional time synchronization using standard time services may be disadvantageous because of the number of nodes, distance apart from nodes or shared file systems, or the like. Accordingly, in some embodiments, file system engines may be arranged to employ logical time based on a counter that may be tracked at each node. Accordingly, in some embodiments, if a node communicates with another node, the node sending the communication will include the value of its time counter. Thus, in some embodiments, the receiving node may compare the value of its time counter with the value of the time counter sent from the other node. In some embodiments, the node receiving the message may update its time counter value to the maximum of the sending nodes time counter value or the receiving nodes time counter value and then increment the determined value by one.

Further, in some embodiments, each time a node file system engine requests the current value of its logical time timestamp, the file system engine may increment its local logical time timestamp value.

In this example, for some embodiments, node 1702 and node 1704 may be considered to be nodes in a hub file system while node 1706 and node 1708 may be considered to be nodes in spoke file system. Note, dashed line 1710 indicates the arbitrary logical distance or physical distance between the hub file system and the spoke file system.

In this example, if either cluster comes online for the first time, an initial time counter value may be assigned by controller/coordinator node of each file system. In some embodiments, internal cluster communication may include time counter values which may be updated at each node at each communication/message.

In some embodiments, if a communication is sent from one node to another, the node in the receiving message may update its time counter based on a comparison of its local time counter value and the time counter value accompanying the communication from the other node. For example, if the time counter value of node 1702 is '1000' and the time counter value of node 1706 is '800', if node 1702 sends communication to node 1706, node 1706 will update its time counter value to '1000+1'='1001'. Accordingly, in some embodiments, the time counter value may be used to assign logical time timestamps to log entries.

In some embodiments, additional sequence information may be prepended to time counter values. For example, in some embodiments, if a cluster needs to perform various maintenance operations or resetting operations, it may advance a sequence number each time this occurs. Accordingly, in some embodiments, this sequence number may be prepended to the time counter value to maintain logical time. For example, at first start up a cluster may set its lifetime sequence number to '1'. Accordingly, while the nodes in the cluster perform actions, the time counter value may be incremented as described above. However, if the cluster must be reset, rebalanced, restarted, or the like, its lifetime sequence number may be incremented while the time counter value may be set back to zero. Thus, in some embodiments, the combination of the lifetime sequence number and the current time counter value may ensure that logical time keeps moving in the correct direction. In some embodiments, the combination of the lifetime sequence value and the time counter value may be considered the logical time. For example, referring to the previous example above, if the lifetime sequence value for the cluster that includes node 1702 is '2' its logical time timestamp will be '21000' and if the lifetime sequence value for the cluster than includes node 1706 is '4' its logical time timestamp will be 40800. In this example, the resulting logical time timestamp if node 1702 communicates with node 1706 may be 40801 which maintains the correct time direction for the nodes in the two clusters.

In some embodiments, logical time may be assigned to log entries across multiple clusters to ensure that they may be replayed in the correct order if they are flushed.

FIG. 17B illustrates a logical schematic of hub file system engine 1710 for global namespaces for distributed file systems in accordance with one or more of the various embodiments. In some embodiments, hub file system engines, such as hub file system engine 1712 may be arranged to maintain an invalidation log, such as invalidation log 1714 that may be used to manage notifying spoke file systems that some of the data that may be cached may be invalid.

Accordingly, in some embodiments, if hub file system engines modify files on behalf of hub clients or spoke log entry replays, the hub file system engine may employ the invalidation log to ensure that data cached on relevant spoke file systems may be invalidated as needed. In some embodiments, entries in invalidation logs need to include enough information to invalidate caches of spoke file systems rather than being fully repayable like log entries for the unified log.

In some embodiments, if hub file systems modify shared file system items invalidation log entries may be added to invalidation logs, such as invalidation log 1714. Accordingly, in some embodiments, hub file system engines may send the invalidation log entries to the relevant spoke file systems. In some embodiments, hub file system may be arranged to maintain cursors for tracking which invalidation log entries have been sent to which spoke file system. In this example, cursor 1716 may be associated with a first spoke file system (not shown here) and cursor 1718 may be associated with a second spoke file system (not shown). Accordingly, in some embodiments, cursor 1716 may track that the last invalidation log entry sent to its spoke file system may be invalidation log entry 1720. And, likewise, in this example, cursor 1718 may track that the last invalidation log entry sent to its spoke file system may be invalidation log entry 17122. In some embodiments, using separate cursors for the invalidation log enables different spoke file system to consume invalidation messages at different rates. Also, in some embodiments, such cursors decouple the hub file system from having to wait for all spokes to be sent invalidation messages such that a slow or unavailable spoke may block other spokes from receiving timely invalidation information.

In some embodiments, spoke file systems that receive invalidation log entries from a hub file system may invalidate the corresponding data that may be in their local caches of hub file system items. Accordingly, in some embodiments, if they obtain a lock to enable access to those shared items in the future, they will be enabled to obtain fresh copies of the data from hub file system as necessary.

In some embodiments, hub file system may be arranged to discard invalidation log entries if each dependent spoke file system has acknowledged receipt of those entries.

In some embodiments, hub file system engines may be arranged to determine that some local actions may be omitted from recording in invalidation logs. In some embodiments, if the hub file system can ensure that the file system items involved in the local activity have not been shared to spoke file systems, the invalidation logging may be omitted. For example, if a new file may be created on the hub file system, it may be assumed that the spoke file systems do not have a copy of that file in their cache of items shared from the hub file system.

Generalized Operations

FIGS. 18-25 represent generalized operations for global namespaces for distributed file systems in accordance with one or more of the various embodiments. In one or more of the various embodiments, processes 1800, 1900, 2000, 2100, 2200, 2300, 2400, or 2500 described in conjunction with FIGS. 18-25 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in cloud-based environments. However, embodiments are not so limited and various combinations of network computers, client computers, or the like may be utilized. Further, in one or more of the various embodiments, the processes described in conjunction with FIGS. 18-25 may perform one or more actions for global namespaces for distributed file systems in accordance with at least one of the various embodiments or architectures such as those described in conjunction with FIGS. 1-17. Further, in one or more of the various embodiments, some or all of the actions performed by processes 1800, 1900, 2000, 2100, 2200, 2300, 2400, or 2500 may be executed in part by one or more of file system engine 322, or the like.

Figure 18:
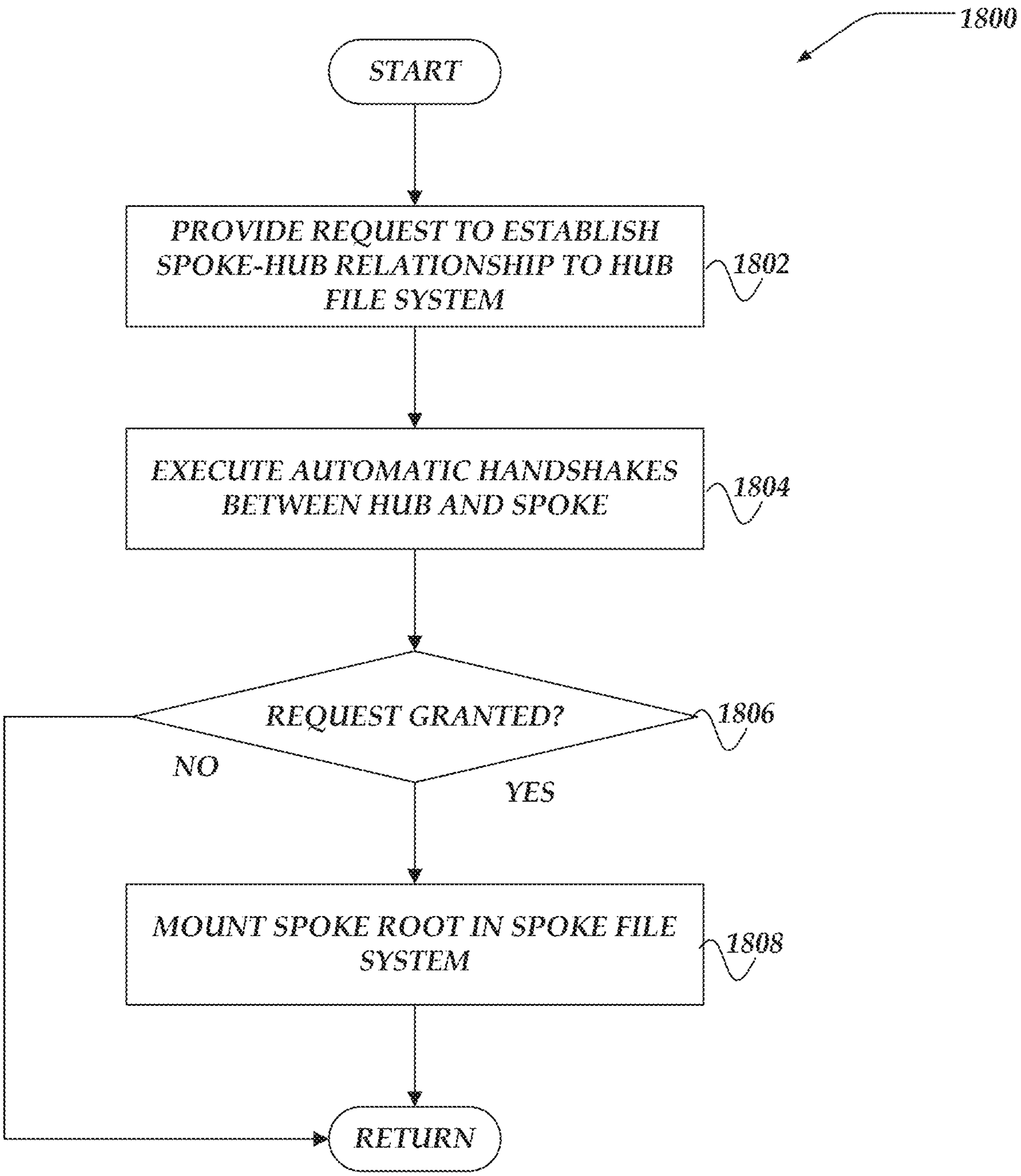
FIG. 18 illustrates an overview flowchart for a process for global namespaces for distributed file systems in accordance with one or more of the various embodiments.

FIG. 18 illustrates an overview flowchart for process 1800 for global namespaces for distributed file systems in accordance with one or more of the various embodiments. After a start flowchart block, at flowchart block 1802, in one or more of the various embodiments, requests to establish a spoke-hub relationship may be provided to a hub file system. In some embodiments, file system engines may be arranged to provide user interfaces that enable file system administrators to submit requests to establish a spoke-hub relationship. Typically, in some embodiments, administrator of a putative spoke file system may submit a request to establish the spoke-hub relationships to a file system engine of the hub file system. In some embodiments, relationships requests may include security credential information, a local directory where the spoke may be mounted, a remote directory that may be the root directory of requested spoke.

At flowchart block 1804, in one or more of the various embodiments, file system engines may be arranged to one or more handshake messages between the spoke file system engine and the hub file system engine to established to authenticate the spoke file system with the hub file system. In some embodiments, file system engines may be arranged to execute one or more cryptographic/security protocols to authenticate the spoke-hub relationship request. This may include two or more handshake messages to share secrets, exchange cryptographic security certificates, obtain passphrases, or the like, depending on the particular protocol being used.

At flowchart decision block 1806, in some embodiments, if the request to establish a spoke-hub relationship may be granted, control may flow to flowchart block 1808; otherwise, control may be returned to a calling process. In some embodiments, if administrators of a putative spoke file system have been authenticated and the relationship request validated, the request may be placed into a queue. Accordingly, in some embodiments, file system engines may be arranged to provide user interfaces that enable administrators of putative hub file systems to review spoke requests, accept/approve spoke requests, or deny spoke requests.

At flowchart block 1808, in some embodiments, spoke file system engines may be arranged to mount the spoke in the spoke file system at the location that was indicated in the request to establish the spoke-hub relationship.

Next, in one or more of the various embodiments, control may be returned to a calling process.

Figure 19:
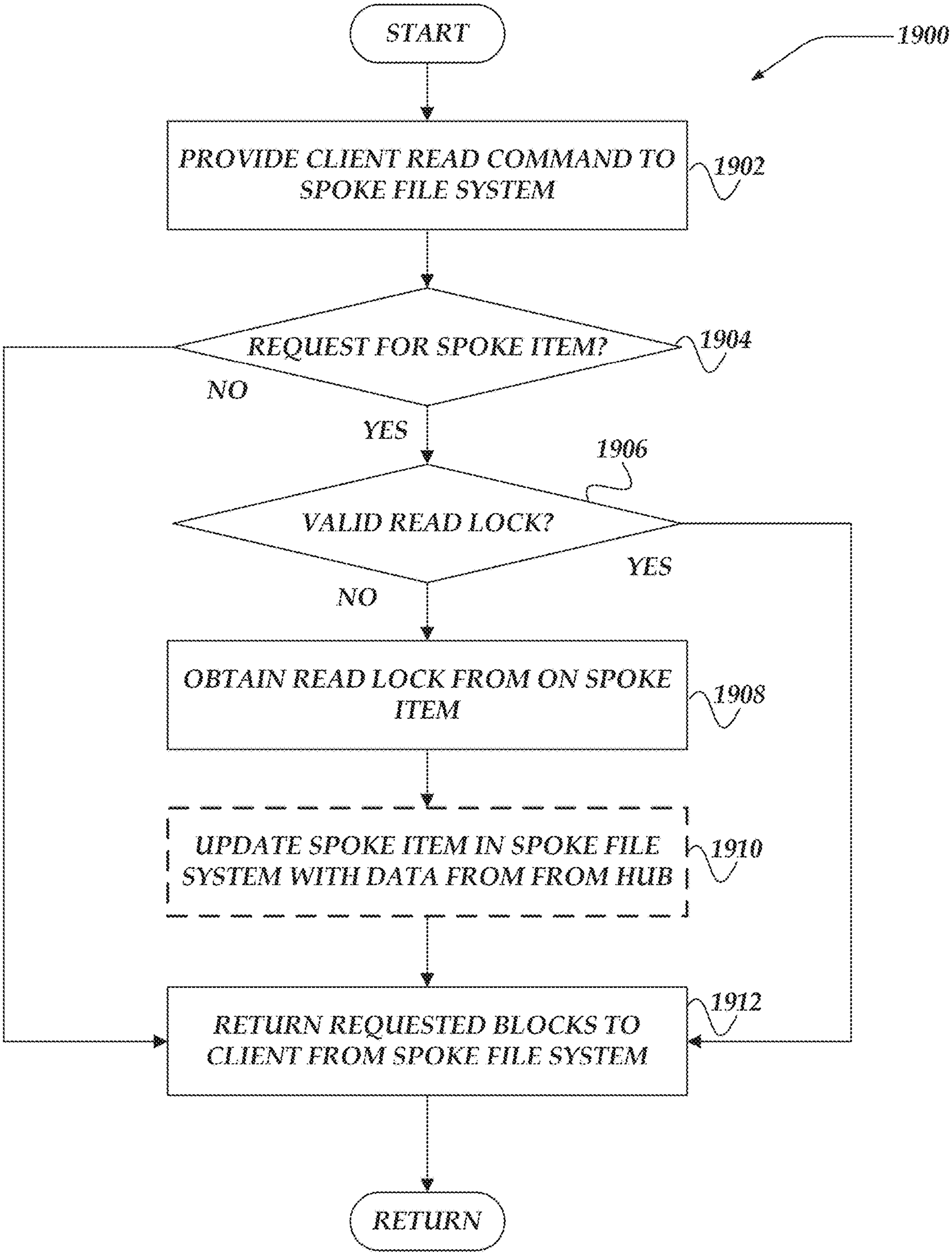
FIG. 19 illustrates a flowchart for a process for global namespaces for distributed file systems in accordance with one or more of the various embodiments.

FIG. 19 illustrates a flowchart for process 1900 for global namespaces for distributed file systems in accordance with one or more of the various embodiments. After a start flowchart block, at flowchart block 1902, in one or more of the various embodiments, a client of the spoke file system may provide a file system read command to the spoke file system engine. In some embodiments, read commands may be considered high level commands given in a spoke file system to read data from a file system item. As described in FIG. 5, the read command may initiate a read transaction comprised of one or more read requests that obtain the data needed to satisfy the read command from various locations in the file system.

At flowchart decision block 1904, in one or more of the various embodiments, if the read command may be associated with a spoke item, control may flow to flowchart decision block 1906; otherwise, control may flow to flowchart block 1912.

In some embodiments, spoke file system engines may be arranged to determine if the read command may be directed to a spoke item based on meta-data associated with requested items. In some embodiments, the spoke directories may include meta-data that may inform the spoke file system engine that the read command may be trying to access data that may be stored in a spoke shared by a hub. In some embodiments, this meta-data may include information regarding which file system engine may be providing the spoke file system items.

Also, in some embodiments, the distributed lock manager may make the determination that the items being read may be shared from hub file system. Accordingly, in some embodiments, hub file system engines may simply attempt to obtain a read lock to access the requested items rather than performing an explicit check to determine if the requested items may be in a shared spoke.

At flowchart decision block 1906, in one or more of the various embodiments, if there may be a valid read lock, control may flow to flowchart block 1912; otherwise, control may flow to flowchart block 1908. As described above, in some embodiments, spoke file system engines may include a distributed lock manager that manages the locks that have been acquired by the spoke file system engine. Accordingly, in some embodiments, the spoke file system engine may employ the distributed lock manager to determine if it has a valid read lock for the data blocks referenced by the read request.

In some embodiments, read locks may be associated with a range of data blocks. Accordingly, in some embodiments, spoke file system engines may employ the distributed lock manager to determine if data blocks associated with read commands are associated with a valid read lock.

In some embodiments, locks may be considered valid if they have not been revoked since the last time they were issued. Thus, in some embodiments, if no other file system clients in either the spoke file system or the hub file system have caused a previously granted lock to be revoked, the previously granted locks may remain valid. Thus, in some embodiments, the distributed lock manager may not be required to communicate with the hub file system engine to determine if the current lock may be valid.

At flowchart block 1908, in one or more of the various embodiments, the spoke file system engine may be arranged to request a read lock from the hub file system.

In some embodiments, spoke file system engines may be arranged to have access to a distributed lock manager that may recognize that the requested data may be a spoke file system item. In some embodiments, distributed lock managers may be configured to recognize hub-spoke relationships if hub-spoke relationships may have been established.

At flowchart block 1910, in one or more of the various embodiments, optionally, the hub file system engine may be arranged to perform lock contention actions for the request.

Accordingly, in some embodiments, if there may be an intervening lock on the data being read, the distributed lock manager (or file system engines) may request or demand that the current lock holder release the lock.

Further, in some embodiments, hub file system engines may be arranged to initiate a flush of file system logs that may be associated with its spokes. For example, if another spoke had modified the requested data, the hub file system engine may flush the log entries from that spoke to the hub to update the hub file system based on the changes (if any) that were made by the spoke. Note, in some cases, the log entries associated with changes made by the spoke file system may have already been flushed to the hub. In such circumstances, in some embodiments, the distributed lock manager may revoke the locks of the other spokes without requiring a log flush.

Note, this flowchart block is indicated as being optional because in some cases the log entries associated with the read command may have been previously flushed to the hub by a background maintenance process.

At flowchart block 1912, in one or more of the various embodiments, the hub file system engine (or distributed lock manager) may grant the appropriate read lock to the spoke file system requesting the read.

At flowchart block 1914, in one or more of the various embodiments, the spoke file system engine may be arranged to provide the requested data blocks to the client.

In one or more of the various embodiments, data blocks copied from the hub file system may be cached in the spoke file system as part of satisfying the read request. Further, other file system features, such as data protection, data distribution, encryption, or the like, may be applied as usual if the data blocks or corresponding log entries may be stored in the spoke file system.

In some embodiments, the data blocks copied from the hub file system may be used to satisfy the read command. Note, in some embodiments, several low-level read requests may be required to satisfy one read command. Accordingly, in some embodiments, there may be more locks to acquire, or the like, before the read command may be completely satisfied.

Further, in some embodiments, if the lock request may be denied by the hub file system, spoke file system engines may return an error message, or the like, indicating that the read command may not be able to be completed.

Next, in one or more of the various embodiments, control may be returned to a calling process.

Figure 20:
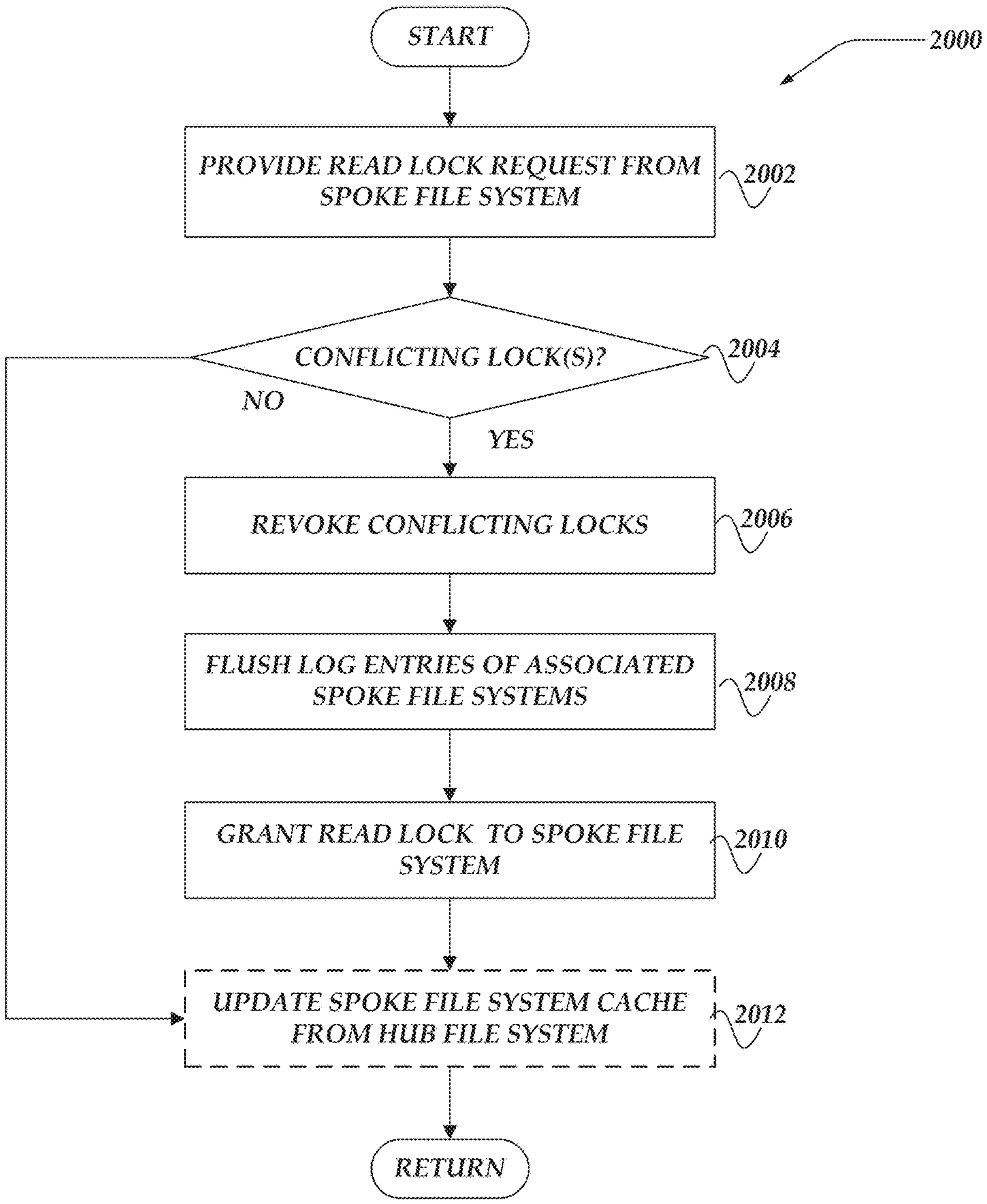
FIG. 20 illustrates a flowchart for a process for global namespaces for distributed file systems in accordance with one or more of the various embodiments.

FIG. 20 illustrates a flowchart for process 2000 for global namespaces for distributed file systems in accordance with one or more of the various embodiments. After a start flowchart block, at flowchart block 2002, in one or more of the various embodiments, the hub file system engines may be provided a read lock request on behalf of a client of a spoke file system.

At flowchart decision block 2004, in one or more of the various embodiments, if there may be one or more contending locks on the requested items, control may flow to flowchart block 2006; otherwise, control may flow to flowchart block 2010.

In some embodiments, file system engines may be arranged to employ distributed lock managers to manage file system locks that may be granted across multiple file systems (e.g., the hub file system and one or more spoke file systems). Accordingly, in some embodiments, spoke file system engines may be arranged to directly employ the distributed lock manager to determine if the file system items associated with the read command may have the appropriate lock.

Likewise, in some embodiments, distributed lock managers may be arranged to enable spoke file system engines to access the requested file system items if the distributed lock manager determines that a valid/suitable lock has already been granted to the client making the request of the spoke file system engine.

At flowchart block 2006, in one or more of the various embodiments, the distributed lock manager or hub file system engine may be arranged to revoke the conflicting locks. Accordingly, in some embodiments, distributed lock managers or hub file system engines may be arranged to send a message to one or more spoke file system that revoke the conflicting locks. Also, in some embodiments, distributed lock managers may be arranged to update its lock records such that the appropriate locks may be revoked. Thus, in some embodiments, if a former lock-holder attempts to validate its locks using the distributed lock manager, the distributed lock manager will report that the lock-holder does not have the necessary locks and must obtain them before continuing.

At flowchart block 2008, in one or more of the various embodiments, the hub file system engine or distributed lock managers may be arranged to direct one or more spoke file systems to flush their log entries to the hub file system.

In some embodiments, one or more spoke file systems may have one or more relevant log entries that may be flushed back the hub file system. Accordingly, in some embodiments, the hub file system may replay the one or more log entries to bring the hub file system into an up to date or otherwise consistent state relative to the changes that may have been made on spoke file systems.

In some embodiments, one or more background processes may be running to flush log entries from spoke file systems to their hub file system such that the hub file system may already be consistent with its spoke file systems.

At flowchart block 2010, in one or more of the various embodiments, the hub file system or distributed lock manager may be arranged to record the new read locks for the read request.

In some embodiments, if the one or more spoke file systems that were holding relevant locks have completed flushing their log entries to the hub file system, those one or more spoke file systems (or their distributed lock manager) may release the relevant locks.

At flowchart block 2012, in one or more of the various embodiments, optionally, the hub file system engine may be arranged to update the spoke file system spoke cache with data changes (if any) to the spoke file system that requested the lease. In some embodiments, a current version of the data being read by the client of the spoke file system may be available in the spoke file system, the spoke file system engine may provide it to the client. However, in some embodiments, if request data may be absent from the spoke file system cache, the spoke file system engine may update its cache from the hub file system. Likewise, in some embodiments, if an out of date copy of the data may be in the spoke file system cache, the spoke file system engines may request the updated data from the hub file system. For example, in some embodiments, hub file system engines may send invalidation log entries to spoke file systems to enable spoke file system engines to mark cached data as invalid or out-of-date. In some embodiments, hub file system engines may distribute invalidation log entries may be on-demand during lock contention operations. Also, in some embodiments, hub file system engine may be arranged to periodically send invalidation entries to spoke file systems as part of normal file system operations.

This flowchart block is indicated as being optional because in some cases the a current copy of the requested data may be present in the spoke file system cache.

Next, in one or more of the various embodiments, control may be returned to a calling process.

Figure 21:
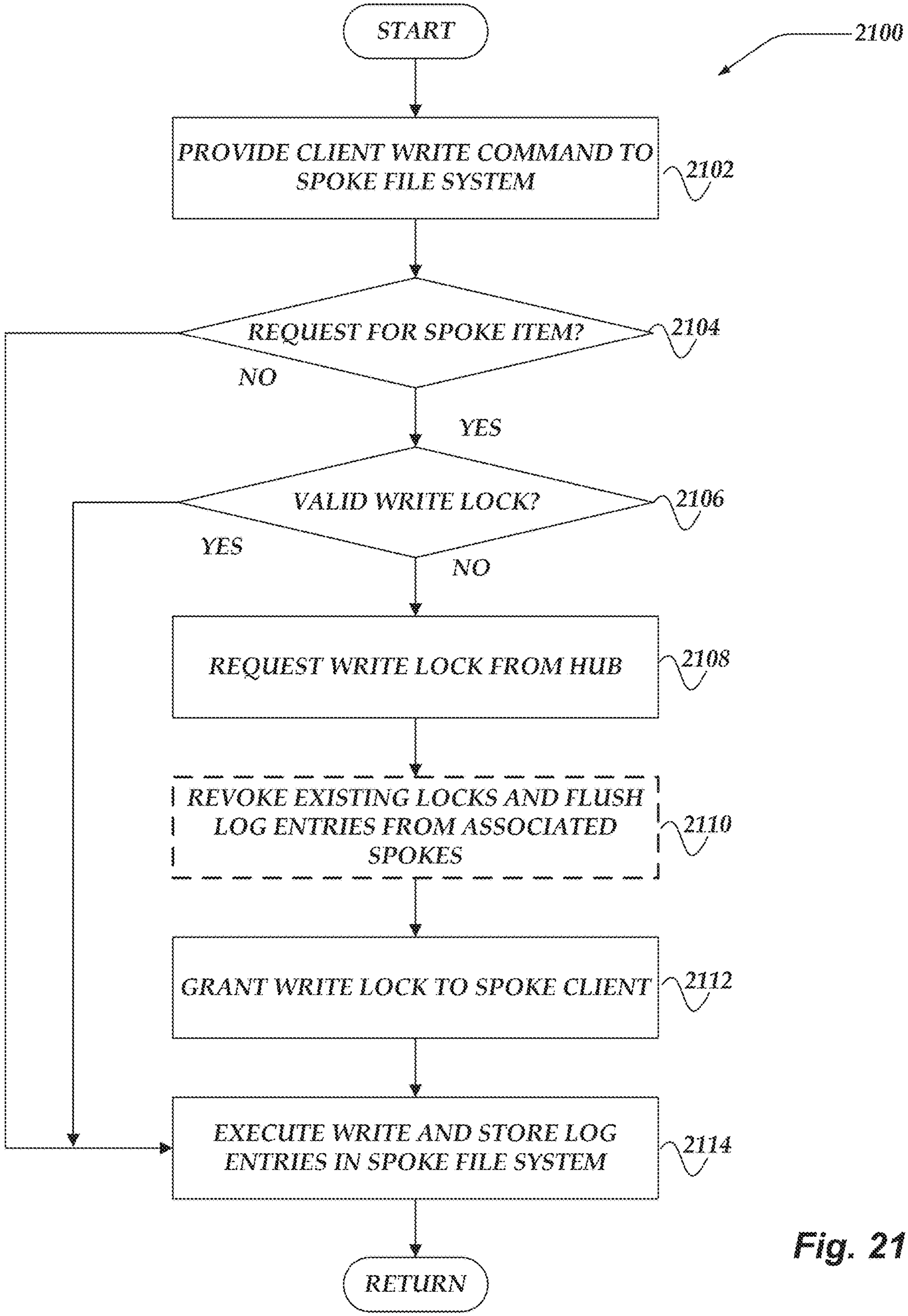
FIG. 21 illustrates a flowchart for a process for global namespaces for distributed file systems in accordance with one or more of the various embodiments.

FIG. 21 illustrates a flowchart for process 2100 for global namespaces for distributed file systems in accordance with one or more of the various embodiments. After a start flowchart block, at flowchart block 2102, in one or more of the various embodiments, a client of the spoke file system may provide a write command to a spoke file system engine. In some embodiments, write commands may include client level commands, such as writing to a file, deleting a file, creating a new file, moving a file, or the like.

At flowchart decision block 2104, in one or more of the various embodiments, if the write command may be associated with a spoke item, control may flow to flowchart decision block 2106; otherwise, control may flow to flowchart block 2114. Similarly, as described above for read lock requests, the spoke file system engine may determine if the file system item that may be that target of the write command may be a spoke item.

At flowchart decision block 2106, in one or more of the various embodiments, if there may be an existing valid write lock for the write requests, control may flow to flowchart block 2114; otherwise, control may flow to flowchart block 2108. Accordingly, in some embodiments, if the spoke file system has a valid write lock for the portions of the target file system items that may be affected by the write command, the write may proceed under the existing write lock.

At flowchart block 2108, in one or more of the various embodiments, the spoke file system engine may be arranged to request a write lock from the hub file system. Similar to requesting read lock, if spoke file system engines need a write lock, it may send a request to the hub file system or distributed lock manager.

At flowchart block 2110, in one or more of the various embodiments, optionally, the spoke file system engine may be arranged to revoke existing locks that may be associated with the write data and flush log entries from associated spokes to the hub file system.

Note, this flowchart block may be indicated as being optional because in some cases, for some embodiments, the data currently on the spoke file system may be current or its log entries may have been previously flushed to the hub file system.

Also, in some embodiments, hub file system engines may update the meta-data associated with the shared items affected by the write to indicate the last applied log entry.

At flowchart block 2112, in one or more of the various embodiments, the hub file system engine or distributed lock manager may be arranged to grant the requested lock to the client of the spoke file system.

At flowchart block 2114, in one or more of the various embodiments, the spoke file system engine may be arranged to execute the write request and store the corresponding log entries in file system log at the spoke file system. As described above, if a client of a spoke file system writes data to items shared from their hub file system, the spoke file system engine may generate log entries for the writes and acknowledge that the write was successful as soon as the log entries are persisted to storage in the spoke file system.

In some embodiments, log entries may be generated to include meta-data that indicates which file system items (inodes) may be associated with each log entry.

Next, in one or more of the various embodiments, control may be returned to a calling process.

Figure 22:
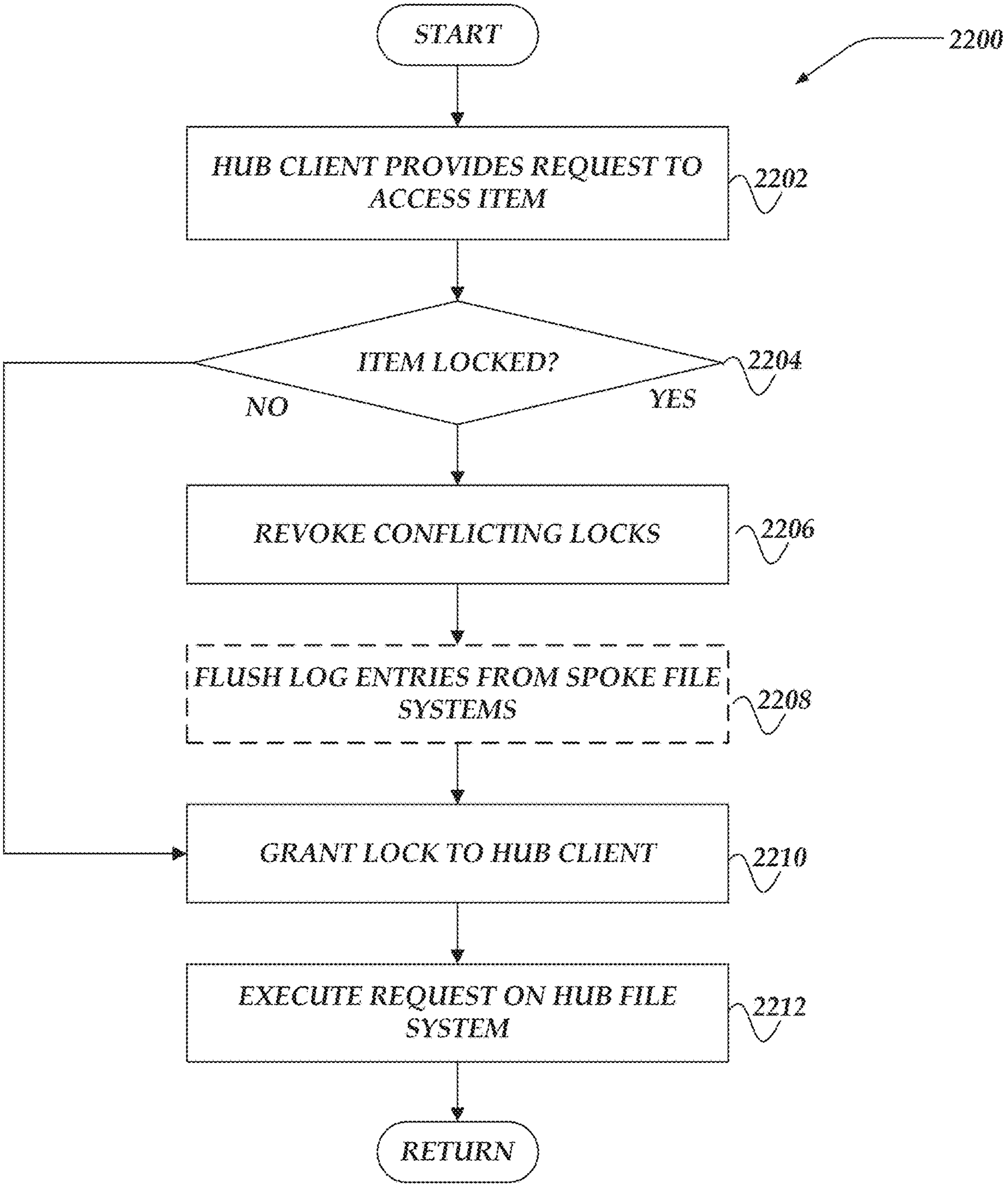
FIG. 22 illustrates a flowchart for a process for global namespaces for distributed file systems in accordance with one or more of the various embodiments.

FIG. 22 illustrates a flowchart for process 1200 for global namespaces for distributed file systems in accordance with one or more of the various embodiments. After a start flowchart block, at flowchart block 2002, in one or more of the various embodiments, the hub file system engines may be provided a lock request on behalf of a client of the hub file system.

In some embodiments, hub file systems that share portions of their file system items with spoke file system still provide file system services for local clients of the hub file system. However, in some embodiments, file systems that may be sharing items to spoke file systems may be arranged to execute one or more additional actions to support sharing items to spoke file systems.

At flowchart decision block 2204, in one or more of the various embodiments, if the requested item may be locked, control may flow to flowchart block 2206; otherwise, control may flow to flowchart block 2210. In some embodiments, file systems may support many local clients or many spoke clients. Accordingly, in some embodiments, in some cases there may be existing locks that may interfere with the requests provided by local hub file system clients.

In some embodiments, hub file system engine may be arranged to employ a distributed lock manager to determine if data associated with the local request may be associated with another intervening lock.

At flowchart block 2206, in one or more of the various embodiments, the hub file system engine or distributed lock manager may be arranged to revoke the one or more conflicting locks. In some embodiments, revoking all locks on the data of interest may prevent changes to the data while the hub file system may be performing actions to enable the incoming local request. In some embodiments, hub file system engines may be arranged to wait until the distributed lock manager has revoked the outstanding locks, if any.

At flowchart block 2208, in one or more of the various embodiments, optionally, the hub file system engine may signal its one or more spoke file system engines to flush their relevant log entries.

In some cases, for some embodiments, one or more shared spoke file systems may have made updates or changes to the data of interest. In some cases, the log entries stored at the spoke file systems may need to be flushed and replayed by the hub file system to ensure that the hub file system is consistent with changes made via spoke file systems.

Accordingly, in some embodiments, hub file system engines or distributed lock managers may be arranged to initiate log entry flushes at one or more spoke file systems. In some embodiments, the flushes may be directed to previous lock holders rather than every spoke file system. For example, in some embodiments, distributed lock managers may be arranged to track which spoke file system have been granted write locks to which file system items. Accordingly, in some embodiments, if a write lock has been granted to a particular spoke file system, the log entries for that particular spoke file system may be flushed rather flushing all of the log entries for each spoke file system.

In some embodiments, hub file systems may be arranged to replay each flushed log entry to enable the hub file system to be consistent with changes that were to shared items at the spoke file systems. In some embodiments, log entries may be replayed in order based on the logical time timestamp associated with each log entry.

In some embodiments, hub file system engines may be arranged to generate invalidate log entries for commands executed based on log entries flushed from spoke file systems. Accordingly, in some embodiments, flushing the invalidation log may enable spoke file systems to invalidate file system items data that may be stored in local caches.

Note, this flowchart block is indicated as being optional because in some cases the spoke file system may not have any relevant outstanding log entries.

At flowchart block 2210, in one or more of the various embodiments, the hub file system engine or distributed lock manager may grant the write lock to the requesting hub client. In some embodiments, if the log entries associated with the request may be flushed, the locks associated with the file system items associated with the request may be released.

At flowchart block 2212, in one or more of the various embodiments, the hub file system engine may execute the commands directly in the hub file system. In some embodiments, hub file system engines may be arranged to execute the hub client's request in the file system.

In some embodiments, hub file system engines may be arranged to generate invalidation log entries associated with the execution of locally executed command. In some embodiments, the invalidation logs may be communicated to spoke file systems to enable them to invalidate local copies of file system item data as needed.

Next, in one or more of the various embodiments, control may be returned to a calling process.

Figure 23:
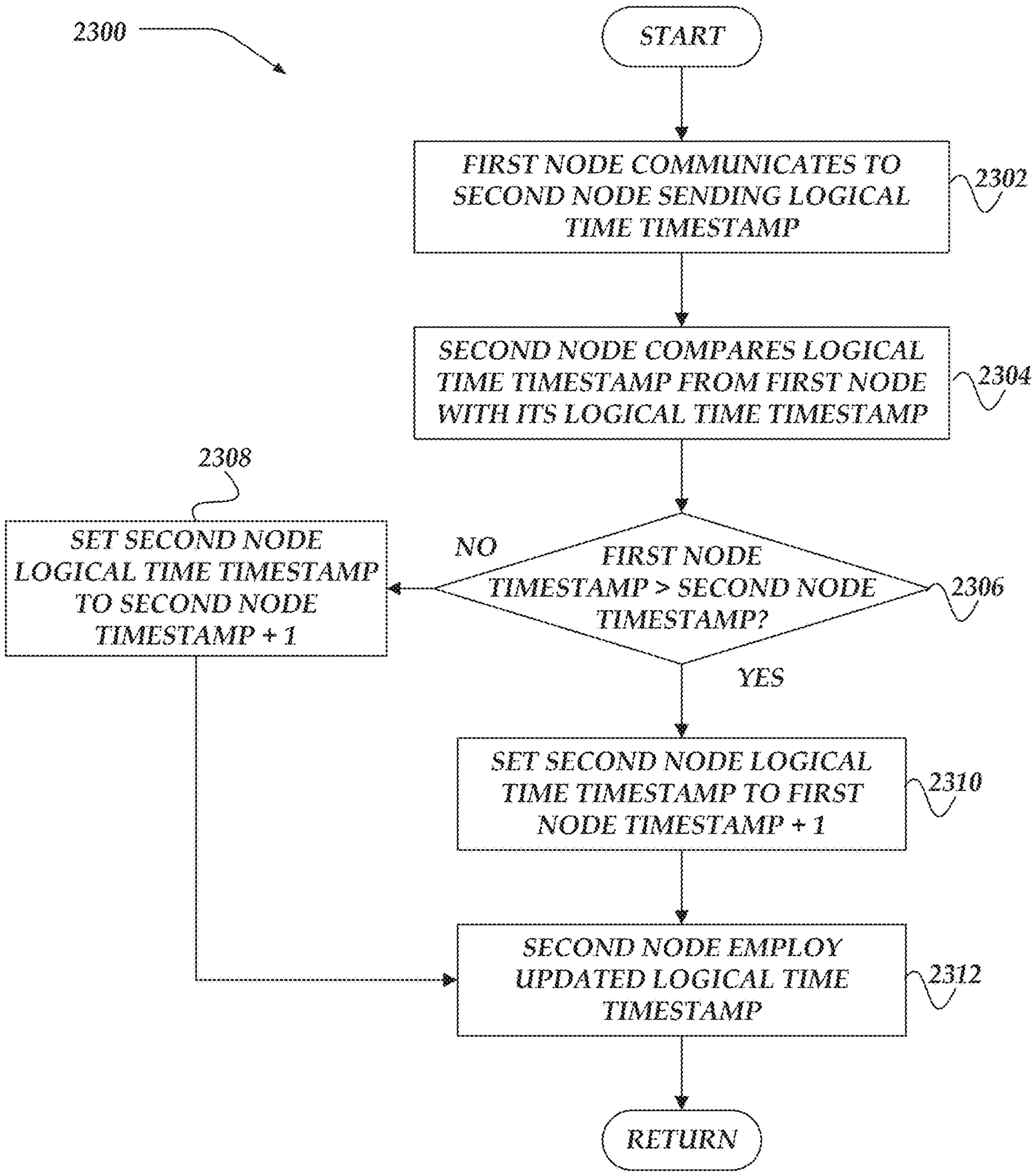
FIG. 23 illustrates a flowchart for a process for managing logical time for global namespaces for distributed file systems in accordance with one or more of the various embodiments.

FIG. 23 illustrates a flowchart for process 2300 for managing logical time for global namespaces for distributed file systems in accordance with one or more of the various embodiments. After a start flowchart block, at flowchart block 2302, in one or more of the various embodiments, a first node in file system may send a communication to a second node such that the communication includes the first node's logical time timestamp.

At flowchart block 2304, in one or more of the various embodiments, a file system engine on the second node may be arranged to compare the first node's logical time timestamp with its own logical time timestamp.

At decision flowchart block 2306, in one or more of the various embodiments, if the logical time timestamp from the first node may be greater than the logical time timestamp of the second node, control may flow to flowchart block 2308; otherwise, control may flow to flowchart block 2310.

At flowchart block 2308, in one or more of the various embodiments, the second node's file system engine may be arranged to set its logical time timestamp to the value of the first node's logical time timestamp incremented by one. Next, control may flow to flowchart block 2312.

At flowchart block 2310, in one or more of the various embodiments, the second node's file system engine may be arranged to set its logical time timestamp to the value of its (the second node) logical time timestamp incremented by one.

At flowchart block 2312, in one or more of the various embodiments, the second nodes'file system engine may be arranged to employ its updated logical time timestamp value for various time sequenced operations, such as assigning it log entries, or the like.

Further, in some embodiments, each time a node file system engine requests the current value of its logical time timestamp, the file system engine may increment its local logical time timestamp value.

For example, in some embodiments, clients of a spoke file system perform one or more actions that require unified file system log entries to be generated, the file system engines may request a current logical time timestamp value to associated with each log entry such that each request for a current logical time timestamp value may increment the current logical time timestamp for the node. Thus, in some embodiments, logical time timestamps for each write in a sequence of writes performed by a spoke file system client may increment the logical time timestamp in the spoke file system by one.

Next, in one or more of the various embodiments, control may be returned to a calling process.

Figure 24:
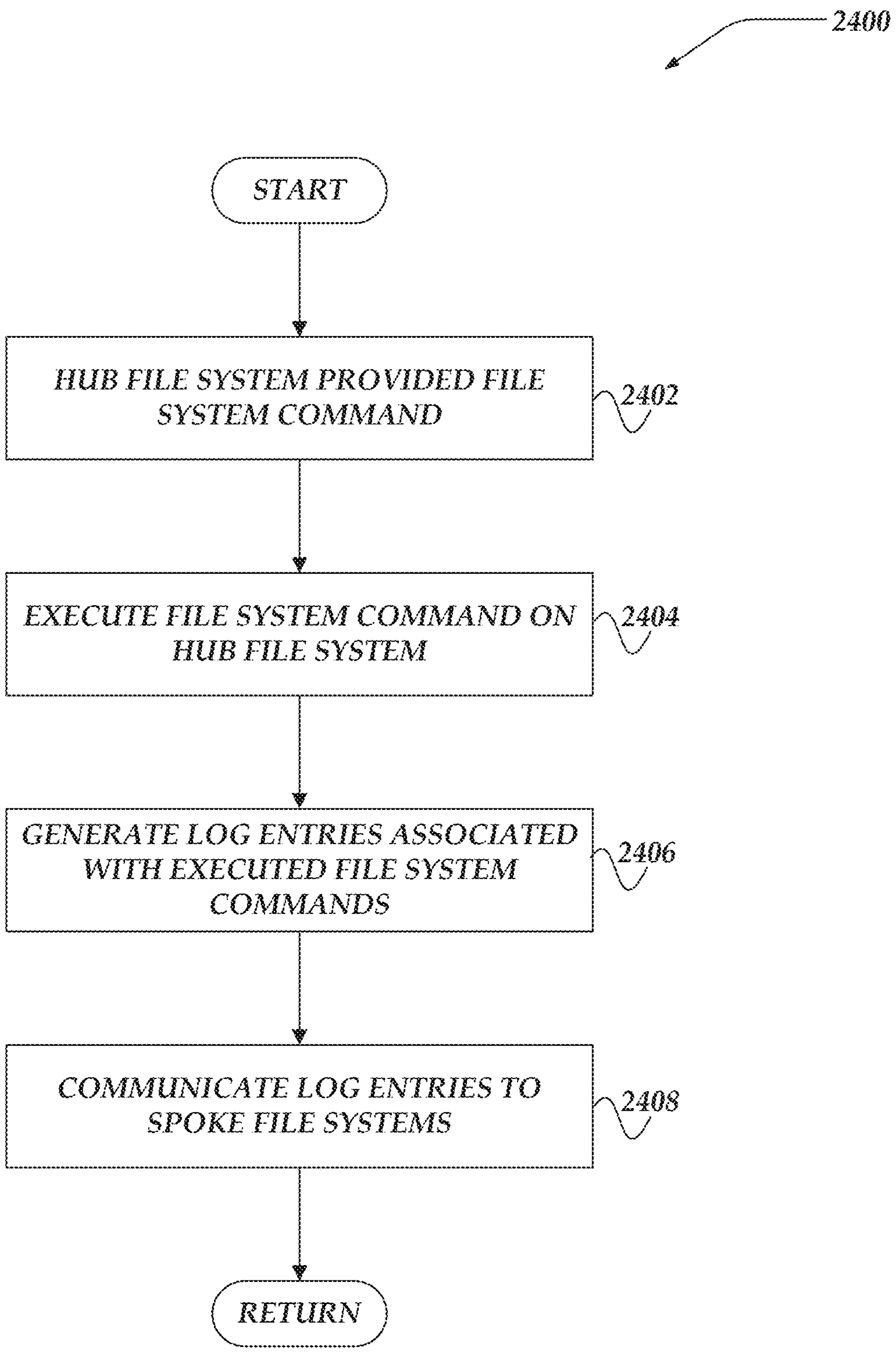
FIG. 24 illustrates a flowchart for a process for global namespaces for distributed file systems in accordance with one or more of the various embodiments.

FIG. 24 illustrates a flowchart for process 2400 for global namespaces for distributed file systems in accordance with one or more of the various embodiments. After a start flowchart block, at flowchart block 2402, in one or more of the various embodiments, a hub file system engine may be provided a file system command from a client of the hub file system. In some embodiments, clients of the hub file system may be users or applications that employ the hub file system directly rather than accessing shared files via a spoke file system.

At flowchart block 2404, in one or more of the various embodiments, hub file system engines to perform one or more actions to execute the provided command. In some embodiments, these actions may include obtaining locks from a distributed lock manager. Also, in some embodiments, these actions may include flushing the unified log entries from one or more spoke file systems as described above before executing the provided command.

At flowchart block 2406, in one or more of the various embodiments, hub file system engines may be arranged to generate one or more log entries associated with the execution of the command.

In some embodiments, these log entries may be considered to be part of the invalidation log. In some embodiments, invalidation log entries may include information that enables spoke file systems to invalidate their local caches of file system items shared from the hub file systems.

Accordingly, in some embodiments, invalidation log entries may include less information than unified log entries generated by spoke file systems. However, in some embodiments, the invalidation log entry may be similar to unified log entries.

At flowchart block 2408, in one or more of the various embodiments, hub file system engines may be arranged to communicate the invalidation log entries to one or more spoke file systems.

In some embodiments, communicating the invalidation log entries to the spoke file systems enable the spoke file systems to invalidate file system items data shared by the hub file system that may be cached at the spoke file systems.

In some embodiments, hub file system engines may be arranged to associate a separate invalidation log cursor for each spoke file system. Accordingly, in some embodiments, as invalidation log entries may be communicated to the spoke file systems, their respective cursors may be advanced based on the number of invalidation log entries that were communicated. Thus, in some embodiments, different spoke file systems may consume invalidation logs at different rates.

In some embodiments, if each the spoke file systems has been communicated one or more particular invalidation log entries, those entries may be removed from the invalidation log as needed.

Next, in one or more of the various embodiments, control may be returned to a calling process.

Figure 25:
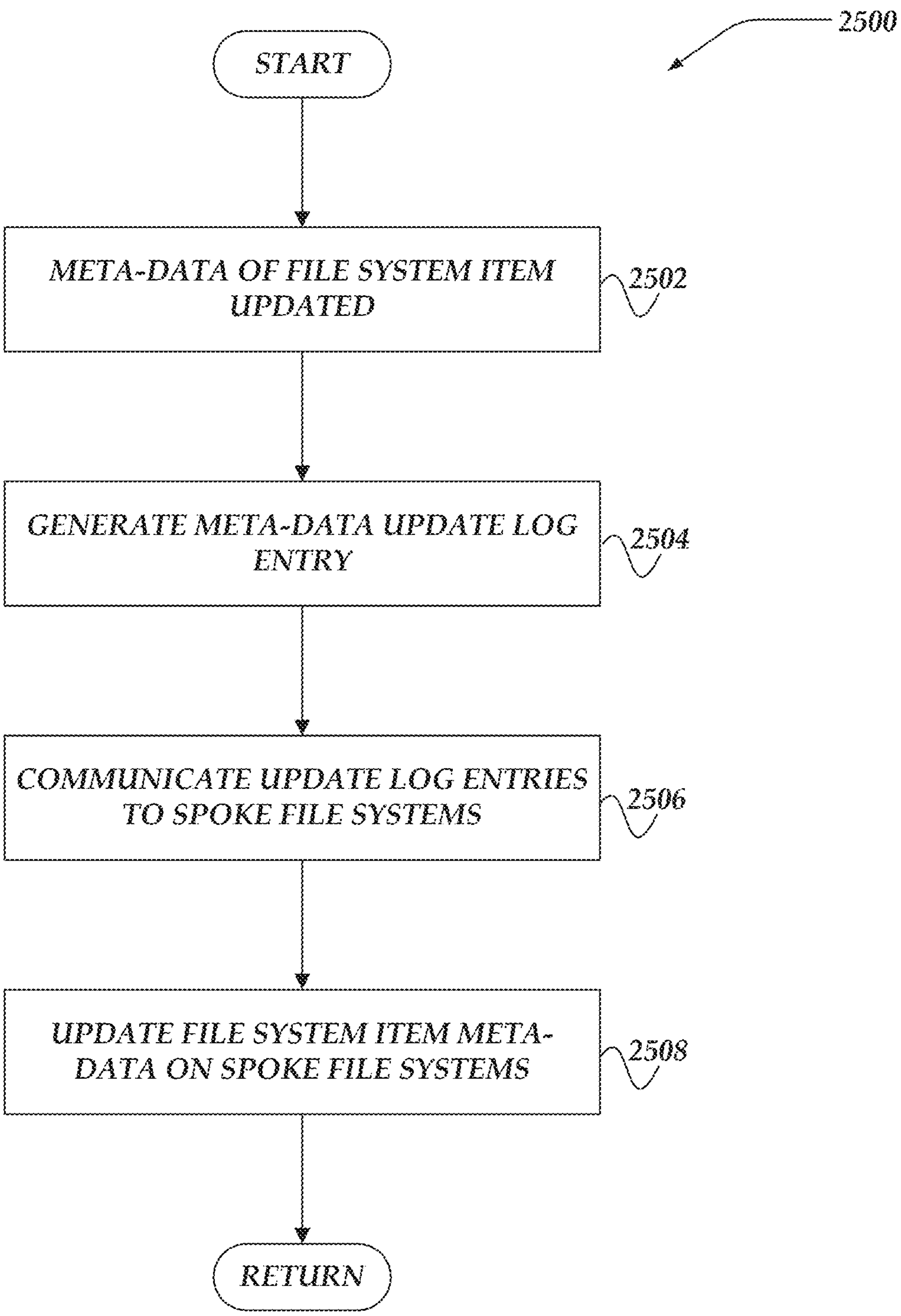
FIG. 25 illustrates a flowchart for a process for managing file system item meta-data updated for global namespaces for distributed file systems in accordance with one or more of the various embodiments.

FIG. 25 illustrates a flowchart for process 2500 for managing file system item meta-data updated for global namespaces for distributed file systems in accordance with one or more of the various embodiments. After a start flowchart block, at flowchart block 2502, in one or more of the various embodiments, a hub file system engine may determine that meta-data associated with a file system item may be updated. In some embodiments, file system meta-data may include, file system item size, access times, file counts (for directories), access permission/privileges, file system item ownership, file system item group membership, or the like. Accordingly, in some embodiments, to enable spoke file system to maintain a consistent view of the file system items shared by the hub file systems, the meta-data for file system items cached on spoke file system may be updated as well. In some cases, for some embodiments, updating meta-data may not require data updates. For example, if a spoke file system has cached a portion of a large file system item, changes to other portions of the same file system item by other clients (including hub file system clients or clients of other spoke file systems) may cause the file system item meta-data to be updated while not impacting the particular data that may be cached at the spoke file system. Also, for example, a spoke file system client may be viewing a directory shared by a hub file system while another file system client may be performing actions, such as renaming files, moving files, renaming files, or the like, that are in the same directory. In some cases, these types of changes to a directory may not impact cached file data at spoke file systems, but the directory meta-data such as directory listings, or the like, may become inconsistent with the hub file system.

At flowchart block 2504, in one or more of the various embodiments, hub file system engines may be arranged to generate one or more meta-data update log entries. In some embodiments, meta-data update log entries may be similar to unified log entries in that they are generated by hub file system engines and then pushed out to spoke file systems as needed or if convenient. In some embodiments, meta-data update log entries may be considered to log entries that include changes to file system item meta-data rather than changes or updates to file system item data.

Accordingly, in some embodiments, hub file system engines may be arranged to maintain a distinct queue of meta-data update log entries. Also, in some embodiments, hub file system engines may be arranged to include meta-data update log entries in the same queue as other unified log entries such that the log entry data structures include fields that enable the different types of log entries to be distinguished from each other.

At flowchart block 2506, in one or more of the various embodiments, hub file system engines may be arranged to communicate meta-data update log entries to one or more spoke file system. As described above, hub file system engines or distributed lock managers may be arranged to manage/track which spoke file system may be shared portions of the hub file system. Likewise, as described above, hub file system engines or distributed lock managers may be arranged to track the various locks that have been issued to hub file system clients or spoke file system clients. Accordingly, in some embodiments, hub file system engines may be arranged to determine the spoke file systems that should receive the meta-data update log entries.

At flowchart block 2508, in one or more of the various embodiments, spoke file system engines that receive the meta-data update log entries may be arranged to update their local copies of the relevant meta-data. For example, for some embodiments, a spoke file system engine may update a cached directory file listing in response to a meta-data update without impacting other locks that may be associated file system items in the same directory that may be unrelated to the directory listing change.

Next, in one or more of the various embodiments, control may be returned to a calling process.

It will be understood that each flowchart block in each flowchart illustration, and combinations of flowchart blocks in each flowchart illustration, can be implemented by computer program instructions. These program instructions may be provided to a processor to produce a machine, such that the instructions, which execute on the processor, create means for implementing the actions specified in each flowchart block or flowchart blocks. The computer program instructions may be executed by a processor to cause a series of operational steps to be performed by the processor to produce a computer-implemented process such that the instructions, which execute on the processor, provide steps for implementing the actions specified in each flowchart block or flowchart blocks. The computer program instructions may also cause at least some of the operational steps shown in the flowchart blocks of each flowchart to be performed in parallel. Moreover, some of the steps may also be performed across more than one processor, such as might arise in a multi-processor computer system. In addition, one or more flowchart blocks or combinations of flowchart blocks in each flowchart illustration may also be performed concurrently with other flowchart blocks or combinations of flowchart blocks, or even in a different sequence than illustrated without departing from the scope or spirit of the invention.

Accordingly, each flowchart block in each flowchart illustration supports combinations of means for performing the specified actions, combinations of steps for performing the specified actions and program instruction means for performing the specified actions. It will also be understood that each flowchart block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data in a distributed file system over a network using one or more processors to execute instructions that are configured to cause performance of actions, comprising:

sharing one or more portions of a hub file system that includes one or more nodes with one or more spoke file systems that includes one or more other nodes, wherein the hub file system shares organization, access and storage of a plurality of file system items with the one or more spoke file systems; and employing a first request from a client for access to one or more file system items of the plurality of shared file system items to perform further actions, including:

obtaining one or more log entries from a portion of the one or more spoke file systems that include cache data, wherein the one or more log entries are associated with one or more commands that were executed in the portion of the one or more spoke file systems, and wherein each log entry is associated with a sequence of execution for the one or more commands;

executing the one or more commands in the sequence again in the hub file system for each logical timestamp of the one or more log entries to update the one or more file system items in the hub file system; and granting a lock on the one or more file system items in the hub file system that enables the client of the one or more spoke file systems to access the one or more updated file system items from the portion of one or more spoke file systems; and employing a second request from a client for access to the one or more file system items of the plurality of shared file system items to perform further actions, including:

updating the one or more file system items based on one or more invalidation log entries generated by execution of one or more commands associated with the first request; and communicating the one or more invalidation log entries to the portion of the one or more spoke file systems that include cached data, wherein the one or more invalidation log entries are used to invalidate the cached data.

2. The method of claim 1, further comprising:

concurrently storing a plurality of file system log entries into a plurality of shards that are distributed in the hub file system and the one or more spoke file systems based on one or more of a rule, a hash, or a local requirement.

3. The method of claim 1, further comprising:

employing initiation of a snapshot by the hub file system to flush each log entry from one or more shards distributed in one or more spoke file systems, which correspond to the snapshot, to the hub file system prior to generation of the snapshot.

4. The method of claim 1, further comprising:

employing a third request from the client of the hub file system to perform further actions, including:

determining another portion of the one or more spoke file systems that includes cached data associated with one or more other file system items; and updating the one or more other file system items in the hub file system based on an execution of one or more commands associated with the third request from the client.

5. The method of claim 1, further comprising:

employing a fourth request from the client of the hub file system to perform further actions, including:

generating one or more invalidation log entries on the hub file system based on an execution of the one or more commands; and communicating the one or more invalidation log entries to the one or more spoke file systems, wherein the one or more spoke file systems employ the one or more invalidation log entries to invalidate cached data associated with one or more file system items that correspond to the one or more invalidated log entries.

6. The method of claim 1, further comprising:

generating a lock for a local cache of a spoke file system to obtain subsequent access to a fresh copy of stored data that corresponds to one or more invalidation log entries from the hub file system.

7. The method of claim 1, further comprising:

employing updates to meta-data associated with the one or more file system items to generate updated meta-data associated with each corresponding log entry.

8. A network computer for managing data in a distributed file system, comprising:

a memory that stores at least instructions; and one or more processors that execute instructions that are configured to cause performance of actions, including:

sharing one or more portions of a hub file system that includes one or more nodes with one or more spoke file systems that includes one or more other nodes, wherein the hub file system shares organization, access and storage of a plurality of file system items with the one or more spoke file systems; and employing a first request from a client for access to one or more file system items of the plurality of shared file system items to perform further actions, including:

obtaining one or more log entries from a portion of the one or more spoke file systems that include cache data, wherein the one or more log entries are associated with one or more commands that were executed in the portion of the one or more spoke file systems, and wherein each log entry is associated with a sequence of execution for the one or more commands;

executing the one or more commands in the sequence again in the hub file system for each logical timestamp of the one or more log entries to update the one or more file system items in the hub file system; and granting a lock on the one or more file system items in the hub file system that enables the client of the one or more spoke file systems to access the one or more updated file system items from the portion of one or more spoke file systems; and employing a second request from a client for access to the one or more file system items of the plurality of shared file system items to perform further actions, including:

updating the one or more file system items based on one or more invalidation log entries generated by execution of one or more commands associated with the first request; and communicating the one or more invalidation log entries to the portion of the one or more spoke file systems that include cached data, wherein the one or more invalidation log entries are used to invalidate the cached data.

9. The network computer of claim 8, further comprising: concurrently storing a plurality of file system log entries into a plurality of shards that are distributed in the hub file system and the one or more spoke file systems based on one or more of a rule, a hash, or a local requirement.

10. The network computer of claim 8, further comprising: employing initiation of a snapshot by the hub file system to flush each log entry from one or more shards distributed in one or more spoke file systems, which correspond to the snapshot, to the hub file system prior to generation of the snapshot.

11. The network computer of claim 8, further comprising: employing a third request from the client of the hub file system to perform further actions, including:

determining another portion of the one or more spoke file systems that includes cached data associated with one or more other file system items; and updating the one or more other file system items in the hub file system based on an execution of one or more commands associated with the third request from the client.

12. The network computer of claim 8, further comprising: employing a fourth request from the client of the hub file system to perform further actions, including:

generating one or more invalidation log entries on the hub file system based on an execution of the one or more commands; and communicating the one or more invalidation log entries to the one or more spoke file systems, wherein the one or more spoke file systems employ the one or more invalidation log entries to invalidate cached data associated with one or more file system items that correspond to the one or more invalidated log entries.

13. The network computer of claim 8, further comprising: generating a lock for a local cache of a spoke file system to obtain subsequent access to a fresh copy of stored data that corresponds to one or more invalidation log entries from the hub file system.

14. The network computer of claim 8, further comprising: employing updates to meta-data associated with the one or more file system items to generate updated meta-data associated with each corresponding log entry.

15. A processor readable non-transitory storage media that includes instructions for managing data in a distributed file system over a network, wherein execution of the instructions by one or more processors on one or more network computers performs actions, comprising:

sharing one or more portions of a hub file system that includes one or more nodes with one or more spoke file systems that includes one or more other nodes, wherein the hub file system shares organization, access and storage of a plurality of file system items with the one or more spoke file systems; and employing a first request from a client for access to one or more file system items of the plurality of shared file system items to perform further actions, including:

obtaining one or more log entries from a portion of the one or more spoke file systems that include cache data, wherein the one or more log entries are associated with one or more commands that were executed in the portion of the one or more spoke file systems, and wherein each log entry is associated with a sequence of execution for the one or more commands;

executing the one or more commands in the sequence again in the hub file system for each logical timestamp of the one or more log entries to update the one or more file system items in the hub file system; and granting a lock on the one or more file system items in the hub file system that enables the client of the one or more spoke file systems to access the one or more updated file system items from the portion of one or more spoke file systems; and employing a second request from a client for access to the one or more file system items of the plurality of shared file system items to perform further actions, including:

updating the one or more file system items based on one or more invalidation log entries generated by execution of one or more commands associated with the first request; and communicating the one or more invalidation log entries to the portion of the one or more spoke file systems that include cached data, wherein the one or more invalidation log entries are used to invalidate the cached data.

16. The processor readable non-transitory storage media of claim 15, further comprising:

concurrently storing a plurality of file system log entries into a plurality of shards that are distributed in the hub file system and the one or more spoke file systems based on one or more of a rule, a hash, or a local requirement.

17. The processor readable non-transitory storage media of claim 15, further comprising:

employing initiation of a snapshot by the hub file system to flush each log entry from one or more shards distributed in one or more spoke file systems, which correspond to the snapshot, to the hub file system prior to generation of the snapshot.

18. The processor readable non-transitory storage media of claim 15, further comprising:

employing a third request from the client of the hub file system to perform further actions, including:

determining another portion of the one or more spoke file systems that includes cached data associated with one or more other file system items; and updating the one or more other file system items in the hub file system based on an execution of one or more commands associated with the third request from the client.

19. The processor readable non-transitory storage media of claim 15, further comprising:

employing a fourth request from the client of the hub file system to perform further actions, including:

generating one or more invalidation log entries on the hub file system based on an execution of the one or more commands; and communicating the one or more invalidation log entries to the one or more spoke file systems, wherein the one or more spoke file systems employ the one or more invalidation log entries to invalidate cached data associated with one or more file system items that correspond to the one or more invalidated log entries.

20. The processor readable non-transitory storage media of claim 15, further comprising:

generating a lock for a local cache of a spoke file system to obtain subsequent access to a fresh copy of stored data that corresponds to one or more invalidation log entries from the hub file system.

* * * * *